(12) United States Patent
Johnson et al.

(10) Patent No.: US 6,199,173 B1
(45) Date of Patent: *Mar. 6, 2001

(54) METHOD FOR MAPPING ENVIRONMENTAL RESOURCES TO MEMORY FOR PROGRAM ACCESS

(75) Inventors: Karl S. Johnson, Palo Alto; Walter A. Wallach, Los Altos; Ken Nguyen, San Jose; Carlton G. Amdahl, Fremont, all of CA (US)

(73) Assignee: Micron Electronics, Inc., Nampa, ID (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/942,214

(22) Filed: Oct. 1, 1997

(51) Int. Cl.$^7$ .................................................. G06F 15/177
(52) U.S. Cl. .................................. 714/4; 714/3; 714/37; 714/47; 714/48
(58) Field of Search ................................ 714/4, 3, 37.39, 714/47, 48, 51, 52

(56) References Cited

U.S. PATENT DOCUMENTS

| | | | |
|---|---|---|---|
| 4,057,847 | 11/1977 | Lowell et al. | 364/200 |
| 4,100,597 | 7/1978 | Fleming et al. | 364/474 |
| 4,449,182 | 5/1984 | Rubinson et al. | 364/200 |
| 4,672,535 | 6/1987 | Katzman et al. | 364/200 |
| 4,692,918 | 9/1987 | Elliott et al. | 370/85 |
| 4,695,946 | 9/1987 | Andreasen et al. | 364/200 |
| 4,769,764 | 9/1988 | Levanon | 364/708 |
| 4,774,502 | * 9/1988 | Kimura | 340/501 |
| 4,821,180 | 4/1989 | Gerety et al. | 364/200 |
| 4,894,792 | 1/1990 | Mitchell et al. | 364/708 |
| 5,007,431 | 4/1991 | Donehoo, III | 128/696 |
| 5,033,048 | 7/1991 | Pierce et al. | 371/21.2 |
| 5,051,720 | 9/1991 | Kittirutsunetorn | 340/310 R |
| 5,073,932 | 12/1991 | Yossifor et al. | 380/23 |
| 5,103,391 | * 4/1992 | Barrett | 364/133 |

(List continued on next page.)

FOREIGN PATENT DOCUMENTS

| | | | |
|---|---|---|---|
| 4-333118 | 11/1992 | (JP) | G06F/1/18 |
| 5-233110 | 9/1993 | (JP) | G06F/3/00 |
| 7-093064 | 4/1995 | (JP) | G06F/1/26 |
| 7-261874 | 10/1995 | (JP) | G06F/1/18 |

OTHER PUBLICATIONS

Davis, T, Usenet post to alt.msdos.programmer, Apr. 1997, "Re: How do I create an FDISK batch file?"
Davis, T., Usenet post to alt.msdos.batch, Apr. 1997, "Re: Need help with automating FDISK and Format . . . ".

(List continued on next page.)

Primary Examiner—Norman M. Wright
(74) Attorney, Agent, or Firm—Knobbe, Martens, Olson & Bear, LLP

(57) ABSTRACT

A network of microcontrollers for monitoring and diagnosing the environmental conditions of a computer is disclosed. The network of microcontrollers provides a management system by which computer users can accurately gauge the health of their computer. The network of microcontrollers provides users the ability to detect system fan speeds, internal temperatures and voltage levels. The invention is designed to not only be resilient to faults, but also allows for the system maintenance, modification, and growth—without downtime. Additionally, the present invention allows users to replace failed components, and add new functionality, such as new network interfaces, disk interface cards and storage, without impacting existing users. One of the primary roles of the present invention is to manage the environment without outside involvement. This self-management allows the system to continue to operate even though components have failed.

22 Claims, 23 Drawing Sheets

U.S. PATENT DOCUMENTS

| | | | |
|---|---|---|---|
| 5,118,970 | 6/1992 | Olson et al. | 307/443 |
| 5,121,500 | 6/1992 | Arlington et al. | 395/750 |
| 5,136,708 | 8/1992 | Lapourtre et al. | 395/650 |
| 5,136,715 | 8/1992 | Hirose et al. | 395/775 |
| 5,138,619 | 8/1992 | Fasang et al. | 371/21.1 |
| 5,157,663 | 10/1992 | Major et al. | 371/9.1 |
| 5,210,855 | 5/1993 | Bartol | 395/500 |
| 5,245,615 | 9/1993 | Treu | 371/16.5 |
| 5,247,683 | 9/1993 | Holmes et al. | 395/700 |
| 5,253,348 | 10/1993 | Scalise | 395/325 |
| 5,265,098 | 11/1993 | Mattson et al. | 371/11.1 |
| 5,266,838 | 11/1993 | Gerner | 307/19 |
| 5,272,382 | 12/1993 | Heald et al. | 307/66 |
| 5,276,863 | 1/1994 | Heider | 395/575 |
| 5,277,615 | 1/1994 | Hastings et al. | 439/377 |
| 5,280,621 | 1/1994 | Barnes et al. | 395/800 |
| 5,283,905 | 2/1994 | Saadeh et al. | 395/750 |
| 5,311,397 | 5/1994 | Harshberger et al. | 361/683 |
| 5,311,451 * | 5/1994 | Barrett | 364/550 |
| 5,367,670 | 11/1994 | Ward et al. | 395/575 |
| 5,379,184 | 1/1995 | Barraza et al. | 361/685 |
| 5,388,267 | 2/1995 | Chan et al. | 395/700 |
| 5,402,431 | 3/1995 | Saadeh et al. | 371/67.1 |
| 5,423,025 | 6/1995 | Goldman et al. | 395/575 |
| 5,430,717 | 7/1995 | Fowler et al. | 370/58.2 |
| 5,430,845 | 7/1995 | Rimmer et al. | 395/275 |
| 5,432,715 | 7/1995 | Shigematsu et al. | 364/551.01 |
| 5,432,946 | 7/1995 | Allard et al. | 395/750 |
| 5,438,678 | 8/1995 | Smith | 395/750 |
| 5,448,723 | 9/1995 | Rowett | 395/200.02 |
| 5,455,933 | 10/1995 | Schieve et al. | 395/183.03 |
| 5,460,441 | 10/1995 | Hastings et al. | 312/298 |
| 5,463,766 | 10/1995 | Schieve et al. | 395/650 |
| 5,465,349 * | 11/1995 | Geronimi et al. | 364/550 |
| 5,471,617 | 11/1995 | Farrand et al. | 395/700 |
| 5,471,634 | 11/1995 | Giorgio et al. | 395/600 |
| 5,473,499 | 12/1995 | Weir | 361/58 |
| 5,485,550 | 1/1996 | Dalton | 395/51 |
| 5,513,314 | 4/1996 | Kandasamy et al. | 395/182.04 |
| 5,513,339 | 4/1996 | Agrawal et al. | 395/500 |
| 5,519,851 | 5/1996 | Bender et al. | 395/500 |
| 5,526,289 | 6/1996 | Dinh et al. | 364/557 |
| 5,528,409 | 6/1996 | Cucci et al. | 359/171 |
| 5,530,810 | 6/1996 | Bowman | 395/283 |
| 5,533,193 | 7/1996 | Roscoe | 395/183.15 |
| 5,535,326 | 7/1996 | Baskey et al. | 395/182.02 |
| 5,542,055 | 7/1996 | Amini et al. | 395/281 |
| 5,546,272 | 8/1996 | Moss et al. | 361/687 |
| 5,548,712 | 8/1996 | Larson et al. | 395/182.05 |
| 5,559,764 | 9/1996 | Chen et al. | 396/30 |
| 5,560,022 | 9/1996 | Dunstan et al. | 395/750 |
| 5,566,299 | 10/1996 | Billings et al. | 395/182.02 |
| 5,566,339 | 10/1996 | Perholtz et al. | 395/750 |
| 5,572,403 | 11/1996 | Mills | 361/695 |
| 5,579,487 | 11/1996 | Meyerson et al. | 395/280 |
| 5,579,491 | 11/1996 | Jeffries et al. | 395/283 |
| 5,579,528 | 11/1996 | Register | 395/671 |
| 5,584,030 | 12/1996 | Husak et al. | 395/750 |
| 5,586,250 * | 12/1996 | Carbonneau et al. | 395/183.2 |
| 5,588,121 | 12/1996 | Reddin et al. | 395/200.15 |
| 5,592,611 | 1/1997 | Midgely et al. | 395/182.02 |
| 5,596,711 | 1/1997 | Burckhartt et al. | 395/182.21 |
| 5,598,407 | 1/1997 | Bud et al. | 370/330 |
| 5,602,758 * | 2/1997 | Lincoln et al. | 364/505 |
| 5,621,159 | 4/1997 | Brown et al. | 73/9 |
| 5,622,221 | 4/1997 | Genga, Jr. et al. | 165/208 |
| 5,625,238 | 4/1997 | Ady et al. | 307/147 |
| 5,627,962 | 5/1997 | Goodrum et al. | 395/182.11 |
| 5,628,028 | 5/1997 | Michelson | 395/825 |
| 5,630,076 | 5/1997 | Saulpaugh et al. | 395/284 |
| 5,631,847 | 5/1997 | Kikinis | 364/514 R |
| 5,636,341 | 6/1997 | Matsushita et al. | 395/182.11 |
| 5,652,839 | 7/1997 | Giorgio et al. | 395/200.11 |
| 5,652,892 | 7/1997 | Ugajin | 395/750 |
| 5,652,908 | 7/1997 | Douglas et al. | 395/800 |
| 5,655,083 | 8/1997 | Bagley | 395/182.31 |
| 5,664,118 | 9/1997 | Nishigaki et al. | 395/283 |
| 5,668,943 | 9/1997 | Attanasio et al. | 395/182.05 |
| 5,668,992 | 9/1997 | Hammer et al. | 395/651 |
| 5,669,009 | 9/1997 | Buktenica et al. | 395/800.35 |
| 5,671,371 | 9/1997 | Kondo et al. | 395/306 |
| 5,696,895 | 12/1997 | Hemphill et al. | 395/182.02 |
| 5,696,949 | 12/1997 | Young | 395/551 |
| 5,701,417 | 12/1997 | Lewis et al. | 395/200.16 |
| 5,704,031 | 12/1997 | Mikami et al. | 395/182.02 |
| 5,708,775 | 1/1998 | Nakamura | 395/185.01 |
| 5,708,776 | 1/1998 | Kikinis | 395/185.08 |
| 5,712,754 | 1/1998 | Sides et al. | 361/58 |
| 5,715,456 | 2/1998 | Bennett et al. | 395/652 |
| 5,717,570 | 2/1998 | Kikinis | 361/685 |
| 5,721,935 | 2/1998 | DeSchepper et al. | 395/750 |
| 5,727,207 | 3/1998 | Gates et al. | 395/651 |
| 5,732,266 | 3/1998 | Moore et al. | 395/651 |
| 5,737,708 | 4/1998 | Grob et al. | 455/557 |
| 5,742,514 | 4/1998 | Bonola | 364/492 |
| 5,742,833 | 4/1998 | Dea et al. | 395/750.05 |
| 5,752,164 | 5/1998 | Jones | 455/33.1 |
| 5,758,165 | 5/1998 | Shuff | 395/712 |
| 5,758,352 | 5/1998 | Reynolds et al. | 707/200 |
| 5,761,085 | 6/1998 | Giorgio | 364/505 |
| 5,761,707 | 6/1998 | Aiken et al. | 711/118 |
| 5,764,924 | 6/1998 | Hong | 395/281 |
| 5,767,844 | 6/1998 | Stoye | 345/212 |
| 5,771,343 | 6/1998 | Hafner et al. | 395/182.02 |
| 5,774,645 | 6/1998 | Beaujard et al. | 395/183.01 |
| 5,777,897 | 7/1998 | Giorgio | 364/557 |
| 5,778,197 | 7/1998 | Dunham | 395/284 |
| 5,781,716 | 7/1998 | Hemphill et al. | 395/182.02 |
| 5,781,744 | 7/1998 | Johnson et al. | 395/283 |
| 5,784,555 | 7/1998 | Stone | 395/200.5 |
| 5,787,019 | 7/1998 | Knight et al. | 364/550 |
| 5,787,459 | 7/1998 | Stallmo et al. | 711/112 |
| 5,787,491 | 7/1998 | Merkin et al. | 711/173 |
| 5,790,775 | 8/1998 | Marks et al. | 395/182.07 |
| 5,793,948 | 8/1998 | Asahi et al. | 395/184.01 |
| 5,796,580 | 8/1998 | Komatsu et al. | 361/687 |
| 5,797,023 | 8/1998 | Berman et al. | 395/750.06 |
| 5,799,196 | 8/1998 | Flannery | 395/750.03 |
| 5,802,298 | 9/1998 | Imai et al. | 395/200.47 |
| 5,802,305 | 9/1998 | McKaughan et al. | 395/200.57 |
| 5,802,324 | 9/1998 | Wunderlich et al. | 395/281 |
| 5,802,592 | 9/1998 | Chess et al. | 711/164 |
| 5,803,357 * | 9/1998 | Lakin | 236/78 B |
| 5,805,804 | 9/1998 | Laursen et al. | 395/200.02 |
| 5,809,256 | 9/1998 | Najemy | 395/283 |
| 5,809,287 | 9/1998 | Stupek, Jr. et al. | 395/500 |
| 5,809,311 | 9/1998 | Jones | 395/750.01 |
| 5,809,555 | 9/1998 | Hobson | 711/172 |
| 5,812,748 | 9/1998 | Ohran et al. | 395/182.02 |
| 5,815,647 | 9/1998 | Buckland et al. | 395/182.01 |
| 5,821,596 | 10/1998 | Miu et al. | 257/419 |
| 5,826,043 | 10/1998 | Smith et al. | 395/281 |
| 5,835,719 | 11/1998 | Gibson et al. | 395/200.51 |
| 5,838,932 | 11/1998 | Alzien | 395/308 |
| 5,841,964 | 11/1998 | Yamaguchi | 395/113.21 |
| 5,845,061 | 12/1998 | Miyamoto et al. | 395/182.02 |
| 5,845,095 | 12/1998 | Reed et al. | 395/283 |
| 5,850,546 | 12/1998 | Kim | 395/651 |
| 5,852,724 | 12/1998 | Glenn, II et al. | 395/200.69 |
| 5,857,102 | 1/1999 | McChesney et al. | 395/653 |
| 5,864,653 * | 1/1999 | Tavallaei et al. | 315/181 |

| | | | |
|---|---|---|---|
| 5,864,713 | 1/1999 | Terry | 395/872 |
| 5,867,730 | 2/1999 | Leyda | 395/830 |
| 5,875,307 | 2/1999 | Ma et al. | 395/281 |
| 5,875,308 | 2/1999 | Egan et al. | 395/283 |
| 5,875,310 | 2/1999 | Buckland et al. | 395/306 |
| 5,878,237 | 3/1999 | Olarig | 395/308 |
| 5,878,238 | 3/1999 | Gan et al. | 395/308 |
| 5,881,311 | 3/1999 | Woods | 395/824 |
| 5,884,027 | 3/1999 | Garbus et al. | 395/200.8 |
| 5,884,049 | 3/1999 | Atkinson | 395/281 |
| 5,886,424 | 3/1999 | Kim | 307/64 |
| 5,889,965 | 3/1999 | Wallach et al. | 395/283 |
| 5,892,898 | 4/1999 | Fujii et al. | 395/185.1 |
| 5,892,928 | 4/1999 | Wallach et al. | 395/283 |
| 5,898,846 | 4/1999 | Kelly | 395/284 |
| 5,898,888 | 4/1999 | Guthrie et al. | 395/308 |
| 5,905,867 | 5/1999 | Giorgio | 395/200.54 |
| 5,907,672 | 5/1999 | Matze et al. | 395/182.06 |
| 5,909,568 | 6/1999 | Nason | 395/500 |
| 5,911,779 | 6/1999 | Stallmo et al. | 714/6 |
| 5,913,034 | 6/1999 | Malcolm | 395/200.53 |
| 5,922,060 | 7/1999 | Goodrum | 710/103 |
| 5,930,358 | 7/1999 | Rao | 380/4 |
| 5,935,262 | 8/1999 | Barrett et al. | 714/46 |
| 5,936,960 | 8/1999 | Stewart | 370/438 |
| 5,938,751 | 8/1999 | Tavallaei et al. | 710/103 |
| 5,941,996 | 8/1999 | Smith et al. | 714/47 |
| 5,964,855 | 10/1999 | Bass et al. | 710/103 |
| 5,983,349 | 11/1999 | Kodama et al. | 713/200 |
| 5,987,554 | 11/1999 | Liu et al. | 710/129 |
| 5,987,627 | 11/1999 | Rawlings, III | 714/48 |
| 6,012,130 | 1/2000 | Beyda et al. | 711/173 |

OTHER PUBLICATIONS

NetFrame Systems Incorporated, Doc. No. 78–1000226–01, pp. 1–2, 5–8, 359–404, and 471–512, Apr. 1996,"NetFrame Clustered Multiprocessing Software: NW0496 DC–ROM for Novel® Netware® 4.1 SMP, 4.1, and 3.12. "

Shanley, and Anderson, PCI System Architecture, Third Edition, Chapter 15, pp. 297–302, Copyright 1995, "Intro To Configuration Address Space."

Shanley, and Anderson, PCI System Architecture, Third Edition, Chapter 16, pp. 303–328, Copyright 1995, "Configuration Transactions."

Sun Microsystems Computer Company, Part No. 802–5355–10, Rev. A, May 1996, "Solstice SyMON User's Guid."

Sun Microsystems, Part No. 802–6569–11, Release 1.0.1, Nov. 1996, "Remote Systems Diagnostics Installation & User Guide."

Shanley and Anderson, PCI System Architecture, Third Edition, Chapters 15 & 16, pp. 297–328, CR 1995.

PCI Hot–Plug Specification, Preliminary Revision for Review Only, Revision 0.9, pp. i–vi, and 1–25, Mar. 5, 1997.

SES SCSI–3 Enclosure Services, X3T10/Project 1212–D/ Rev 8a, pp. i, iii–x, 1–76, and 1–1 (index), Jan. 16, 1997.

Compaq Computer Corporation, Technology Brief, pp. 1–13, Dec. 1996, "Where Do I Plug the Cable?Solving the Logical–Physical Slot Numbering Problem."

Mark Lockareff, "Lonworks—An Introduction", HTINews, Dec., 1996, 2 pp.

M. J. Schofield, "Controller Area Network—How CAN Works",mschofield@cix.compulink.co.uk, Sep. 23, 1997, 4 pp.

"CAN: Technical Overview", NRTT, Ltd., Sep. 23,1997, 15 pp.

Product Brochure of NetFRAME, "NF450FT Network Mainframe", Feb. 1992, 14 pp.

Gorlick, M., Conf. Proceedings: ACM/ONR Workshop on Parallel and Distributed Debugging, pp. 175–181, 1991, "The Flight Recorder: An Architectural Aid for System Monitoring."

IBM Technical Disclosure Bulletin, 92A+62947, pp. 391–394, Oct. 1992, Method for Card Hot Plug Detection and Control.

Lyons, Computer Reseller News, Issue 721, pp. 61–62, Feb. 3, 1997, "ACC Releases Low–Cost Solution for ISPs."

M2 Communications, M2 Presswire, 2 pages, Dec. 19, 1996, "Novell IntranetWare Supports Hot Pluggable PCI from NetFRAME."

Rigney, PC Magazine, 14(17): 375–379, Oct. 10, 1995, "The One for the Road (Mobile–aware capabilities in Windows 95)."

Shanley, and Anderson, PCI System Architecture, Third Edition, p. 382, Copyright 1995.

*ftp.cdrom.com/pub/os2/diskutil/*, PHDX software, phdx.zip download, Mar. 1995, "Parallel Hard Disk Xfer."

Cmaster, Usenet post to microsoft.public.windowsnt.setup, Aug. 1997, "Re: FDISK switches."

Hildebrand, N., Usenet post to comp.msdos.programmer, May 1995, "Re: Structure of disk partition into."

Lewis, L., Usenet post to alt.msdos.batch, Apr. 1997, "Re: Need help with automating FDISK and Format."

Netframe, http://www.netframe–support.com/technology/ datasheets/data.htm, before Mar. 1997, "Netframe Cluster-System 9008 Data Sheet."

Simos, M., Usenet post to comp.os.msdos.misc, Apr. 1997, "Re: Auto FDISK and Format."*

Wood, M. H., Usenet post to comp.os.netware.misc, Aug. 1996, "Re: Workstation duplication method for WIN95."*

* cited by examiner

METHOD FOR MAPPING ENVIRONMENTAL RESOURCES TO MEMORY FOR PROGRAM ACCESS

PRIORITY CLAIM

The benefit under 35 U.S.C. § 119(e) of the following U.S. provisional application(s) is hereby claimed:

| Title | Application No. | Filing Date |
|---|---|---|
| "Remote Access and Control of Environmental Management System" | 60/046,397 | May 13, 1997 |
| "Hardware and Software Architecture for Inter-Connecting an Environmental Management System with a Remote Interface" | 60/047,016 | May 13, 1997 |
| "Self Management Protocol for a Fly-By-Wire Service Processor" | 60/046,416 | May 13, 1997 |
| "Computer System Hardware Infrastructure for Hot Plugging Single and Multi-Function PC Cards Without Embedded Bridges" | 60/046,398 | May 13, 1997 |
| "Computer System Hardware Infrastructure for Hot Plugging Multi-Function PCI Cards With Embedded Bridges" | 60/046,312 | May 13, 1997 |

RELATED APPLICATIONS

This application is related to U.S. application Ser. No. 08/942,402, entitled "DIAGNOSTIC AND MANAGING DISTRIBUTED PROCESSOR SYSTEM", U.S. application Ser. No. 08/942,448, entitled "METHOD FOR MANAGING A DISTRIBUTED PROCESSOR SYSTEM", and U.S. application Ser. No. 08/942,222, entitled "SYSTEM FOR MAPPING ENVIRONMENTAL RESOURCES TO MEMORY FOR PROGRAM ACCESS", which are being filed concurrently herewith.

APPENDICES

Appendix A, which forms a part of this disclosure, is a list of commonly owned copending U.S. patent applications. Each one of the applications listed in Appendix A is hereby incorporated herein in its entirety by reference thereto.

COPYRIGHT RIGHTS

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The invention relates to the field of fault tolerant computer systems. More particularly, the invention relates to a managing and diagnostic system for evaluating and controlling the environmental conditions of a fault tolerant computer system.

2. Description of the Related Technology

As enterprise-class servers become more powerful and more capable, they are also becoming ever more sophisticated and complex. For many companies, these changes lead to concerns over server reliability and manageability, particularly in light of the increasingly critical role of server-based applications. While in the past many systems administrators were comfortable with all of the various components that made up a standards-based network server, today's generation of servers can appear as an incomprehensible, unmanageable black box. Without visibility into the underlying behavior of the system, the administrator must "fly blind." Too often, the only indicators the network manager has on the relative health of a particular server is whether or not it is running.

It is well-acknowledged that there is a lack of reliability and availability of most standards-based servers. Server downtime, resulting either from hardware or software faults or from regular maintenance, continues to be a significant problem. By one estimate, the cost of downtime in mission critical environments has risen to an annual total of $4.0 billion for U.S. businesses, with the average downtime event resulting in a $140 thousand loss in the retail industry and a $450 thousand loss in the securities industry. It has been reported that companies lose as much as $250 thousand in employee productivity for every 1% of computer downtime. With emerging Internet, intranet and collaborative applications taking on more essential business roles every day, the cost of network server downtime will continue to spiral upward. Another major cost is of system downtime administrators to diagnose and fix the system. Corporations are looking for systems which do not require real time service upon a system component failure.

While hardware fault tolerance is an important element of an overall high availability architecture, it is only one piece of the puzzle. Studies show that a significant percentage of network server downtime is caused by transient faults in the I/O subsystem. Transient failures are those which make a server unusable, but which disappear when the server is restarted, leaving no information which points to a failing component. These faults may be due, for example, to the device driver, the adapter card firmware, or hardware which does not properly handle concurrent errors, and often causes servers to crash or hang. The result is hours of downtime per failure, while a system administrator discovers the failure, takes some action and manually reboots the server. In many cases, data volumes on hard disk drives become corrupt and must be repaired when the volume is mounted. A dismount-and-mount cycle may result from the lack of hot pluggability in current standards-based servers. Diagnosing intermittent errors can be a frustrating and time-consuming process. For a system to deliver consistently high availability, it should be resilient to these types of faults.

Modern fault tolerant systems have the functionality monitor the ambient temperature of a storage device enclosure and the operational status of other components such the cooling fans and power supply. However, a limitation of these server systems is that they do not contain self-managing processes to correct malfunctions. Thus, if a malfunction occurs in a typical server, the one corrective measure taken by the server is to give notification of the error causing event via a computer monitor to the system administrator. If the system error caused the system to stop running, the system administrator might never know the source of the error. Traditional systems are lacking in detail and sophistication when notifying system administrators of system malfunctions. System administrators are in need of a graphical user interface for monitoring the health of a network of servers. Administrators need a simple point-and-click interface to evaluate the health of each server in the network. In addition, existing fault tolerant servers rely upon operating system maintained logs for error recording. These systems are not capable of maintaining information when the operating system is inoperable due to a system malfunction.

Existing systems also do not have an interface to control the changing or addition of an adapter. Since any user on a network could be using a particular device on the server, system administrators need a software application that will control the flow of communications to a device before, during, and after a hot plug operation on an adapter.

Also, in the typical fault tolerant computer system, the control logic for the diagnostic system is associated with a particular processor. Thus, if the environmental control processor malfunctioned, then all diagnostic activity on the computer would cease. In traditional systems, there is no monitoring of fans, and no means to make up cooling capacity lost when a fan fails. Some systems provide a processor located on a plug-in PCI card which can monitor some internal systems, and control turning power on and off. If this card fails, obtaining information about the system, and controlling it remotely, is no longer possible. Further, these systems are not able to affect fan speed or cooling capacity.

Therefore, a need exists for improvements in server management which will result in greater reliability and dependability of operation. Server users are in need of a management system by which the users can accurately gauge the health of their system. Users need a high availability system that should not only be resilient to faults, but should allow for maintenance, modification, and growth—without downtime. System users should be able to replace failed components, and add new functionality, such as new network interfaces, disk interface cards and storage, without impacting existing users. As system demands grow, organizations must frequently expand, or scale, their computing infrastructure, adding new processing power, memory, storage and I/O capacity. With demand for 24-hour access to critical, server-based information resources, planned system downtime for system service or expansion has become unacceptable.

SUMMARY OF THE INVENTION

Embodiments of the inventive monitoring and management system provides system administrators with new levels of client/server system availability and management. It gives system administrators and network managers a comprehensive view into the underlying health of the server—in real time, whether on-site or off-site. In the event of a failure, the invention enables the administrator to learn why the system failed, why the system was unable to boot, and to control certain functions of the server.

A method of mapping environmental resources to memory, comprising providing a computer, providing a microcontroller network, connecting the microcontroller network to a computer containing a central processor and a memory, creating an information pathway between the network of microcontrollers and specific memory addresses of the memory and executing commands on the at least one microcontroller which manage and diagnose system functions. A method of mapping environmental resources to memory, comprising providing a computer, including a processor and a memory, connected to a microcontroller network, connecting a plurality of sensors to the microcontroller network and providing a network model in the computer memory, wherein the computer is capable of communicating with a selected one of the sensors by mapping a unique identifier to the microcontroller in the network connected to the selected sensor.

DETAILED DESCRIPTION OF THE INVENTION

The following detailed description presents a description of certain specific embodiments of the present invention. However, the invention can be embodied in a multitude of different ways as defined and covered by the claims. In this description, reference is made to the drawings wherein like parts are designated with like numerals throughout.

Figure 1:
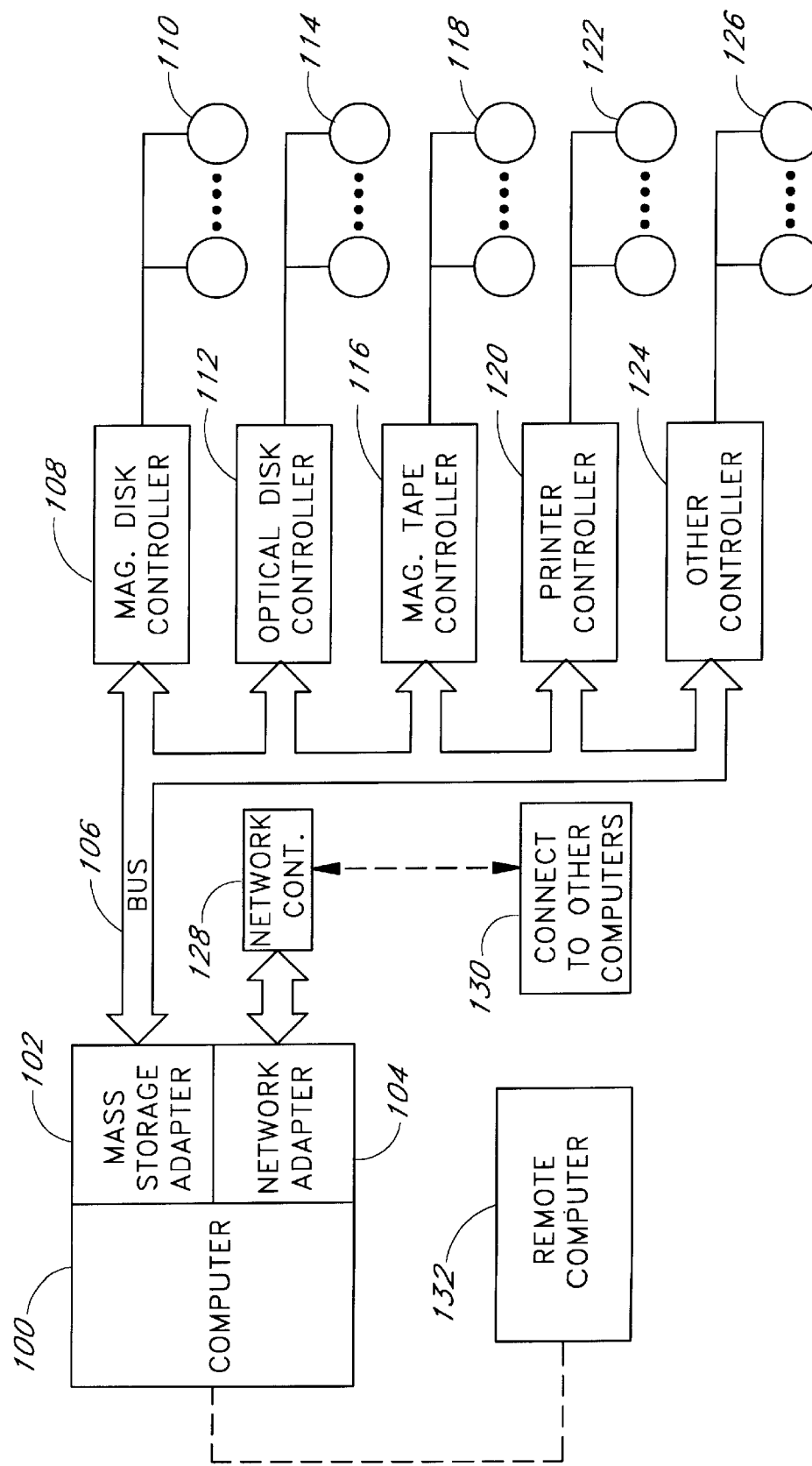
FIG. 1 is one embodiment of a top-level block diagram showing a fault tolerant computer system of the invention, including mass storage and network connections.

FIG. 1 is one embodiment of a block diagram showing a fault tolerant computer system of the present invention. Typically the computer system is one server in a network of servers and communicating with client computers. Such a configuration of computers is often referred to as a client-server architecture. A fault tolerant server is useful for mission critical applications such as the securities business where any computer down time can result in catastrophic financial consequences. A fault tolerant computer will allow for a fault to be isolated and not propagate through the system thus providing complete or minimal disruption to continuing operation. Fault tolerant systems also provide redundant components such as adapters so service can continue even when one component fails.

The system includes a fault tolerant computer system 100 connecting to external peripheral devices through high speed I/O channels 102 and 104. The peripheral devices communicate and are connected to the high speed I/O channels 102 and 104 by mass storage buses 106 and 107. In different embodiments of the invention, the bus system 106, 107 could be Peripheral Component Interconnect (PCI), Microchannel, Industrial Standard Architecture (ISA) and Extended ISA (EISA) architectures. In one embodiment of the invention, the buses 106, 107 are PCI. Various kinds of peripheral controllers 108, 112, 116, and 128, may be connected to the buses 106 and 107 including mass storage controllers, network adapters and communications adapters. Mass storage controllers attach to data storage devices such as magnetic disk, tape, optical disk, CD-ROM. These data storage devices connect to the mass storage controllers using one of a number of industry standard interconnects, such as small computer storage interface (SCSI), IDE, EIDE, SMD. Peripheral controllers and I/O devices are generally off-the-shelf products. For instance, sample vendors for a magnetic disk controller 108 and magnetic disks 110 include Qlogic, and Quantum (respectively). Each magnetic disk may hold multiple Gigabytes of data.

A client server computer system typically includes one or more network interface controllers (NICs) 112 and 128. The network interface controllers 112 and 128 allow digital communication between the fault tolerant computer system 100 and other computers (not shown) such as a network of servers via a connection 130. For LAN embodiments of the network adapter, the network media used may be, for example, Ethernet (IEEE 802.3), Token Ring (IEEE 802.5), Fiber Distributed Datalink Interface (FDDI) or Asynchronous Transfer Mode (ATM).

In the computer system 100, the high speed I/O channels, buses and controllers (102–128) may, for instance, be provided in pairs. In this example, if one of these should fail, another independent channel, bus or controller is available for use until the failed one is repaired.

In one embodiment of the invention, a remote computer 132 is connected to the fault tolerant computer system 100. The remote computer 132 provides some control over the fault tolerant computer system 100, such as requesting system status.

Figure 2:
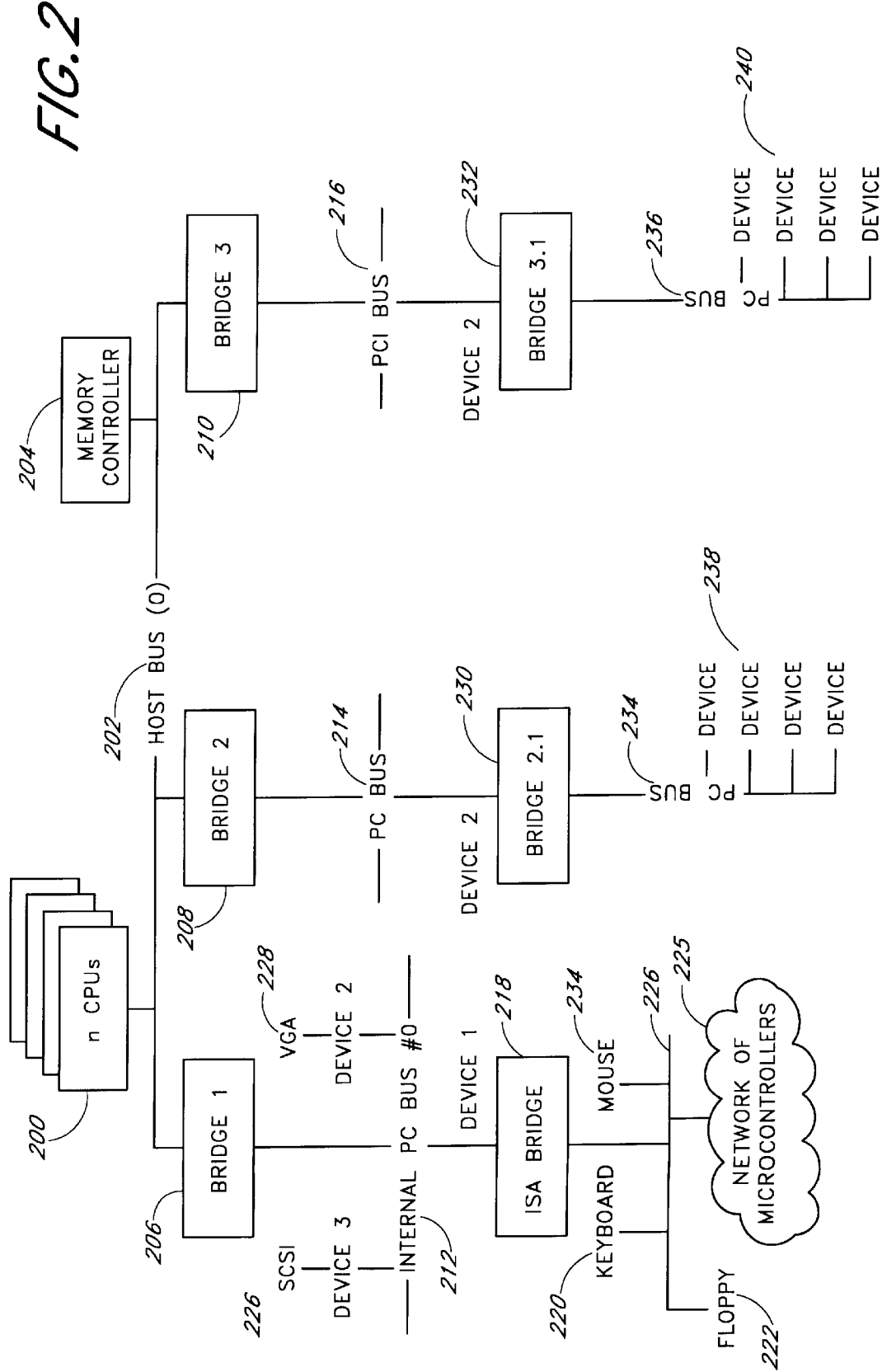
FIG. 2 is one embodiment of a block diagram showing a first embodiment of a multiple bus configuration connecting I/O adapters and a network of microcontrollers to the clustered CPUs of the fault tolerant computer system shown in FIG. 1.

FIG. 2 shows one embodiment of the bus structure of the fault tolerant computer system 100. A number 'n' of central processing units (CPUs) 200 are connected through a host bus 202 to a memory controller 204, which allows for access to semiconductor memory by the other system components. In one embodiment of the invention, there are four CPUs 200, each being an Intel Pentium® Pro microprocessor. A number of bridges 206, 208 and 210 connect the host bus to three additional bus systems 212, 214, and 216. These bridges correspond to high speed I/O channels 102 and 104 shown in FIG. 1. The buses 212, 214 and 216 correspond to the buses 106 and 107 shown in FIG. 1. The bus systems 212, 214 and 216, referred to as PC buses, may be any standards-based bus system such as PCI, ISA, EISA and Microchannel. In one embodiment of the invention, the bus systems 212, 214, 216 are PCI. In another embodiment of the invention a proprietary bus is used.

An ISA Bridge 218 is connected to the bus system 212 to support legacy devices such as a keyboard, one or more floppy disk drives and a mouse. A network of microcontrollers 225 is also interfaced to the ISA bus 226 to monitor and diagnose the environmental health of the fault tolerant system. Further discussion of the network will be provided below.

A bridge 230 and a bridge 232 connects PC buses 214 and 216 with PC buses 234 and 236 to provide expansion slots for peripheral devices or adapters. Separating the devices 238 and 240 on PC buses 234 and 236 reduces the potential that a device or other transient I/O error will bring the entire system down or stop the system administrator from communicating with the system.

Figure 3:
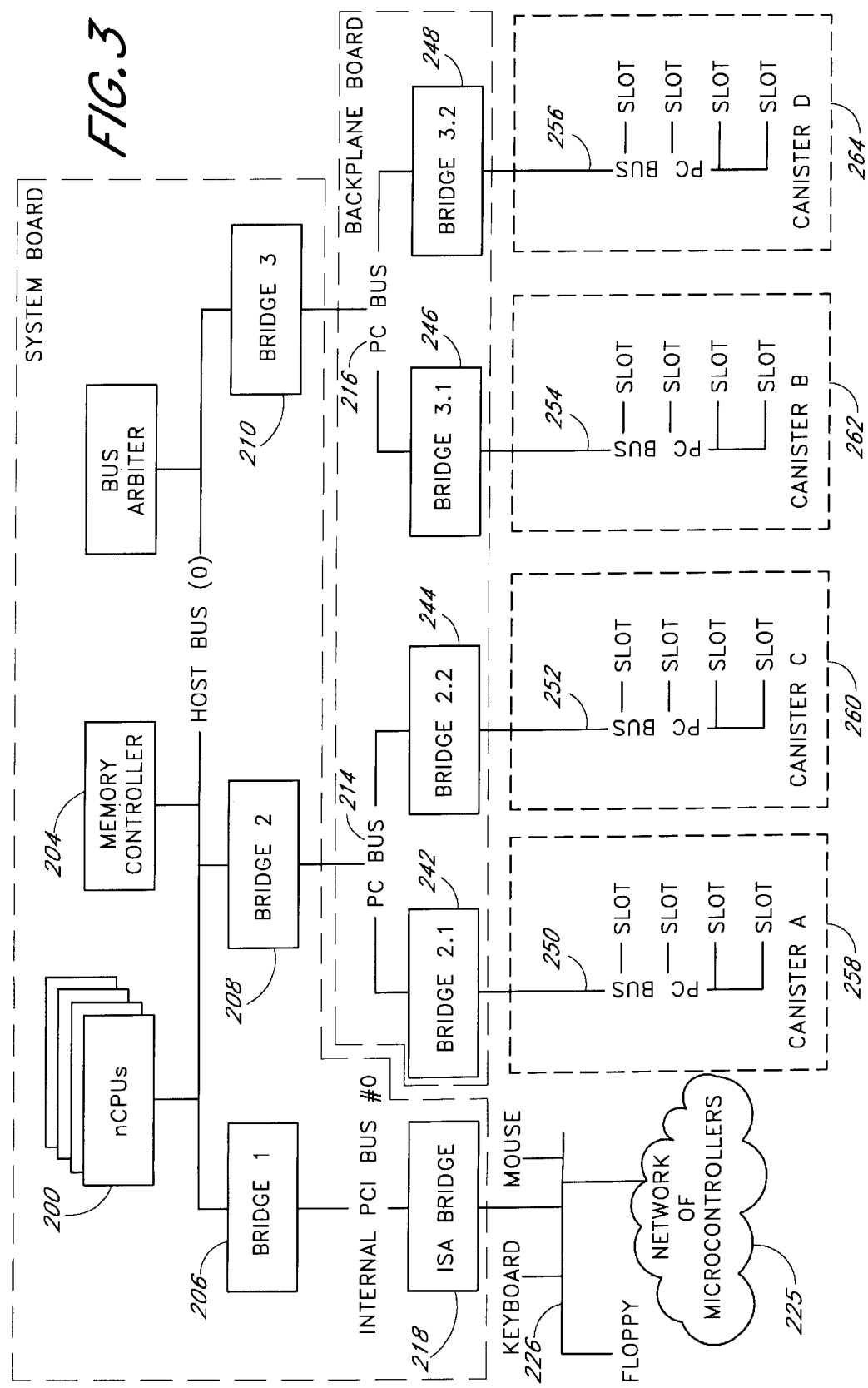
FIG. 3 is one embodiment of a block diagram showing a second embodiment of a multiple bus configuration connecting canisters containing I/O adapters and a network of microcontrollers to the clustered CPUs of the fault tolerant system shown in FIG. 1.

FIG. 3 shows an alternative bus structure embodiment of the fault tolerant computer system 100. The two PC buses 214 and 216 contain bridges 242, 244, 246 and 248 to PC bus systems 250, 252, 254, and 256. As with the PC buses 214 and 216, the PC buses 250, 252, 254 and 256 can be designed according to any type of bus architecture including PCI, ISA, EISA, and Microchannel. The PC buses 250, 252, 254, and 256 are connected, respectively, to a canister 258, 260, 262 and 264. The canisters 258, 260, 262, and 264 are casings for a detachable bus system and provide multiple slots for adapters. In the illustrated canister, there are four adapter slots.

Figure 4:
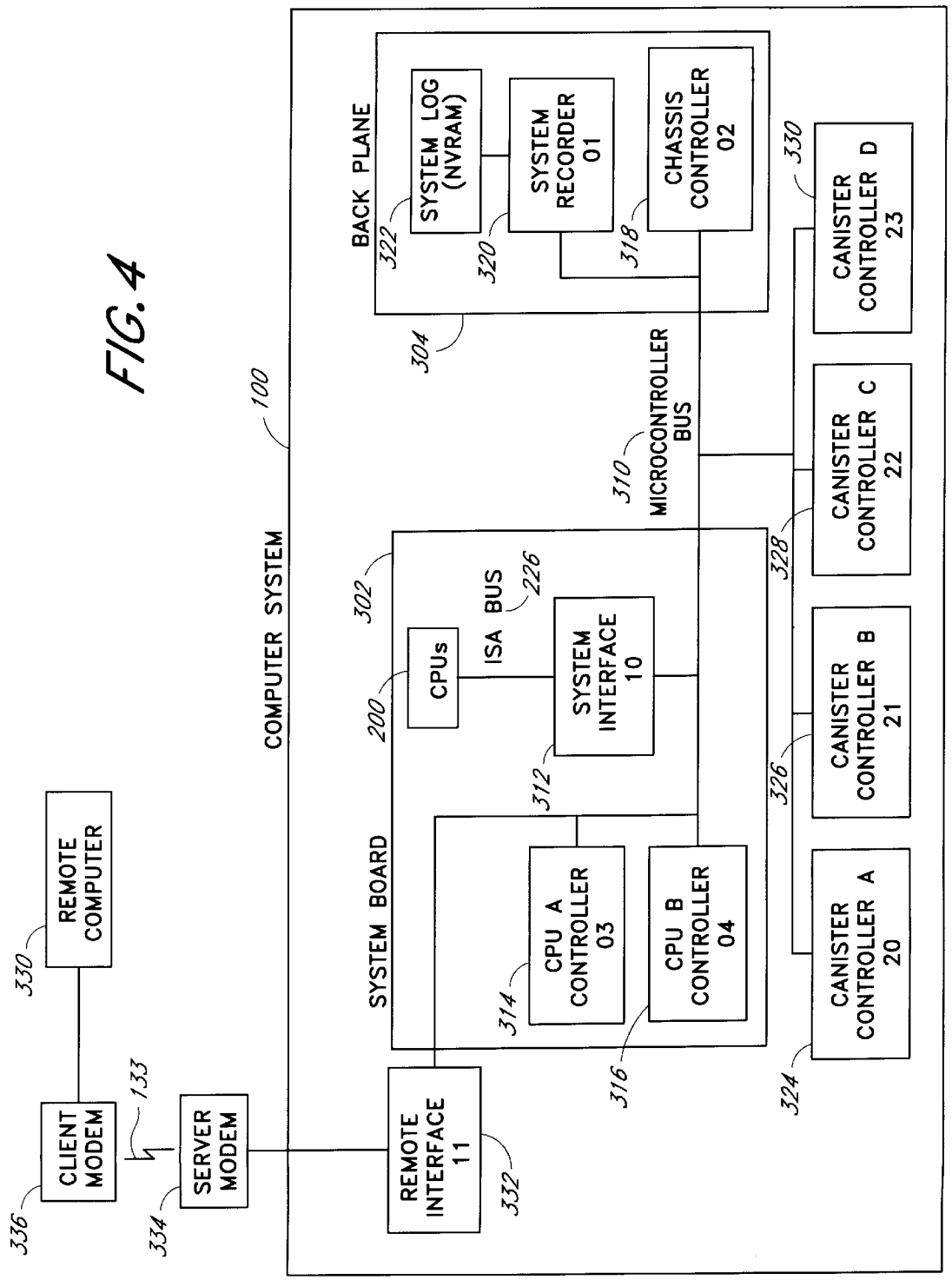
FIG. 4 is one embodiment of a top-level block diagram illustrating the microcontroller network shown in FIGS. 2 and 3.

Referring now to FIG. 4, the present invention for monitoring and diagnosing environmental conditions may be implemented by using a network of microcontrollers 225 located on the fault tolerant computer system 100. In one embodiment some of the microcontrollers are placed on a system board or motherboard 302 while other microcontrollers are placed on a backplane 304. Furthermore, in the embodiment of FIG. 3, some of the microcontrollers such as Canister controller A 324 may reside on a removable canister.

FIG. 4 illustrates that the network of microcontrollers 225 is connected to one of the CPUs 200 by an ISA bus 308. The ISA 308 bus interfaces the network of microcontrollers 225 which are connected on the microcontroller bus 310 through a System Interface 312. In one embodiment of the invention, the microcontrollers communicate through an I²C serial bus, also referred to as a microcontroller bus 310. The document "The I²C Bus and How to Use It" (Philips Semiconductor, 1992) is hereby incorporated by reference. The I²C bus is a bi-directional two-wire bus and operates at a 400 kbps rate in the present embodiment. However, other bus structures and protocols could be employed in connection with this invention. In other embodiments, IEEE 1394 (Firewire), IEEE 422, IEEE 488 (GPIB). RS-185, Apple ADB, Universal Serial Bus (USB), or Controller Area Network (CAN) could be utilized as the microcontroller bus. Control on the microcontroller bus is distributed. Each microcontroller can be a sender (a master) or a receiver (a slave) and each is interconnected by this bus. A microcontroller directly controls its own resources, and indirectly controls resources of other microcontrollers on the bus.

Here are some of the features of the I²C-bus:

Only two bus line are required: a serial data line (SDA) and a serial clock line (SCL).

Each device connected to the bus is software addressable by a unique address and simple master/slave relationships exist at all times; masters can operate as master-transmitters or as muter-receivers.

The bus is a true multi-master bus including collision detection and arbitration to prevent data corruption if two or more masters simultaneously initiate data transfer.

Serial, 8-bit oriented, bi-directional data transfers can be made at up to 400 kbit/second in the fast mode.

Two wires, serial data (SDA) and serial clock (SCL), carry information between the devices connected to the I²C bus. Each device is recognized by a unique address and can operate as either a transmitter or receiver, depending on the function of the device. Further, each device can operate from time to time as both a transmitter and a receiver. For example, a memory device connected to the I²C bus could both receive and transmit data. In addition to transmitters and receivers, devices can also be considered as masters or slaves when performing data transfers (see Table 1). A master is the device which initiates a data transfer on the bus and generates the clock signals to permit that transfer. At that time, any device addressed is considered a slave.

TABLE 1

Definition of I²C-bus terminology

| Term | Description |
| --- | --- |
| Transmitter | The device which sends the data to the bus |
| Receiver | The device which receives the data from the bus |
| Master | The device which initiates a transfer, generates clock signals and terminates a transfer |
| Slave | The device addressed by a master |
| Multi-master | More than one master can attempt to control the bus at the same time without corrupting the message. Each device at separate times may act as a master. |
| Arbitration | Procedure to ensure that, if more than one master simultaneously tries to control the bus, only one is allowed to do so and the message is not corrupted |
| Synchronization | Procedure to synchronize the clock signal of two or more devices |

The I²C-bus is a multi-master bus. This means that more than one device capable of controlling the bus can be connected to it. As masters are usually microcontrollers, consider the case of a data transfer between two microcontrollers connected to the I²C-bus. This highlights the master-slave and receiver-transmitter relationships to be found on the I²C-bus. It should be noted that these relationships are not permanent, but only depend on the direction of data transfer at that time. The transfer of data between microcontrollers is further described in FIG. 8.

The possibility of connecting more than one microcontroller to the I²C-bus means that more than one master could try to initiate a data transfer at the same time. To avoid the conflict that might ensue from such an event, an arbitration procedure has been developed. This procedure relies on the wired-AND connection of all I²C interfaces to the I²C-bus.

If two or more masters try to put information onto the bus, as long as they put the same information onto the bus, there is no problem. Each monitors the state of the SDL. If a microcontroller expects to find that the SDL is high, but finds that it is low, the microcontroller assumes it lost the arbitration and stops sending data. The clock signals during arbitration are a synchronized combination of the clocks generated by the masters the wired-AND connection to the SCL line.

Generation of clock signal on the I²C-bus is always the responsibility of master devices. Each master microcontroller generates its own clock signals when transferring data on the bus.

In one embodiment, the command, diagnostic, monitoring and history functions of the microcontroller network 102 are accessed using a global network memory and a protocol has been defined so that applications can access system resources without intimate knowledge of the underlying network of microcontrollers. That is, any function may be queried simply by generating a network "read" request targeted at the function's known global network address. In the same fashion, a function may be exercised simply by "writing" to its global network address. Any microcontroller may initiate read/write activity by sending a message on the I²C bus to the microcontroller responsible for the function (which can be determined from the known global address of the function). The network memory model includes typing information as part of the memory addressing information.

Referring to FIG. 4, in one embodiment of the invention, the network of microcontrollers 310 includes ten processors. One of the purposes of the microcontroller network 225 is to transfer messages to the other components of the server system 100. The processors or microcontrollers include: a System Interface 312, a CPU A controller 314, a CPU B controller 316, a System Recorder 320, a Chassis controller 318, a Canister A controller 324, a Canister B controller 326, a Canister C controller 328, a Canister D controller 330 and a Remote Interface controller 332. The System Interface controller 312, the CPU A controller 314 and the CPU B controller 316 are located on a system board 302 in the fault tolerant computer system 100. Also located on the system board are one or more central processing units (CPUs) or microprocessors 200 and the Industry Standard Architecture (ISA) bus 226 that connects to the System Interface Controller 312. The CPUs 200 may be any conventional general purpose single-chip or multi-chip microprocessor such as a Pentium 7, Pentium® Pro or Pentium® II processor available from Intel Corporation, A MIPS® processor available from Silicon Graphics, Inc., a SPARC processor from Sun Microsystems, Inc., a Power PC® processor available from Motorola, or an ALPHA® processor available from Digital Equipment Corporation. In addition, the CPUs 200 may be any conventional special purpose microprocessor such as a digital signal processor or a graphics processor.

The System Recorder 320 and Chassis controller 318, along with a data string such as a random access non-volatile access memory (NVRAM) 322 that connects to the System Recorder 320, are located on a backplane 304 of the fault tolerant computer system 100. The data storage 322 may be independently powered and may retain its contents when power is unavailable. The data storage 322 is used to log system status, so that when a failure of the computer 100 occurs, maintenance personnel can access the storage 322 and search for information about what component failed. An NVRAM is used for the data storage 322 in one embodiment but other embodiments may use other types and sizes of storage devices.

The System Recorder 320 and Chassis controller 318 are the first microcontrollers to power up when server power is applied. The System Recorder 320, the Chassis controller 318 and the Remote Interface microcontroller 332 are the three microcontrollers that have an independent bias 5 Volt power supplied to them if main server power is off. This independent bias 5 Volt power is provided by a Remote Interface Board (not shown). The Canister controllers 324–330 are not considered to be part of the backplane 304 because each is mounted on a card attached to the canister.

Figure 5A:
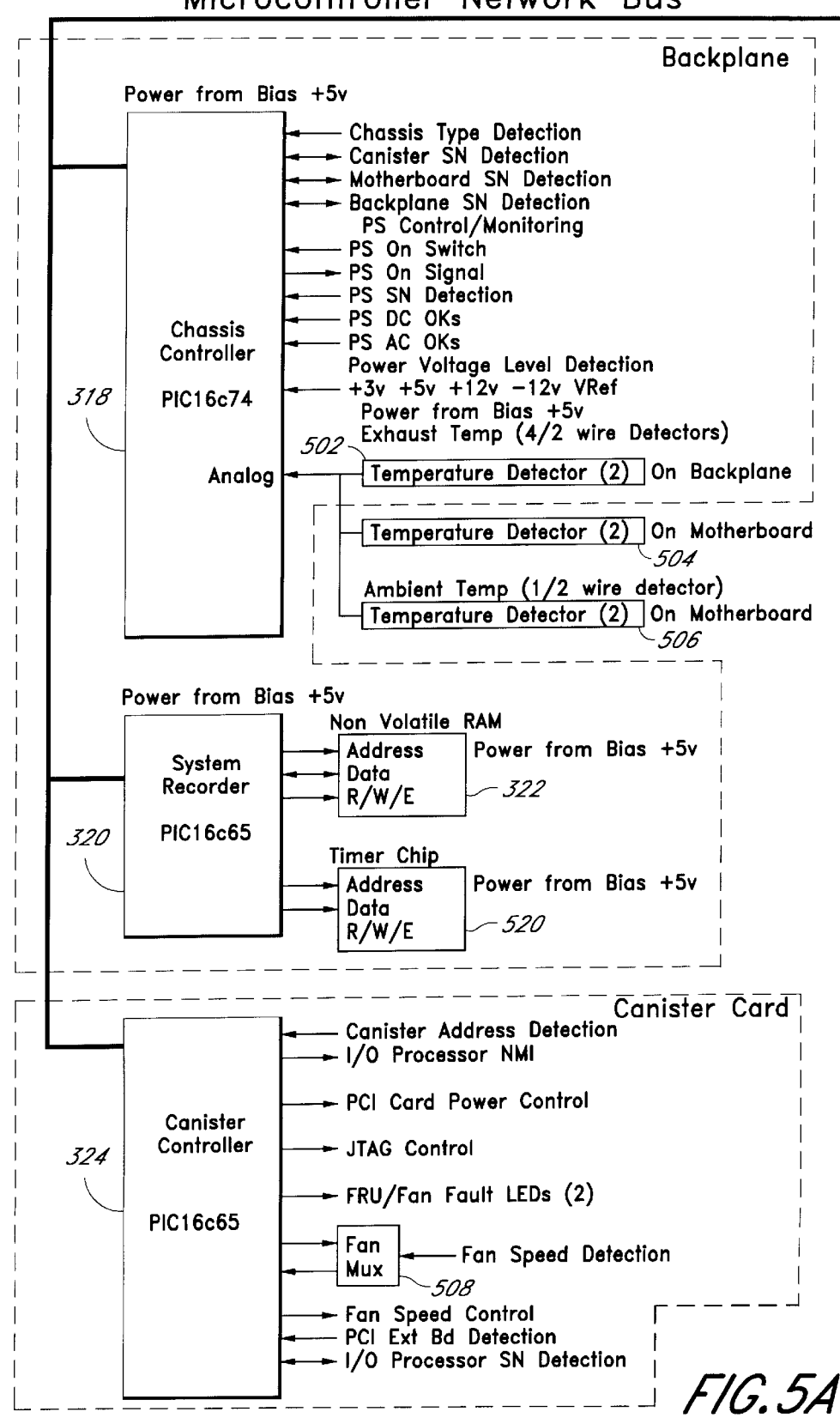
FIGS. 5A and 5B are detailed block diagrams showing one embodiment of the microcontroller network shown in FIG. 4 illustrating the signals and values monitored by each microcontroller, and the control signals generated by the microcontrollers.
Figure 5B:
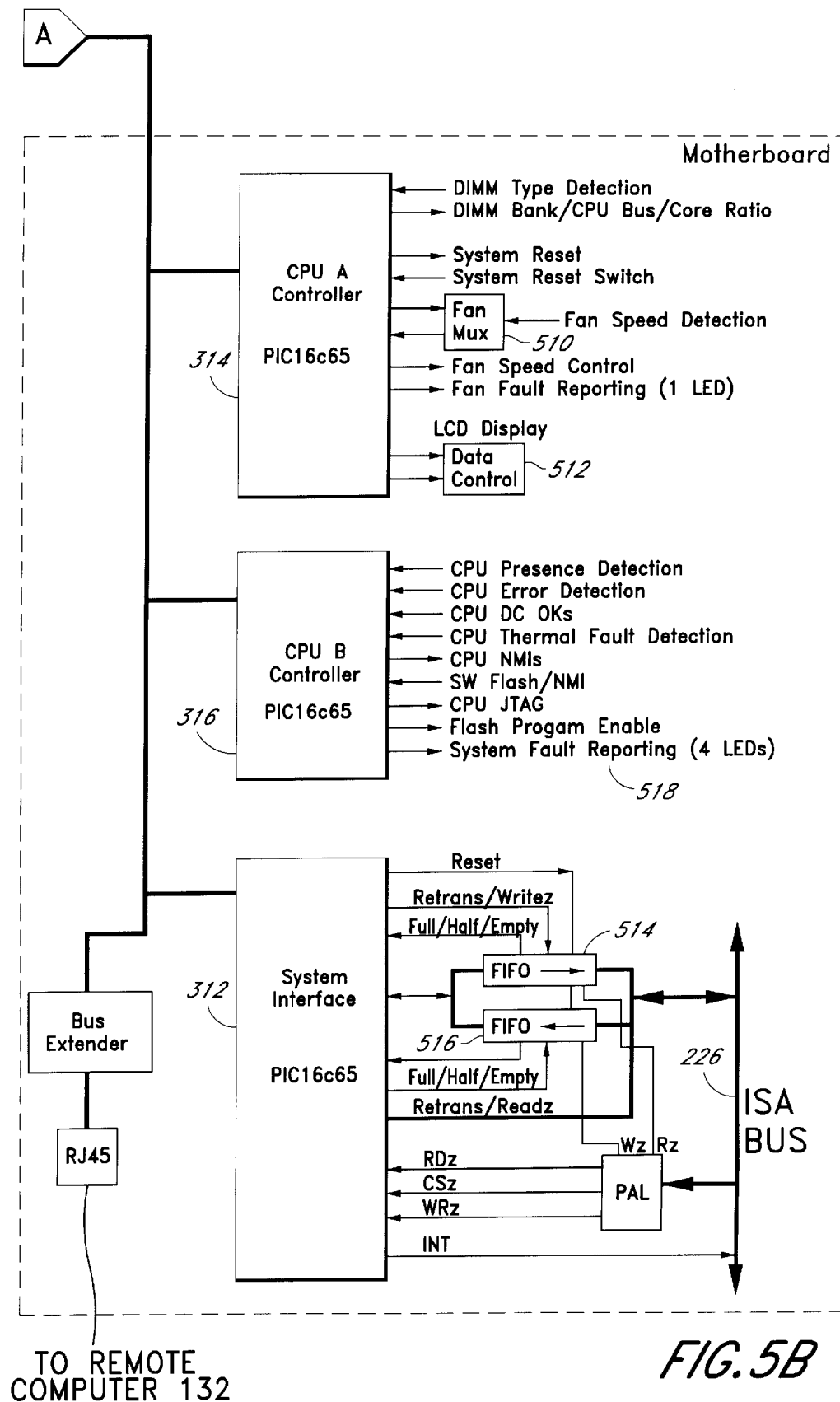

FIGS. 5A and 5B are one embodiment of a block diagram that illustrates some of the signal lines that are used by the different microcontrollers. Some of the signal lines connect to actuators and other signal lines connect to sensors. In one embodiment of the invention the microcontrollers in the network are commercially available microcontrollers. Examples of off-the-shelf microcontrollers are the PIC16c65 and the PIC16c74 available from Microchip Technology Inc, the 8051 from Intel Corporation, the 8751 available from Atmel, and a P80CL580 microprocessor available from Philips, could be utilized.

Figure 5C:
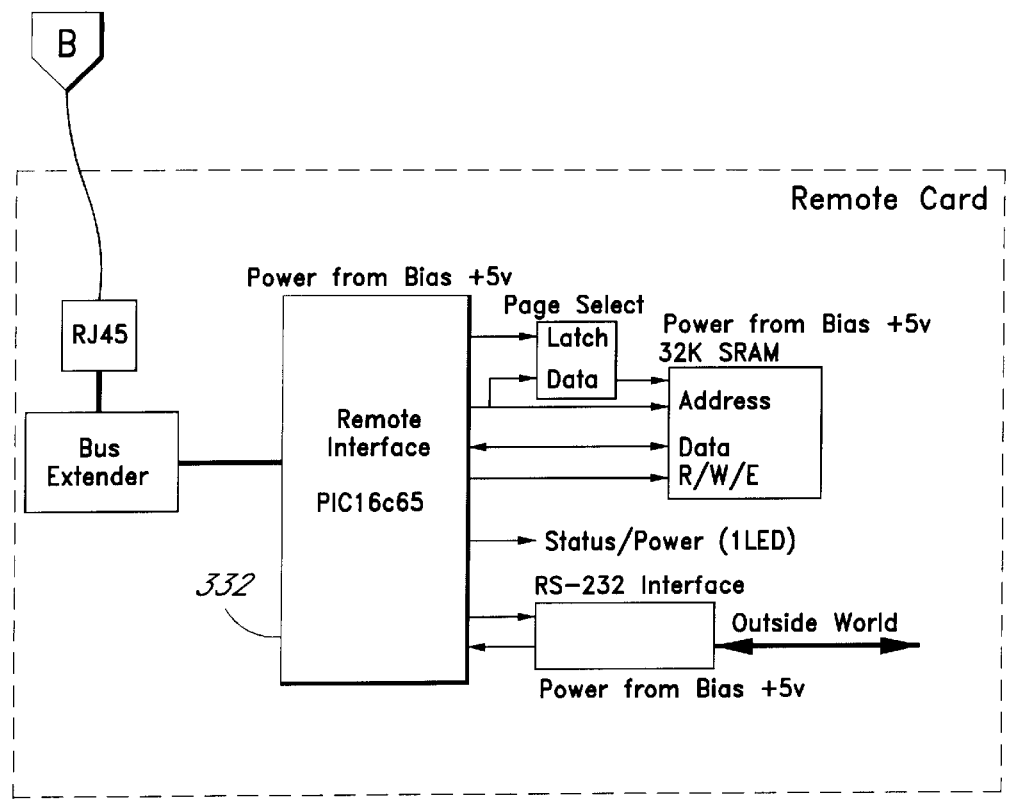

The Chassis controller 318 is connected to a set of temperature detectors 502, 504, and 506 which read the temperature on the backplane 304 and the system board 302. FIG. 5 also illustrates the signal lines that connect the System Recorder 320 to the NVRAM 322 and a timer chip 520. In one embodiment of the invention, the System Recorder 320 is the only microcontroller that can access the NVRAM 322. The Canister controller 324 is connected to a Fan Tachometer Signal Mux 508 which is used to detect the speed of the fans. The CPU A controller 314 also is connected to a fan mux 310 which gathers the fan speed of system fans. The CPU A controller 314 displays errors to a user by writing to an LCD display 512. Any microcontroller can request the CPU A controller 314 to write a message to the LCD display 512. The System Interface 312 is connected to a response buffer 514 which queues outgoing response signals in the order that they are received. Similarly, a request signal buffer 516 is connected to the System Interface 312 and stores, or queues request signals in the order that they are received.

Software applications can access the network of microcontrollers 225 by using the software program header file that is listed at the end of the specification in the section titled "Header File for Global Memory Addresses." This header file provides a global memory address for each function of the microcontroller network 225. By using the definitions provided by this header file, applications can request and send information to the microcontroller network 225 without needing to know where a particular sensor or activator resides in the microcontroller network.

Figure 6:
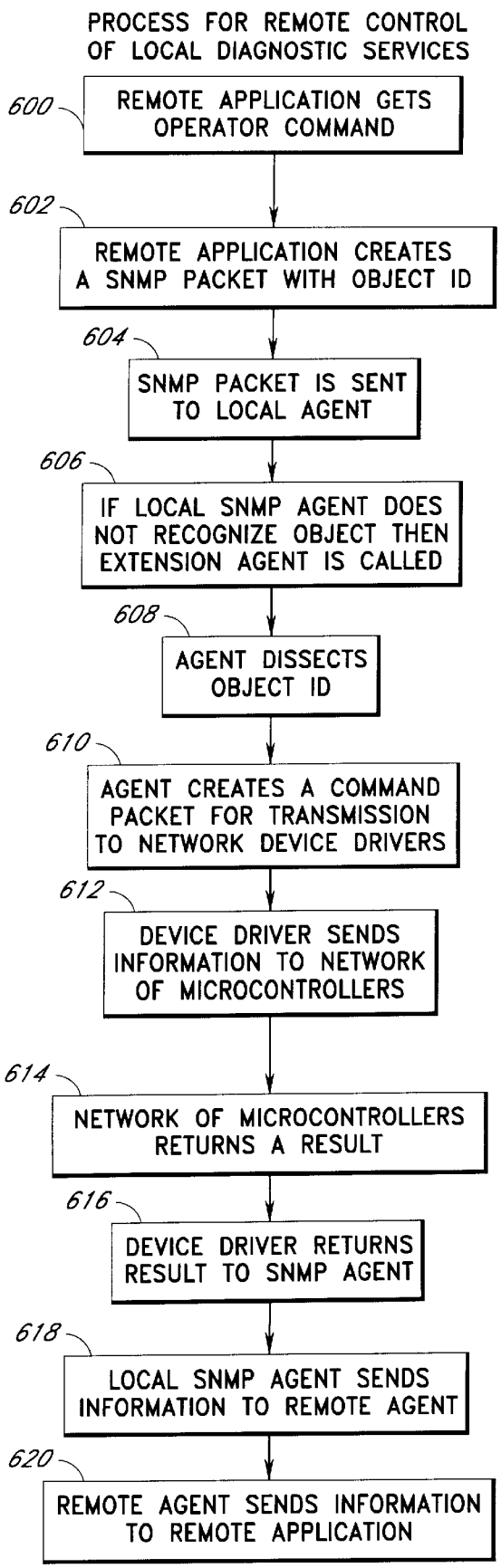
FIG. 6 is one embodiment of a flowchart showing the process by which a remote user can access diagnostic and managing services of the microcontroller network shown in FIGS. 4, 5A and 5B.

FIG. 6 is one embodiment of a flowchart illustrating the process by which under one implementation of the present invention, a remote application connected, say, through the connection of FIG. 1, can access the network of microcontrollers 225. Starting at state 600, a remote software application, such as a generic system management application like Hewlett-Packard Open View, or an application specific to this computer system, retrieves a management information block (MIB) object by reading and interpreting a MIB file, or by an application's implicit knowledge of the MIB object's structure. This retrieval could be the result of an operator using a graphical user interface (GUI), or as the result of some automatic system management process. The MIB is a description of objects, which have a standard structure, and contain information specific to the MIB object ID associated with a particular MIB object. At a block 602, the remote application builds a request for information by creating a request which references a particular MIB object by its object ID, sends the request to the target computer using a protocol called SNMP (simple network management protocol). SNMP is a type of TCP/IP protocol. Moving to state 604, the remote software sends the SNMP packet to a local agent Microsoft WinSNMP, for example, which is running on the fault tolerant computer system 100, which includes the network of microcontrollers 225 (FIG. 4). The agent is a specialized program which can interpret MIB object IDs and objects. The local agent software runs on one of the CPUs 200 of FIGS. 2 and 3.

The local agent examines the SNMP request packet (state 606). If the local agent does not recognize the request, the local agent passes the SNMP packet to an extension SNMP agent. Proceeding to state 608, the extension SNMP agent dissects the object ID. The extension SNMP agent is coded to recognize from the object ID, which memory mapped resources managed by the network of microcontrollers need to be accessed (state 608). The agent then builds the required requests for the memory mapped information in the command protocol format understood by the network of microcontrollers 225. The agent then forwards the request to a microcontroller network device driver (state 610).

The device driver then sends the information to the network of microcontrollers 225 at state 612. The network of microcontrollers 225 provides a result to the device driver in state 614. The result is returned to the extension agent, which uses the information to build the MIB object, and return it to the SNMNP agent (state 616). The local SNMP agent forwards the MIB object via SNMFP to the remote agent (state 616). Finally, in state 620, the remote agent forwards the result to the remote application software.

For example, if a remote application needs to know the speed of a fan, the remote application reads a file to find the object ID for fan speed. The object ID for the fan speed request may be "837.2.3.6.2". Each set of numbers in the object ID represent hierarchical groups of data. For example the number "3" of the object ID represents the cooling system. The "3.6" portion of the object ID represents the fans in the cooling. All three numbers "3.6.2" indicate speed for a particular fan in a particular cooling group.

In this example, the remote application creates a SNMP packet containing the object ID to get the fan speed on the computer 100. The remote application then sends the SNMP packet to the local agent. Since the local agent does not recognize the fan speed object ID, the local agent forwards the SNMP packet to the extension agent. The extension agent parses the object ID to identify which specific memory mapped resources of the network of microcontrollers 225 are needed to build the MIB object whose object ID was just parsed. The extension agent then creates a message in the command protocol required by the network of microcontrollers 225. A device driver which knows how to communicate requests to the network of microcontrollers 225 takes this message and relays the command to the network of microcontrollers 225. Once the network of microcontrollers 225 finds the fan speed, it relays the results to the device driver. The device driver passes the information to the extension agent. The agent takes the information supplied by the microcontroller network device driver and creates a new SNMP packet. The local agent forwards this packet to the remote agent, which then relays the fan speed which is contained in the packet to the remote application program.

Figure 7:
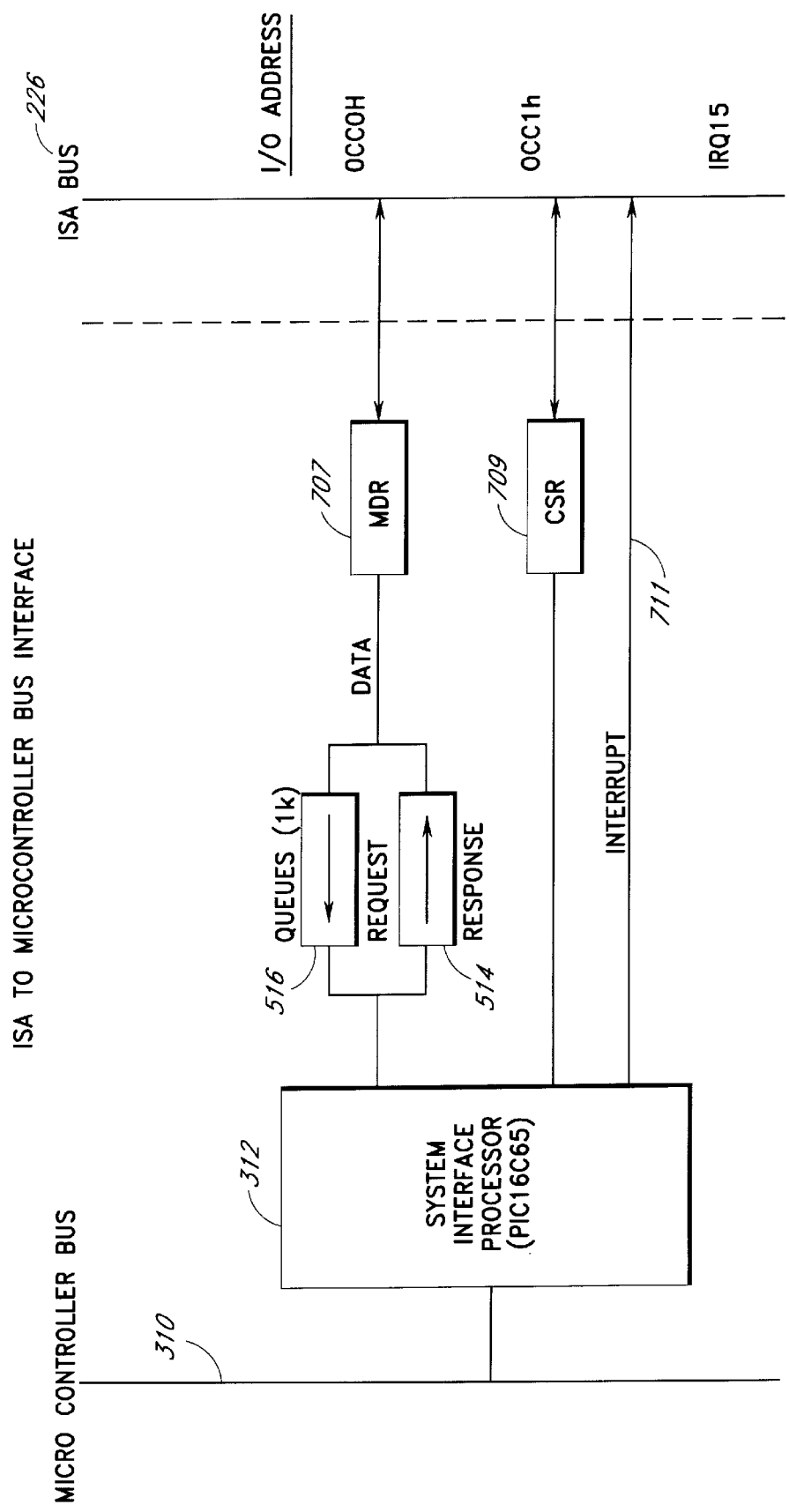
FIG. 7 is one embodiment of a block diagram showing the connection of an industry standard architecture (ISA) bus to the microcontroller network shown in FIGS. 4, 5A and 5B.

FIG. 7 is one embodiment of a block diagram of the interface between the network of microcontrollers 225 and the ISA bus 226 of FIGS. 2 and 3. The interface to the network of microcontrollers 225 includes a System Interface processor 312 which receives event and request signals, processes these signals, and transmits command, status and response signals to the operating system of the CPUs 200. In one embodiment, the System Interface processor 312 is a PIC16C65 controller chip, available from Microchip, Technology Inc., which includes an event memory (not shown) organized as a bit vector, having at least sixteen bits. Each bit in the bit vector represents a particular type of event. Writing an event to the System Interface processor 312 sets a bit in the bit vector that represents the event. Upon receiving an event signal from another microcontroller, the System Interface 312 interrupts CPUs 200. Upon receiving the interrupt, the CPUs 200 will check the status of the System Interface 312 to ascertain that an event is pending. Alternatively, the CPUs 200 may periodically poll the status of the System Interface 312 to ascertain whether an event is pending. The CPUs 200 may then read the bit vector in the System Interface 312 to ascertain the type of event that occurred and thereafter notify a system operator of the event by displaying an event message on a monitor connected to the fault tolerant computer 100 or another computer in the server network. After the system operator has been notified of the event, as described above, she may then obtain further information about the system failure which generated the event signal by accessing the NVRAM 322.

The System Interface 312 communicates with the CPUs 200 by receiving request signals from the CPUs 200 and sending response signals back to the CPUs 200. Furthermore, the System Interface 312 can send and receive status and command signals to and from the CPUs 200. For example, a request signal may be sent from a software application inquiring as to whether the System Interface 312 has received any event signals, or inquiring as to the status of a particular processor, subsystem, operating parameter. The following discussion explains how in further detail at the state 612, the device driver sends the request to the network of microcontrollers, and then, how the network of microcontrollers returns the result (state 614). A request signal buffer 516 is connected to the System Interface 312 and stores, or queues, request signals in the order that they are received, first in-first out (FIFO). Similarly, a response buffer 514 is connected to the System Interface 312 and queues outgoing response signals in the order that they are received (FIFO). These queues are one byte wide, (messages on the I²C bus are sequences of 8-bit bytes, transmitted bit serially on the SDL).

A message data register (MDR) 707 is connected to the request and response buffers 516 and 514 and controls the arbitration of messages to and from the System Interface 312 via the request and response buffers 516 and 514. In one embodiment, the MDR 707 is eight bits wide and has a fixed address which may be accessed by the server's operating system via the ISA bus 226 connected to the MDR 707. As shown in FIG. 7, the MDR 707 has an I/O address of 0CC0h. When software application running on one of the CPUs 200 desires to send a request signal to the System Interface 312, it does so by writing a message one byte at a time to the MDR 707. The application then indicates to the system interface processor 312 that the command has been completely written, and may be processed.

The system interface processor 312 writes the response one byte at a time to the response queue, then indicates to the CPU (via an interrupt or a bit in the status register) that the response is complete, and ready to be read. The CPU 200 then reads the response queue one byte at a time by reading the MDR 707 until all bytes of the response are read.

The following is one embodiment of the command protocol used to communicate with the network of microcontrollers 225.

TABLE 2

Command Protocol Format

READ REQUEST FORMAT

| Offset | | |
|---|---|---|
| Byte 0 | Slave Addr (7 bits) | 0 LSBit |
| Byte 1 | MSBit (1) | Type |
| Byte 2 | | Command ID (LSB) |
| Byte 3 | | Command ID (MSB) |
| Byte 4 | | Read Request Length |
| Byte 5 | | Check Sum |

READ RESPONSE FORMAT

| Offset | | |
|---|---|---|
| Byte 0 | Slave Addr (7 bits) | 1 LSBit |
| Byte 1 | | Read Response Length (N) |
| Byte 2 | | Data Byte 1 |
| . | | . |
| . | | . |
| Byte N + 1 | | Data Byte N |
| Byte N + 2 | | Status |
| Byte N + 3 | | Check Sum |
| Byte N + 4 | | Inverted Slave Addr |

WRITE REQUEST FORMAT

| Offset | | |
|---|---|---|
| Byte 0 | Slave Addr (7 bits) | 0 LSBit |
| Byte 1 | MSBit (0) | Type |
| Byte 2 | | Command ID (LSB) |
| Byte 3 | | Command ID (MSB) |
| Byte 4 | | Write Request Length (N) |
| Byte 5 | | Data Byte 1 |
| . | | . |
| . | | . |
| Byte N + 4 | | Data Byte N |
| Byte N + 5 | | Check Sum |

WRITE RESPONSE FORMAT

| Offset | | |
|---|---|---|
| Byte 0 | Slave Addr (7 bits) | 1 LSBit |
| Byte 1 | | Write Response Length (0) |
| Byte 2 | | Status |
| Byte 3 | | Check Sum |
| Byte 4 | | Inverted Slave Addr |

The following is a description of each of the fields in the command protocol.

TABLE 3

Description of Command Protocol Fields

| FIELD | DESCRIPTION |
|---|---|
| Slave Addr | Specifies the processor identification code. This field is 7 bits wide. Bit [7 . . . 1]. |
| LSBit | Specifies what type of activity is taking place. If LSBit is clear (0), the master is writing to a slave. If LSBit is set (1), the master is reading from a slave. |
| MSBit | Specifies the type of command. It is bit 7 of byte 1 of a request. If this bit is clear (0), this is a write command. If it is set (1), this is a read command. |
| Type | Specifies the data type of this command, such as bit or string. |
| Command ID (LSB) | Specifies the least significant byte of the address of the processor. |
| Command ID (MSB) | Specifies the most significant byte of the address of the processor. |
| Length (N) Read Request | Specifies the length of the data that the master expects to get back from a read response. The length, which is in bytes, does not include the Status, Check Sum, and Inverted Slave Addr fields. |
| Read Response | Specifies the length of the data immediately following this byte, that is byte 2 through byte N + 1. The length, which is in bytes, does not include the Status, Check Sum, and Inverted Slave Addr fields. |
| Write Request | Specifies the length of the data immediately following this byte, that is byte 2 through byte N + 1. The length, which is in bytes, does not include the Status, Check Sum, and Inverted Slave Addr fields. |
| Write Response | Always specified as 0. |
| Data Byte 1 | Specifies the data in a read request and response, and a write request. |
| Data Byte N | |
| Status | Specifies whether or not this command executes successfully. A non-zero entry indicates a failure. |
| Check Sum | Specifies a direction control byte to ensure the integrity of a message on the wire. |
| Inverted Slave Addr | Specifies the Slave Addr, which is inverted. |

The System Interface 312 further includes a command and status register (CSR) 709 which initiates operations and reports on status. The operation and functionality of CSR 709 is described in further detail below. Both synchronous and asynchronous I/O modes are provided by the System Interface 312. During a synchronous mode of operation, the device driver waits for a request to be completed. During an asynchronous mode of operation the device driver sends the request, and asks to be interrupted when the request completes. To support asynchronous operations, an interrupt line 711 is connected between the System Interface 312 and the ISA bus 226 and provides the ability to request an interrupt when asynchronous I/O is complete, or when an event occurs while the interrupt is enabled. As shown in FIG. 7, in one embodiment, the address of the interrupt line 711 is fixed and indicated as IRQ 15 which is an interrupt address number used specifically for the ISA bus 226.

The MDR 707 and the request and response buffers 516 and 514, respectively, transfer messages between a software application running on the CPUs 200 and the failure reporting system of the invention. The buffers 516 and 514 have two functions: (1) they store data in situations where one bus is running faster than the other, i.e., the different clock rates, between the ISA bus 226 and the microcontroller bus 310; and (2) they serve as interim buffers for the transfer of messages—this relieves the System Interface 312 of having to provide this buffer.

When the MDR 707 is written to by the ISA bus 226, it loads a byte into the request buffer 226. When the MDR 707 is read from the ISA bus 516, it unloads a byte from the response buffer 514. The System Interface 312 reads and executes messages from buffer 516 when a message command is received in the CSR 709. A response message is written to the response buffer 514 when the System Interface 312 completes executing the command. The system operator receives a completed message over the microcontroller bus 310. A software application can read and write message data to and from the buffers 516 and 514 by executing read and write instructions through the MDR 707.

The CSR 709 has two functions. The first is to initiate commands, and the second is to report status. The System Interface commands are usually executed synchronously. That is, after issuing a command, the microcontroller network device driver should continue to poll the CSR 709 status to confirm command completion. In addition to synchronous I/O mode, the microcontroller network device driver can also request an asynchronous I/O mode for each command by setting a "Asyn Req" bit in the command. In this mode, an interrupt is generated and sent to the ISA bus 226, via the interrupt line 711, after the command has completed executing.

In the described embodiment, the interrupt is asserted through IRQ15 of the ISA programmable interrupt controller (PIC). The ISA PIC interrupts the CPU 200s when a signal transitioning from high to low, or from low to high, is detected at the proper input pin (edge triggered). Alternatively, the interrupt line 711 may utilize connect to a level-triggered input. A level-triggered interrupt request is recognized by keeping the signal at the same level, or changing the level of a signal, to send an interrupt. The microcontroller network device driver can either enable or disable interrupts by sending "Enable Ints" and "Disable Ints" commands to the CSR 719. If the interrupt 711 line is enabled, the System Interface 312 asserts the interrupt signal IRQ15 of the PIC to the ISA bus 226, either when an asynchronous I/O is complete or when an event has been detected.

In the embodiment shown in FIG. 2, the System Interface 312 may be a single-threaded interface. Since messages are first stored in the queue, then retrieved from the queue by the other side of the interface, a device driver should write one message, containing a sequence of bytes, at a time. Thus, only one message should be in progress at a time using the System Interface 312. Therefore, a program or application must allocate the System Interface 312 for its use before using it, and then de-allocate the interface 514 when its operation is complete. The CSR 709 indicates which operator is allocated access to the System Interface 312.

Referring to FIGS. 3 and 7, an example of how messages are communicated between the System Interface 312 and CPUs 200 in one embodiment of the invention is as follows (all byte values are provided in hexadecimal numbering). A system management program (not shown) sends a command to the network of microcontrollers 225 to check temperature and fan speed. To read the temperature from CPU A controller 314 the program builds a message for the device driver to forward to the network of microcontrollers 225. First, the device driver on CPUs 200 allocates the interface by writing the byte "01" to the CSR 709. If another request was received, the requester would have to wait until the previous request was completed. To read the temperature from Chassis controller 318 the device driver would write into the request queue 516 through the MDR 707 the bytes "02 83 03 00 FF". The first byte "02" would signify to the System Interface 312 that a command is intended for the Chassis controller 318. The first bits of the second byte "83" indicates that a master is writing to a slave. The last or least significant three bits of the byte "83" indicate the data type of the request. The third and fourth bytes "03 00" indicate that the read request temperature function of the Chassis controller 318 is being requested. The final byte "FF" is the checksum.

After writing the bytes to the MDR 707, a "13" (message command) is written by the device driver to the CSR 709, indicating the command is ready to be executed. The System Interface processor 312 passes the message bytes to the microcontroller bus 310, receives a response, and puts the bytes into the response FIFO 514. Since there is only one system interface processor 312, there is no chance that message bytes will get intermingled.

After all bytes are written to the response FIFO, the System Interface processor 312 sets a bit in the CSR 709 indicating message completion. If directed to do so by the device driver, the system interface 312 asserts an interrupt on IRQ 15 upon completion of the task.

The CPUs 200 would then read from the response buffer 516 through the MDR 707 the bytes "02 05 27 3C 27 26 27 00". The first byte in the string is the slave address shown as Byte 0 in the Read Response Format. The first byte 02 indicates that the CPU A Chassis controller 318 was the originator of the message. The second byte "05" indicates the number of temperature readings that follow. The second Byte "05" maps to Byte 1 of the Read Response Format. In this example, the Chassis controller 318 returned five temperatures. The second reading, byte "3C" (60 decimal) is above normal operational values. The last byte "00" is a check sum which is used to ensure the integrity of a message.

The CPUs 200 agent and device driver requests the fan speed by writing the bytes "03 83 04 00 FF" to the network of microcontroller 225. Each byte follows the read request format specified in Table 2. The first byte "03" indicates that the command is for the CPU A Controller 314. The second byte "83" indicates that the command is a read request of a string data type.

A response of "03 06 41 43 41 42 41 40 00" would be read from MDR 707 by the device driver. The first byte "03" indicates to the device driver that the command is from the CPU A controller 314. The speed bytes "41 43 41 42 41 40" indicate the revolutions per second of a fan in hexadecimal. The last byte read from the MDR 707 "00" is the checksum.

Since one of the temperatures is higher than the warning threshold, 55° C., and fan speed is within normal (low) range, a system administrator or system management software may set the fan speed to high with the command bytes "03 01 01 00 01 01 FF". The command byte "03" indicates that the command is for the CPU A 314. The first byte indicates that a write command is requested. The third and fourth bytes, which correspond to byte 2 and 3 of the write request format, indicate a request to increase the fan speed. The fifth byte, which corresponds to byte 4 of the write request format indicates to the System Interface 312 that one byte is being sent. The sixth byte contains the data that is being sent. The last byte "FF" is the checksum.

Figure 8:
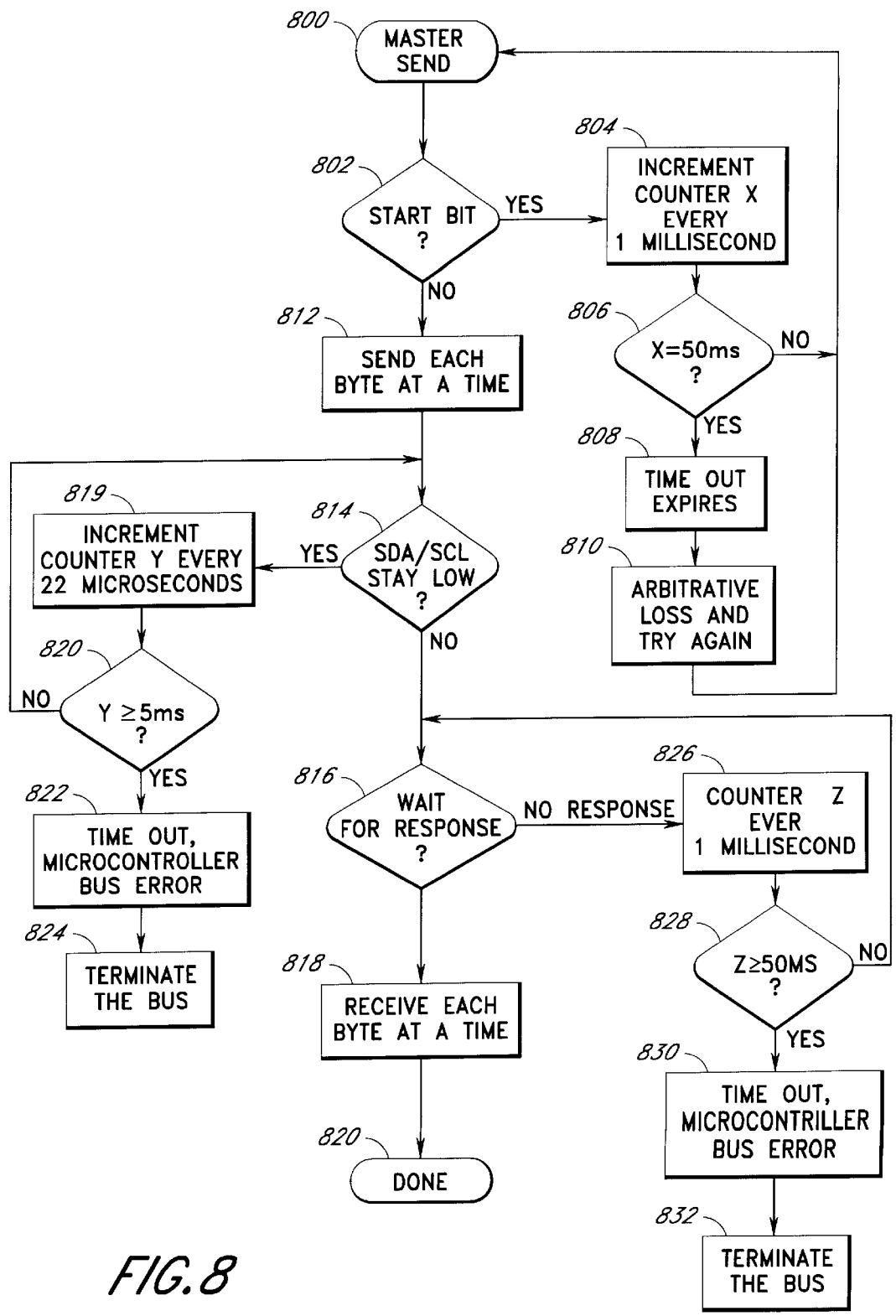
FIG. 8 is one embodiment of a flowchart showing the master to slave communications of the microcontrollers shown in FIGS. 4, 5A and 5B.

FIG. 8 is one embodiment of a flowchart describing the process by which a master microcontroller communicates with a slave microcontroller. Messages between microcontrollers can be initiated by any microcontroller on the microcontroller bus 310 (FIG. 4). A master microcontroller starts out in state 800.

In state 802, the microcontroller arbitrates for the start bit. If a microcontroller sees a start bit on the microcontroller bus 310, it cannot gain control of the microcontroller bus 310. The master microcontroller proceeds to state 804. In the state 804, the microcontroller increments a counter every millisecond. The microcontroller then returns to state 800 to arbitrate again for the start bit. If at state 806 the count reaches 50 ms, the master has failed to gain the bus (states 808 and 810). The microcontroller then returns to the state 800 to retry the arbitration process.

If in the state 802, no start bit is seen on the microcontroller bus 310, the microcontroller bus 310 is assumed to be free (i.e., the microcontroller has successfully arbitrated won arbitration for the microcontroller bus 310). The microcontroller sends a byte at a time on the microcontroller bus 310 (state 812). After the microcontroller has sent each byte, the microcontroller queries the microcontroller bus 310 to insure that the microcontroller bus 310 is still functional. If the SDA and SCL lines of the microcontroller bus 310 are not low, the microcontroller is sure that the microcontroller bus 310 is functional and proceeds to state 816. If the SDA and SCL lines are not drawn high, then the microcontroller starts to poll the microcontroller bus 310 to see if it is functional. Moving to state 819, the microcontroller increments a counter Y and waits every 22 microseconds. If the counter Y is less than five milliseconds (state 820), the state 814 is reentered and the microcontroller bus 310 is checked again. If the SDA and SCL lines are low for 5 milliseconds (indicated when, at state 820, the counter Y exceeds 5 milliseconds), the microcontroller enters state 822 and assumes there is a microcontroller bus error. The microcontroller then terminates its control of the microcontroller bus 310 (state 824).

If in the state 814, the SDA/SCL lines do not stay low (state 816), the master microcontroller waits for a response from a slave microcontroller (state 816). If the master microcontroller has not received a response, the microcontroller enters state 826. The microcontroller starts a counter which is incremented every one millisecond. Moving to state 828, if the counter reaches fifty milliseconds, the microcontroller enters state 830 indicating a microcontroller bus error. The microcontroller then resets the microcontroller bus 310 (state 832).

Returning to state 816, if the master microcontroller does receive a response in state 816, the microcontroller enters state 818 and receives the data from the slave microcontroller. At state 820, the master microcontroller is finished communicating with the slave microcontroller.

Figure 9:
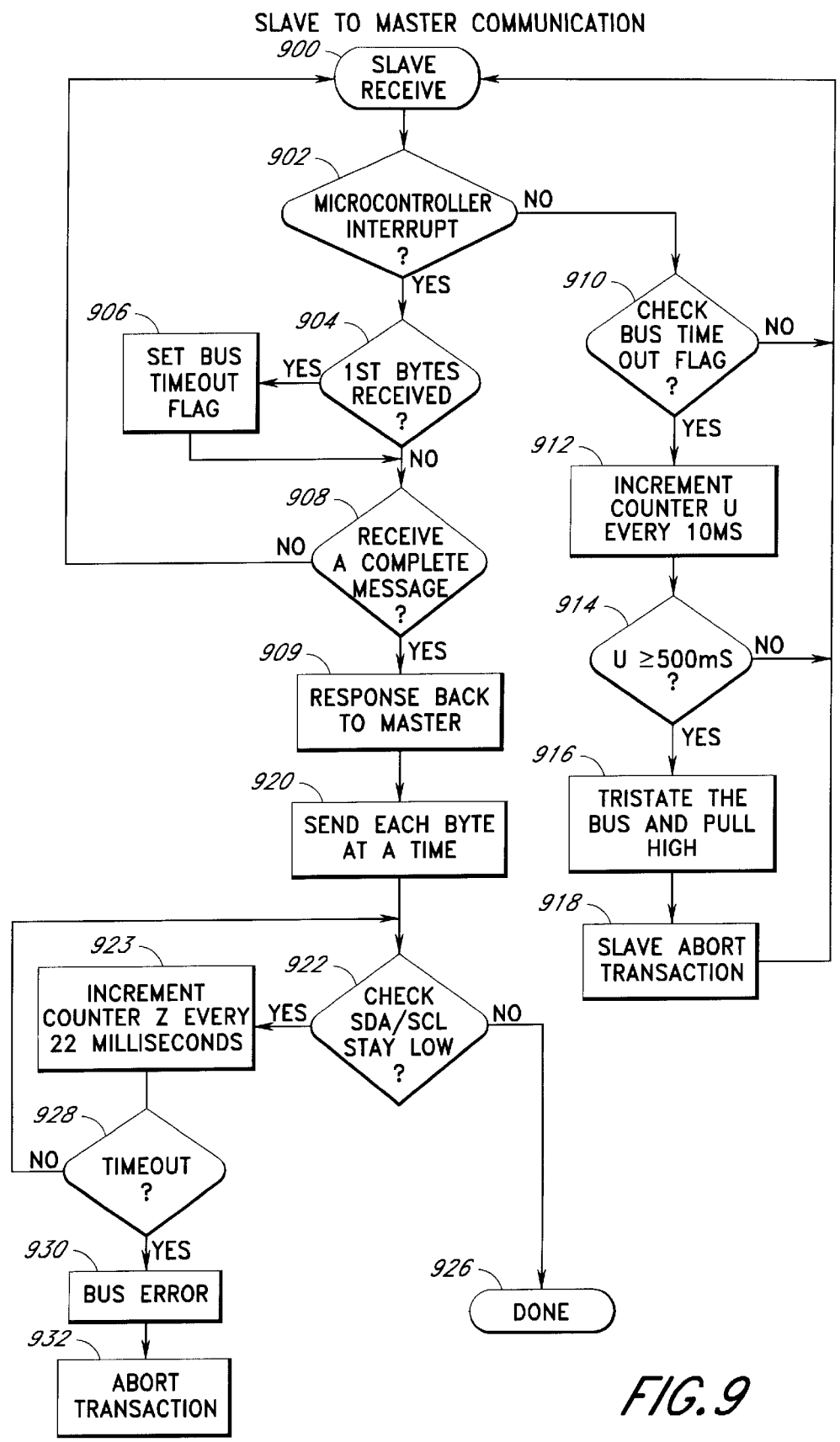
FIG. 9 is one embodiment of a flowchart showing the slave to master communications of the microcontrollers shown in FIGS. 4, 5A and 5B.

FIG. 9 is one embodiment of a block diagram illustrating the process by which a slave microcontroller communicates with a master microcontroller. Starting in state 900, the slave microcontroller receives a byte from a master microcontroller. The first byte of an incoming message always contains the slave address. This slave address is checked by all of the microcontrollers on the microcontroller bus 310. Whichever microcontroller matches the slave address to its own address handles the request.

At a decision state 902, an interrupt is generated on the slave microcontroller. The microcontroller checks if the byte received is the first received from the master microcontroller (state 904). If the current byte received is the first byte received, the slave microcontroller sets a bus time-out flag (state 906). Otherwise, the slave microcontroller proceeds to check if the message is complete (state 908). If the message is incomplete, the microcontroller proceeds to the state 900 to receive the remainder of bytes from the master microcontroller. If at state 908, the slave microcontroller determines that the complete message has been received, the microcontroller proceeds to state 909.

Once the microcontroller has received the first byte, the microcontroller will continue to check if there is an interrupt on the microcontroller bus 310. If no interrupt is posted on the microcontroller bus 310, the slave microcontroller will check to see if the bus time-out flag is set. The bus time-out flag is set once a byte has been received from a master microcontroller. If in the decision state 910 the microcontroller determines that the bus time-out flag is set, the slave microcontroller will proceed to check for an interrupt every 10 milliseconds up to 500 milliseconds. For this purpose, the slave microcontroller increments the counter every 10 milliseconds (state 912). In state 914, the microcontroller checks to see if the microcontroller bus 310 has timed out. If the slave microcontroller has not received additional bytes from the master microcontroller, the slave microcontroller assumes that the microcontroller bus 310 is hung and resets the microcontroller bus 310 (state 916). Next, the slave microcontroller aborts the request and awaits further requests from other master microcontrollers (state 918).

Referring to the state 909, the bus timeout bit is cleared, and the request is processed and the response is formulated. Moving to state 920, the response is sent a byte at a time. At state 922, the same bus check is made as was described for the state 814. States 922, 923 and 928 form the same bus check and timeout as states 814, 819 and 820. If in state 928 this check times out, a bus error exists, and this transaction is aborted (states 930 and 932).

Figure 10A:
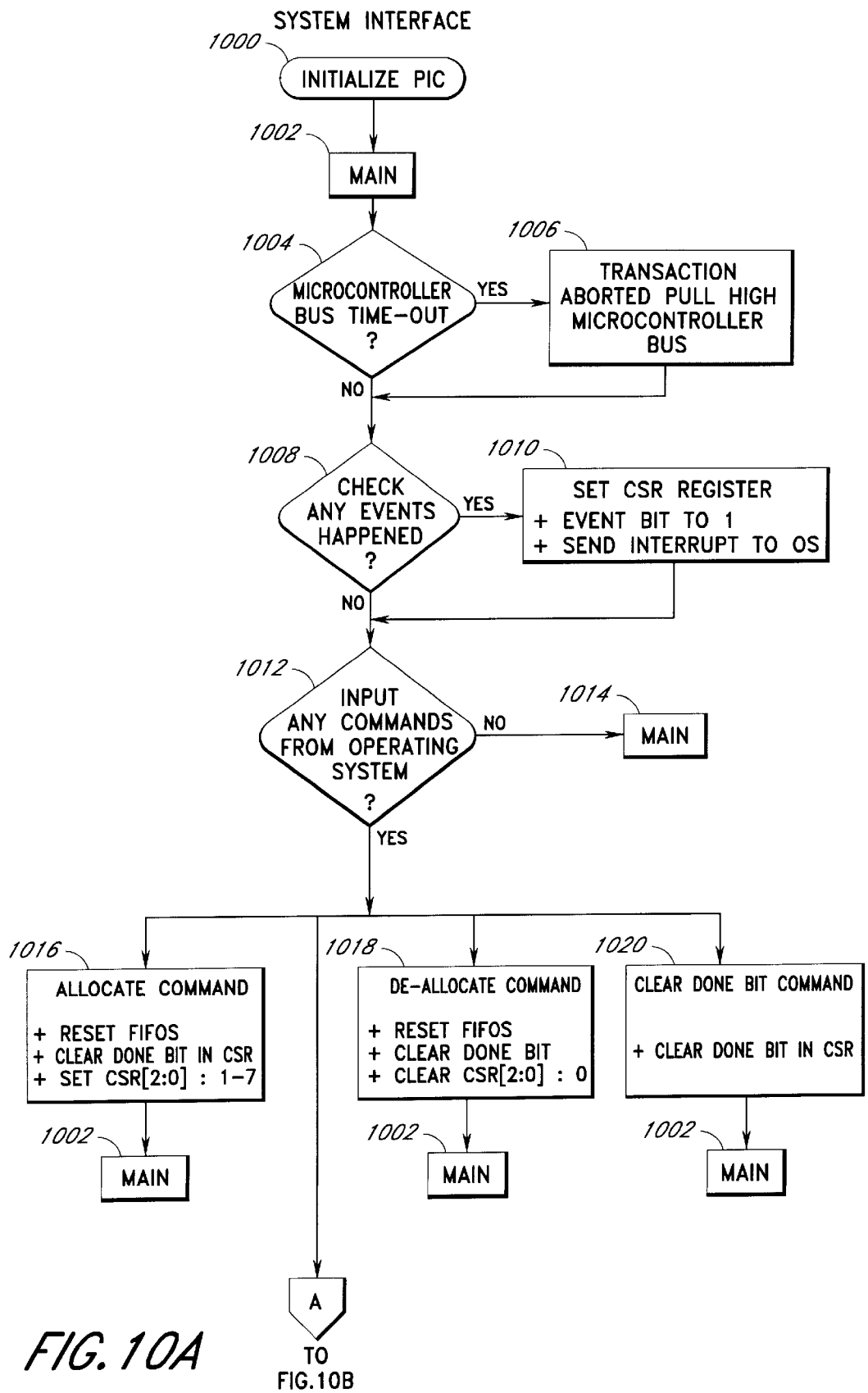
FIGS. 10A and 10B are flowcharts showing one process by which the System Interface, shown in FIGS. 4, 5A and 5B, gets commands and relays commands from the ISA bus to the network of microcontrollers.
Figure 10B:
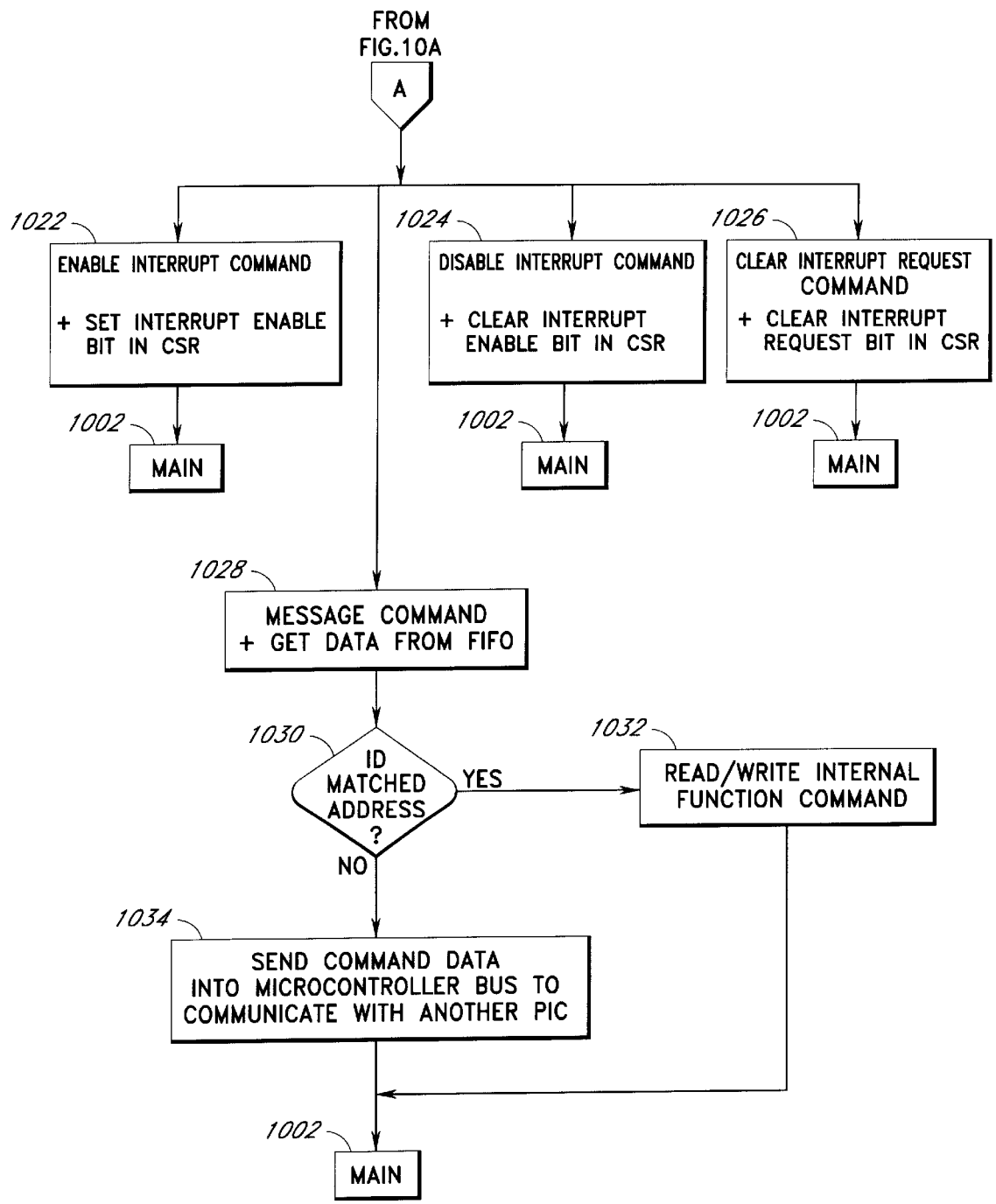

FIGS. 10A and 10B are flow diagrams showing one process by which the System Interface 312 handles requests from other microcontrollers in the microcontroller network and the ISA bus 226 (FIGS. 4 and 5). The System Interface 312 relays messages from the ISA bus 226 to other microcontrollers in the network of microcontrollers 225. The System Interface 312 also relays messages from the network of microcontrollers to the ISA bus 226.

Referring to FIGS. 10A and 10B, the System Interface 312 initializes all variables and the stack pointer (state 1000). Moving to state 1002, the System Interface 312 starts its main loop in which it performs various functions. The System Interface 312 next checks the bus timeout bit to see if the microcontroller bus 310 has timed-out (decision state 1004). If the microcontroller bus 310 has timed-out, the System Interface 312 resets the microcontroller bus 310 in state 1006.

Proceeding to a decision state 1008, the System Interface 312 checks to see if any event messages have been received. An event occurs when the System Interface 312 receives information from another microcontroller regarding a change to the state of the system. At state 1010, the System Interface 312 sets the event bit in the CSR 709 to one. The System Interface 312 also sends an interrupt to the operating system if the CSR 709 has requested interrupt notification.

Proceeding to a decision state 1012, the System Interface 312 checks to see if a device driver for the operating system has input a command to the CSR. If the System Interface 312 does not find a command, the System Interface 312 returns to state 1002. If the System Interface does find a command from the operating system, the System Interface parses the command. For the "allocate command", the System Interface 312 resets the queue to the ISA bus 226 resets the done bit in the CSR 709 (state 1016) and sets the CSR Interface Owner ID (state 1016). The Owner ID bits identify which device driver owns control of the System Interface 312.

For the "de-allocate command", the System Interface 312 resets the queue to the ISA bus 226, resets the done bit in the CSR 709, and clears the Owner ID bits (state 1018).

For the "clear done bit command" the System Interface 312 clears the done bit in the CSR 709 (state 1020). For the "enable interrupt command" the System Interface 312 sets the interrupt enable bit in the CSR 709 (state 1022). For the "disable interrupt command," the System Interface 312 sets the interrupt enable bit in the CSR 709 (state 1024). For the "clear interrupt request command", the System Interface 312 clears the interrupt enable bit in the CSR 709 (state 1026).

If the request from the operating system was not meant for the System Interface 312, the command is intended for another microcontroller in the network 225. The only valid command remaining is the "message command." Proceeding to state 1028, the System Interface 312 reads message bytes from the request buffer 516. From the state 1028, the System Interface 312 proceeds to a decision state 1030 in which the System Interface 312 checks whether the command was for itself. If the command was for the System Interface 312, moving to state 1032, the System Interface 312 processes the command. If the ID did not match an internal command address, the System Interface 312 relays the command the appropriate microcontroller (state 1034) by sending the message bytes out over the microcontroller bus 310.

Figure 11A:
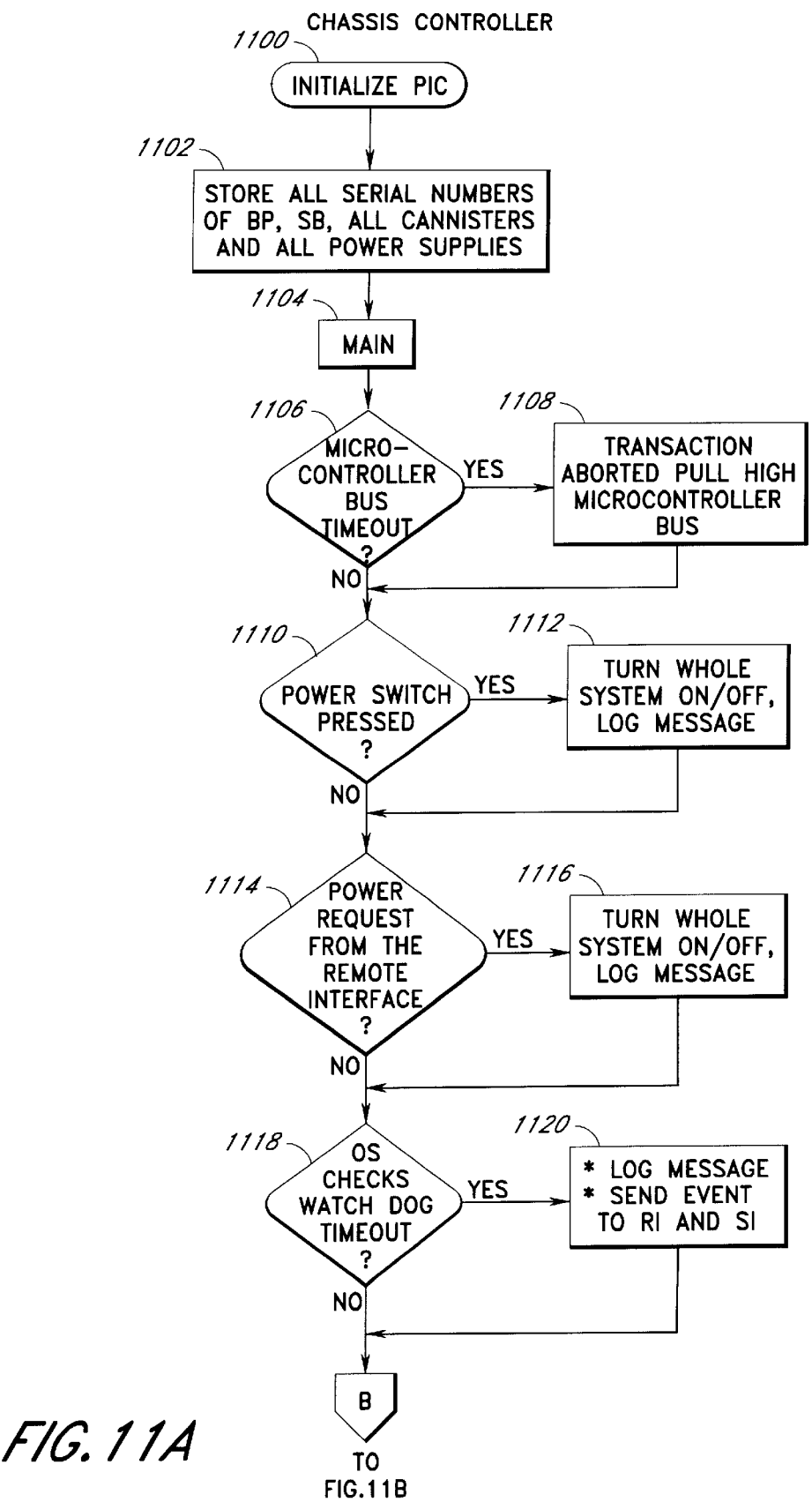
FIGS. 11A and 11B are flowcharts showing one process by which a Chassis microcontroller, shown in FIGS. 4, 5A and 5B, manages and diagnoses the power supply to the computer system.
Figure 11B:
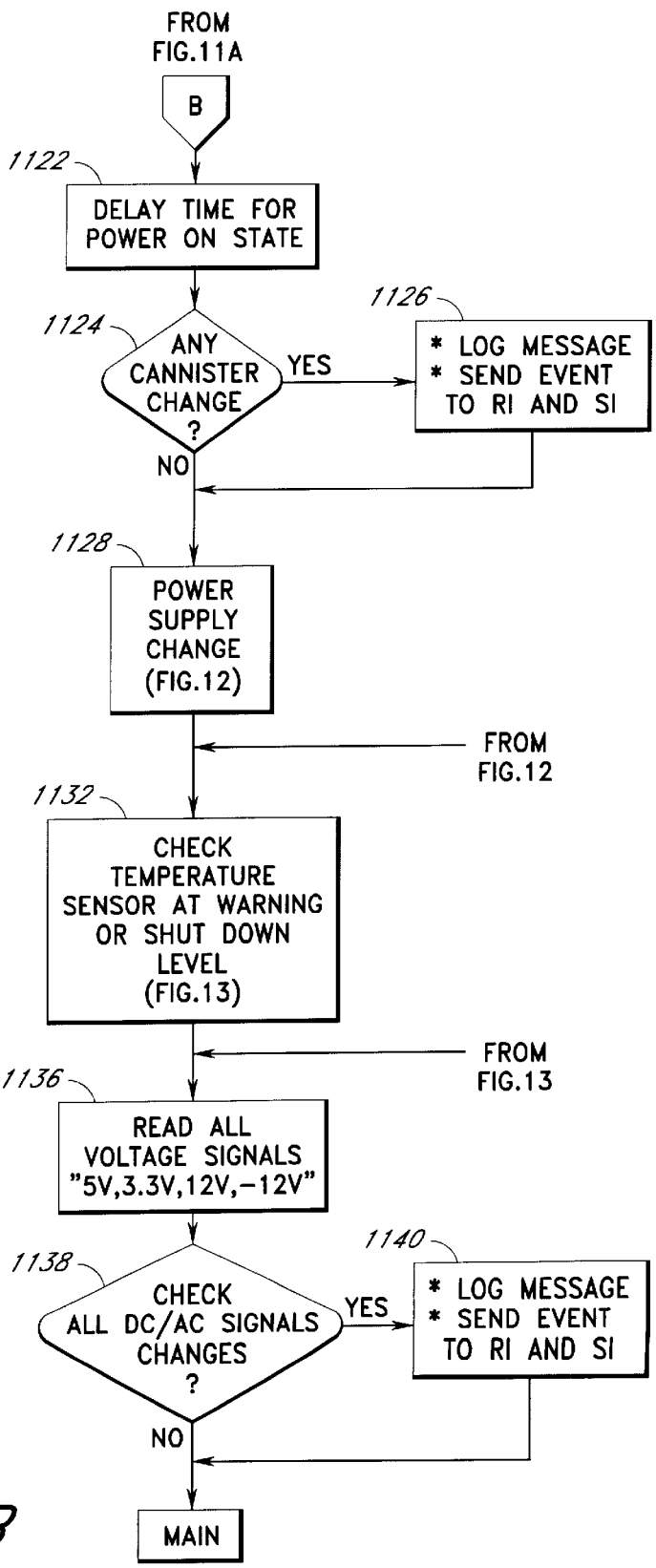

FIGS. 11A and 11B are flowcharts showing an embodiment of the functions performed by the Chassis controller 318. Starting in the state 1100, the Chassis controller 318 initializes its variables and stack pointer.

Proceeding to state 1102, the Chassis controller 318 reads the serial numbers of the microcontrollers contained on the system board 302 and the backplane 304. The Chassis controller 318 also reads the serial numbers for the Canister controllers 324, 326, 328 and 330. The Chassis controller 318 stores all of these serial numbers in the NVRAM 322.

Next, the Chassis controller 318 start its main loop in which it performs various diagnostics (state 1104). The Chassis controller 318 checks to see if the microcontroller bus 310 has timed-out (state 1106). If the bus has timed-out, the Chassis controller 318 resets the microcontroller bus 310

(state 1008). If the microcontroller bus 310 has not timed out the Chassis controller proceeds to a decision state 1110 in which the Chassis controller 318 checks to see if a user has pressed a power switch.

If the Chassis controller 318 determines a user has pressed a power switch, the Chassis controller changes the state of the power to either on or off (state 1112). Additionally, the Chassis controller logs the new power state into the NVRAM 322.

The Chassis controller 318 proceeds to handle any power requests from the Remote Interface 332 (state 1114). As shown in FIG. 9, a power request message to this microcontroller is received when the arriving message interrupts the microcontroller. The message is processed and a bit is set indicating request has been made to toggle power. At state 1114, the Chassis controller 318 checks this bit. If the bit is set, the Chassis controller 318 toggles the system, i.e., off-to-on or on-to-off, power and logs a message into the NVRAM 322 that the system power has changed state (state 1116).

Proceeding to state 1118, the Chassis controller 318 checks the operating system watch dog counter for a time out. If the Chassis controller 318 finds that the operating system has failed to update the timer, the Chassis controller 318 proceeds to log a message with the NVRAM 322 (state 1120). Additionally, the Chassis controller 318 sends an event to the System Interface 312 and the Remote Interface 332.

Since it takes some time for the power supplies to settle and produce stable DC power, the Chassis controller delays before proceeding to check DC (state 1122).

The Chassis controller 318 then checks for changes in the canisters 258–264 (state 1124), such as a canister being inserted or removed. If a change is detected, the Chassis controller 318 logs a message to the NVRAM 322 (state 1126). Additionally, the Chassis controller 318 sends an event to the System Interface 312 and the Remote Interface 332.

The Chassis controller 318 proceeds to check the power supply for a change in status (state 1128). The process by which the Chassis controller 318 checks the power supply is described in further detail in the discussion for FIG. 12.

The Chassis controller then checks the temperature of the system (state 1132). The process by which the Chassis controller 318 checks the temperature is described in further detail in the discussion for FIG. 13.

At state 1136, the Chassis controller 318 reads all of the voltage level signals. The Chassis controller 318 saves these voltage levels values in an internal register for reference by other microcontrollers.

Next, the Chassis controller 318 checks the power supply signals for AC/DC changes (state 1138). If the Chassis controller 318 detects a change in the Chassis controller 318, the Chassis controller 318 logs a message to the NVRAM 322 (state 1140). Additionally, the Chassis controller 318 sends an event to the System Interface 312 and the Remote Interface 332 that a AC/DC signal has changed. The Chassis controller 318 then returns to state 1104 to repeat the monitoring process.

Figure 12:
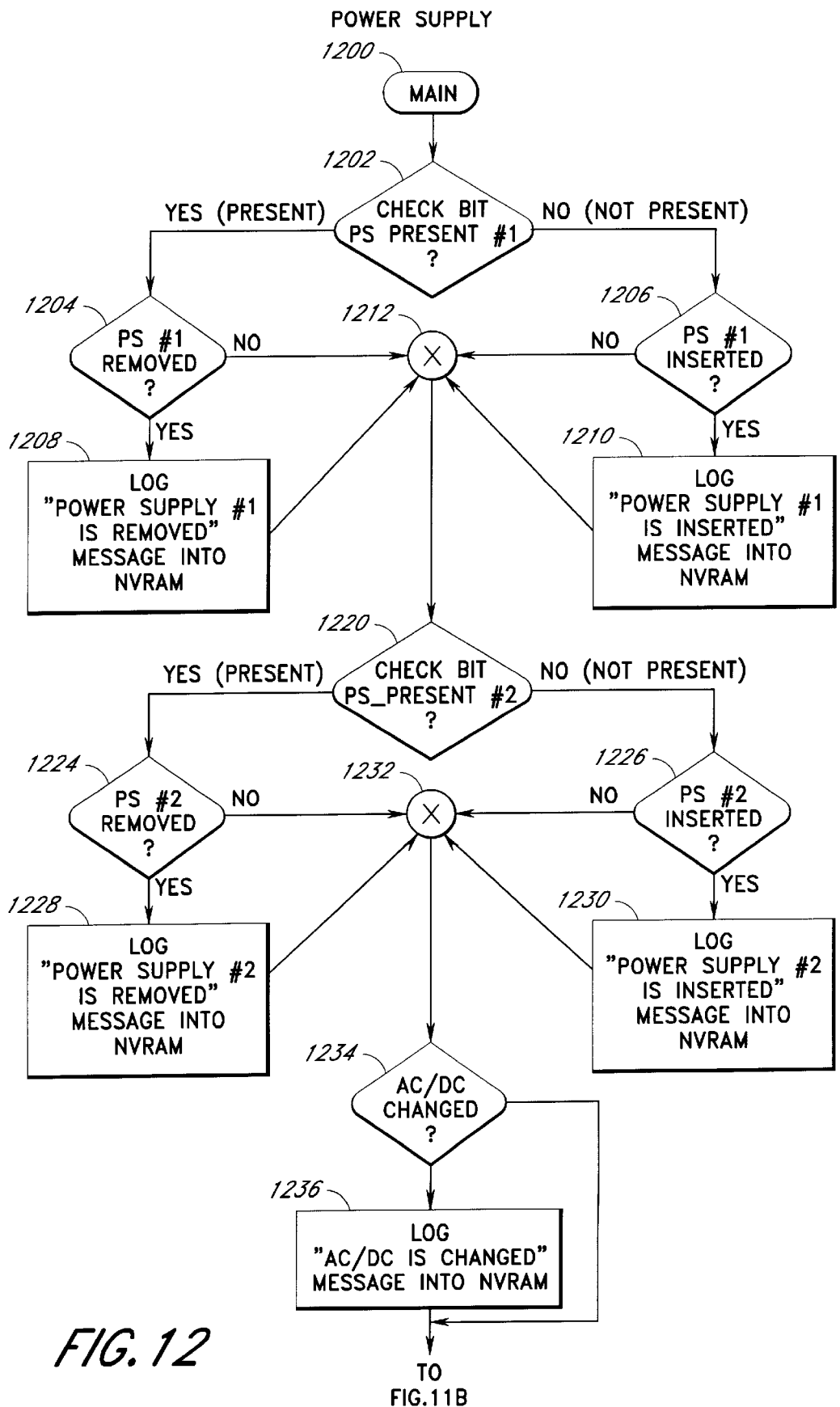
FIG. 12 is a flowchart showing one process by which the Chassis controller, shown in FIGS. 4, 5A and 5B, monitors the addition and removal of a power supply from the fault tolerant computer system.

FIG. 12 is a flowchart showing one process by which the Chassis controller 318 checks the state of the redundant power supplies termed number 1 and 2. These power supplies are monitored and controlled by the chassis controller 318 through the signal lines shown in FIG. 5A. When a power supply fails or requires maintenance, the other supply maintains power to the computer 100. To determine whether a power supply is operating properly or not, its status of inserted or removed (by maintenance personnel) should be ascertained. Furthermore, a change in status should be recorded in the NVRAM 322. FIG. 12 describes in greater detail the state 1128 shown in FIG. 1B.

Starting in state 1202, the Chassis controller 318 checks the power supply bit. If the power supply bit indicates that a power supply should be present, the Chassis controller checks whether power supply "number 1" has been removed (state 1204). If power supply number 1 has been removed, the chassis microcontroller 318 checks whether its internal state indicates power supply number one should be present. If the internal state was determined to be present, then the slot is checked to see whether power supply number 1 is still physically present (state 1204). If power supply number 1 has been removed, the PS_PRESENT#1 bit is changed to not present (state 1208). The Chassis controller 318 then logs a message in the NVRAM 322.

Referring to state 1206, if the PS_PRESENT#1 bit indicates that power supply number 1 is not present, the Chassis controller 318 checks whether power supply number 1 has been inserted (i.e., checks to see if it is now physically present) (state 1206). If it has been inserted, the Chassis controller 318 then logs a message into the NVRAM 322 that the power supply number 1 has been inserted (state 1210) and changes the value of PS_PRESENT#1 to present.

After completion, states 1204, 1206, 1208, and 1210 proceed to state 1212 to monitor power supply number 2. The Chassis controller 318 checks whether the PS_PRESENT#2 bit is set to present. If the PS_PRESENT#2 bit indicates that power supply "number 2" should be there, the Chassis controller 318 proceeds to state 1224. Otherwise, the Chassis controller 318 proceeds to state 1226. At state 1224, the Chassis controller 318 checks if power supply number 2 is still present. If power supply number 2 has been removed, the Chassis controller 318 logs in the NVRAM 322 that power supply number 2 has been removed (state 1228). The chassis controller also changes the value of PS_PRESENT#2 bit to not present.

Referring to decision state 1226, if the PS_PRESENT#2 bit indicates that no power supply number 2 is present, the Chassis controller 318 checks if power supply number 2 has been inserted. If so, the Chassis controller 318 then logs a message into the NVRAM 322 that power supply number 2 has been inserted and changes the value of PS_PRESENT#2 to present (state 1230). After completion of states 1224, 1226, 1228, and 1230, the chassis controller 318 proceeds to state 1232 to monitor the AC/DC power supply changed signal.

If in decision state 1234 the Chassis controller 318 finds that the AC/DC power supply changed signal from the power supplies is asserted, the change in status is recorded in state 1236. The Chassis controller 318 continues the monitoring process by proceeding to the state 1132 in FIG. 11B.

Figure 13:
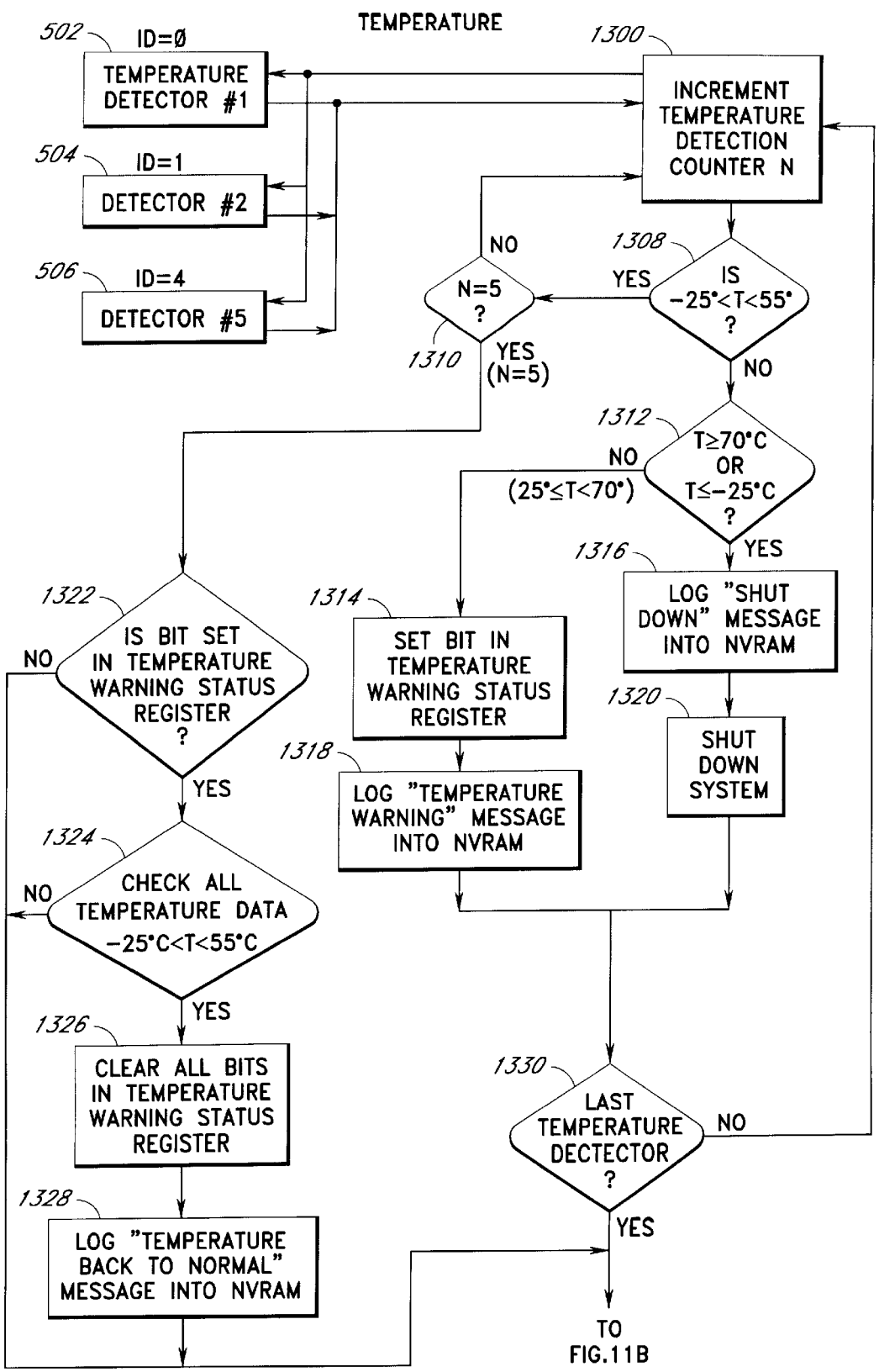
FIG. 13 is a flowchart showing one process by which the Chassis controller, shown in FIGS. 4, 5A and 5B, monitors temperature.

FIG. 13 is a flowchart showing one process by which the Chassis controller 318 monitors the temperature of the system. As shown in FIG. 5A, the Chassis controller 318 receives temperature detector signal lines from five temperature detectors located on the backplane and the motherboard. If either component indicates it is overheating, preventative action may be taken manually, by a technician, or automatically by the network of microcontrollers 225. FIG. 13 describes in greater detail the state 1132 shown in FIG. 11B.

To read the temperature of the Chassis, the Chassis controller 318 reads the temperature detectors 502, 504, and 506 (state 1300). In the embodiment of the invention shown in FIG. 13 there are five temperature detectors (two temperature detectors not shown). Another embodiment includes three temperature detectors as shown.

The Chassis controller 318 checks the temperature detector 502 to see if the temperature is less than −25° C. or if the temperature is greater than or equal to 55° C. (state 1308). Temperatures in this range are considered normal operating temperatures. Of course, other embodiments may use other temperature ranges. If the temperature is operating inside normal operating boundaries, the Chassis controller 318 proceeds to state 1310. If the temperature is outside normal operating boundaries, the Chassis controller 318 proceeds to state 1312. At state 1312, the Chassis controller 318 evaluates the temperature a second time to check if the temperature is greater than or equal to 70° C. or less than or equal to −25° C. If the temperature falls below or above outside of these threshold values, the Chassis controller proceeds to state 1316. Temperatures in this range are considered so far out of normal operating temperatures, that the computer 100 should be shutdown. Of course, other temperature ranges may be used in other embodiments.

Referring to state 1316, if the temperature level reading is critical, the Chassis controller 318 logs a message in the NVRAM 322 that the system was shut down due to excessive temperature. The Chassis controller 318 then proceeds to turn off power to the system in state 1320, but may continue to operate from a bias or power supply.

Otherwise, if the temperature is outside normal operating temperatures, but only slightly deviant, the Chassis controller 318 sets a bit in the temperature warning status register (state 1314). Additionally, the Chassis controller 318 logs a message in the NVRAM 322 that the temperature is reaching dangerous levels (state 1318).

The Chassis controller 318 follows the aforementioned process for each temperature detector on the system. Referring back to state 1310, which was entered after determining a normal temperature from one of the temperature detectors, the Chassis controller 318 checks a looping variable "N" to see if all the sensors were read. If all sensors were not read, the Chassis controller 318 returns to state 1300 to read another temperature detector. Otherwise, if all temperature detectors were read, the Chassis controller 318 proceeds to state 1322. At state 1322, the Chassis controller 318 checks a warning status register (not shown). If no bit is set in the temperature warning status register, the Chassis controller 318 returns to the state 1136 in FIG. 11B. If the Chassis controller 318 determines that a bit in the warning status register was set for one of the sensors, the Chassis controller 318 proceeds to recheck all of the sensors (state 1324). If the temperature of the sensors are still at a dangerous level, the Chassis Controller 318 maintains the warning bits in the warning status register. The Chassis controller 318 then proceeds to the state 1136 (FIG. 11B). At state 1324, if the temperatures of the sensors are now at normal operating values, the Chassis controller 318 proceeds to clear all of the bits in the warning status register (state 1326). After clearing the register, the Chassis controller 318 proceeds to state 1328 to log a message in the NVRAM 322 that the temperature has returned to normal operational values, and the Chassis controller 318 proceeds to the state 11136 (FIG. 11B).

Figure 14A:
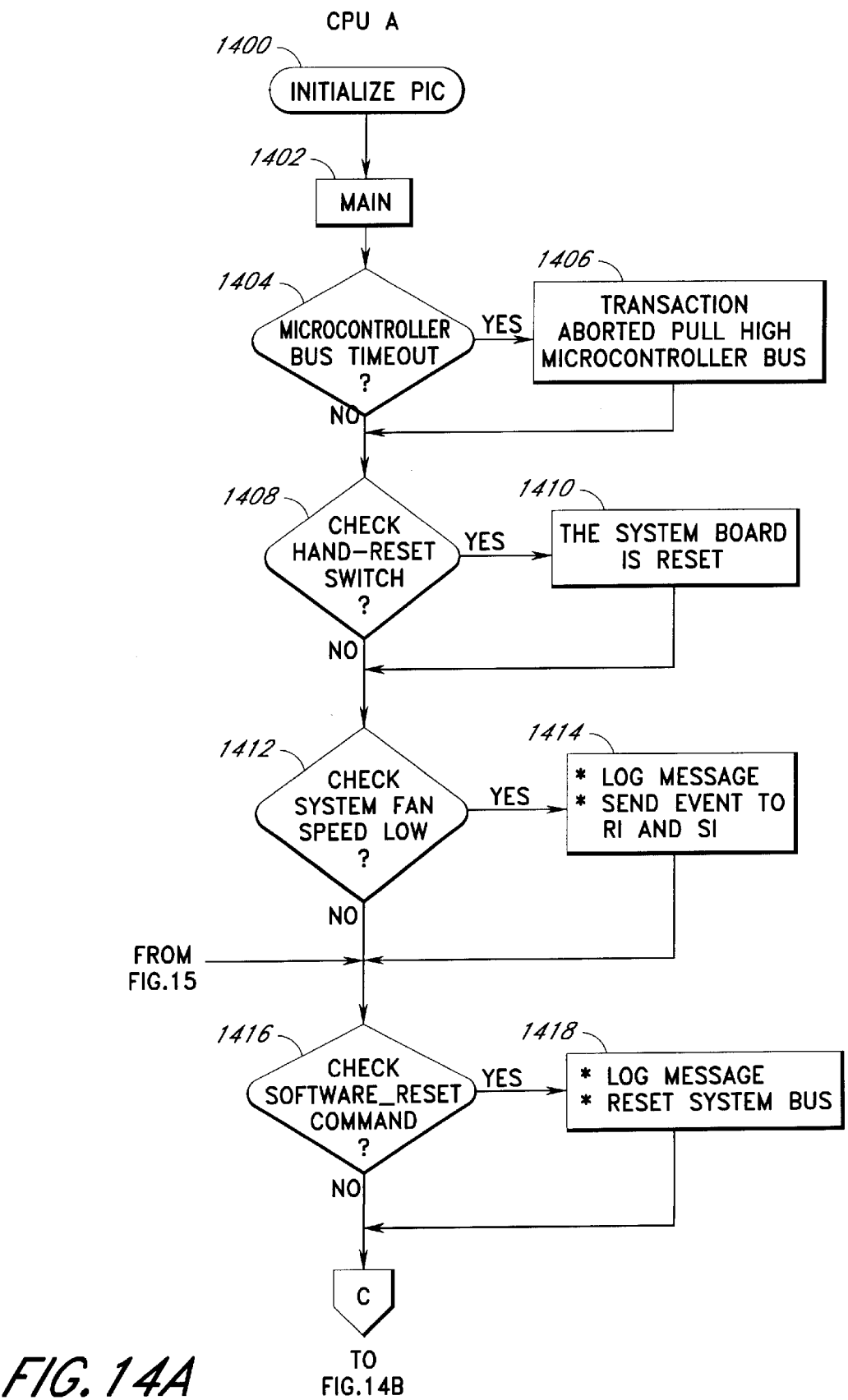
FIGS. 14A and 14B are flowcharts showing one embodiment of the activities undertaken by CPU A controller, shown in FIGS. 4, 5A and 5B.
Figure 14B:
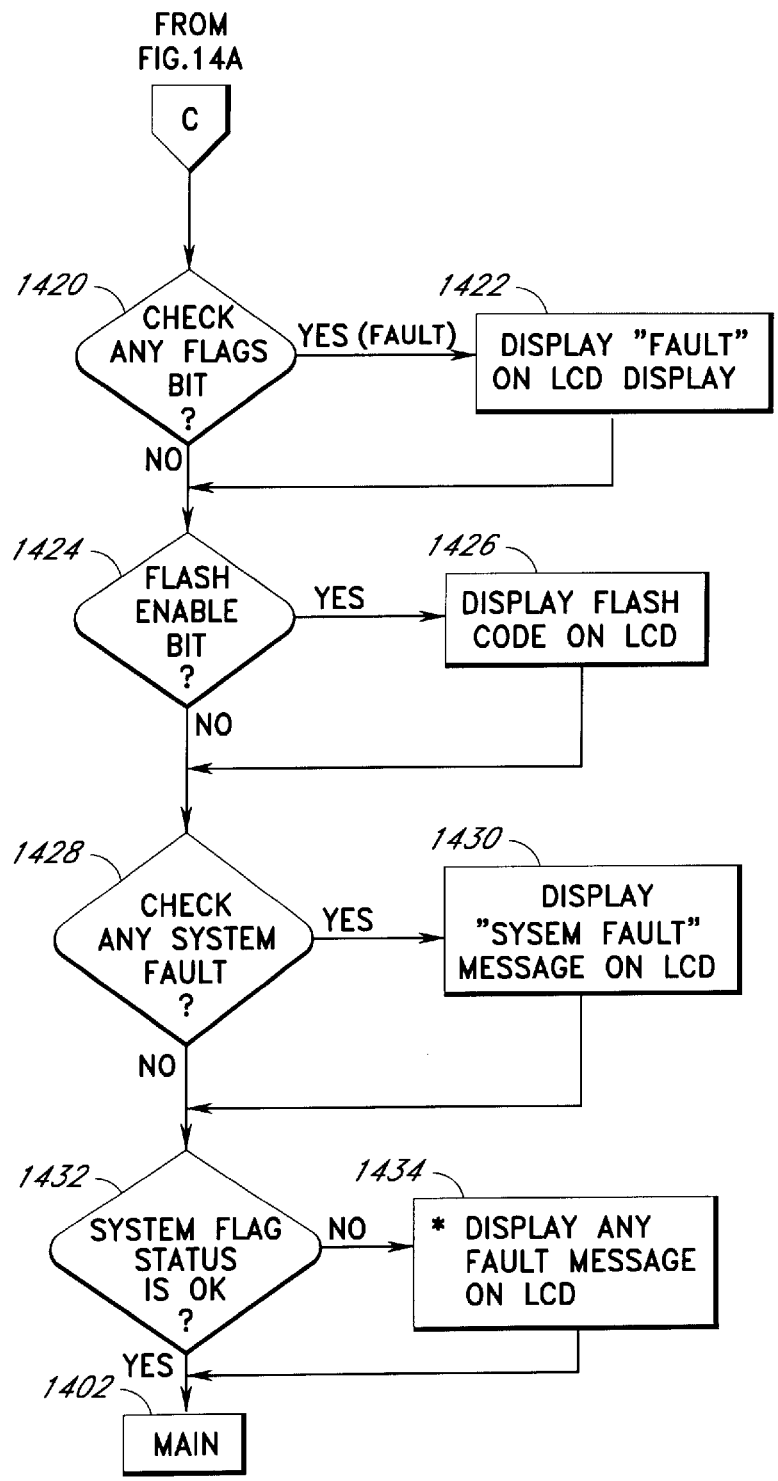

FIGS. 14A and 14B are flowcharts showing the functions performed by one embodiment of the CPU A controller 314. The CPU A controller 314 is located on the system board 302 and conducts diagnostic checks for: a microcontroller bus timeout, a manual system board reset, a low system fan speed, a software reset command, general faults, a request to write to flash memory, checks system flag status, and a system fault.

The CPU A controller 314, starting in state 1400, initializes its variables and stack pointer. Next, in state 1402 the CPU A controller 314 starts its main loop in which it performs various diagnostics which are described below. At state 1404, the CPU A controller 314 checks the microcontroller bus 310 for a time out. If the microcontroller bus 310 has timed out, the CPU A controller 314 resets the microcontroller bus 310 (state 1406). From either state 1404 or 1406, the CPU A controller 314 proceeds to check whether the manual reset switch (not shown) is pressed on the system board 302 (decision state 1408). If the CPU A controller 314 determines that the manual reset switch is pressed, the CPU A controller resets system board by asserting a reset signal (state 1410).

From either state 1408 or 1410, the CPU A controller 314 proceeds to check the fan speed (decision state 1412). If any of a number of fans speed is low (see FIG. 15 and discussion below), the CPU A controller 314 logs a message to NVRAM 322 (state 1414). Additionally, the CPU A controller 314 sends an event to the Remote Interface 334 and the System Interface 312. The CPU A controller 314 next proceeds to check whether a software reset command was issued by either the computer 100 or the remote computer 132 (state 1416). If such a command was sent, the CPU A controller 314 logs a message in NVRAM 322 that system software requested the reset command (state 1418). Additionally, the CPU A controller 314 also resets the system bus 202.

From either state 1416 or 1418, the CPU A controller 314 checks the flags bits (not shown) to determine if a user defined system fault occurred (state 1420). If the CPU A controller 314 determines that a user defined system fault occurred, the CPU A controller 314 proceeds to display the fault on an LCD display 512 (FIG. 5B) (state 1422).

Figure 16:
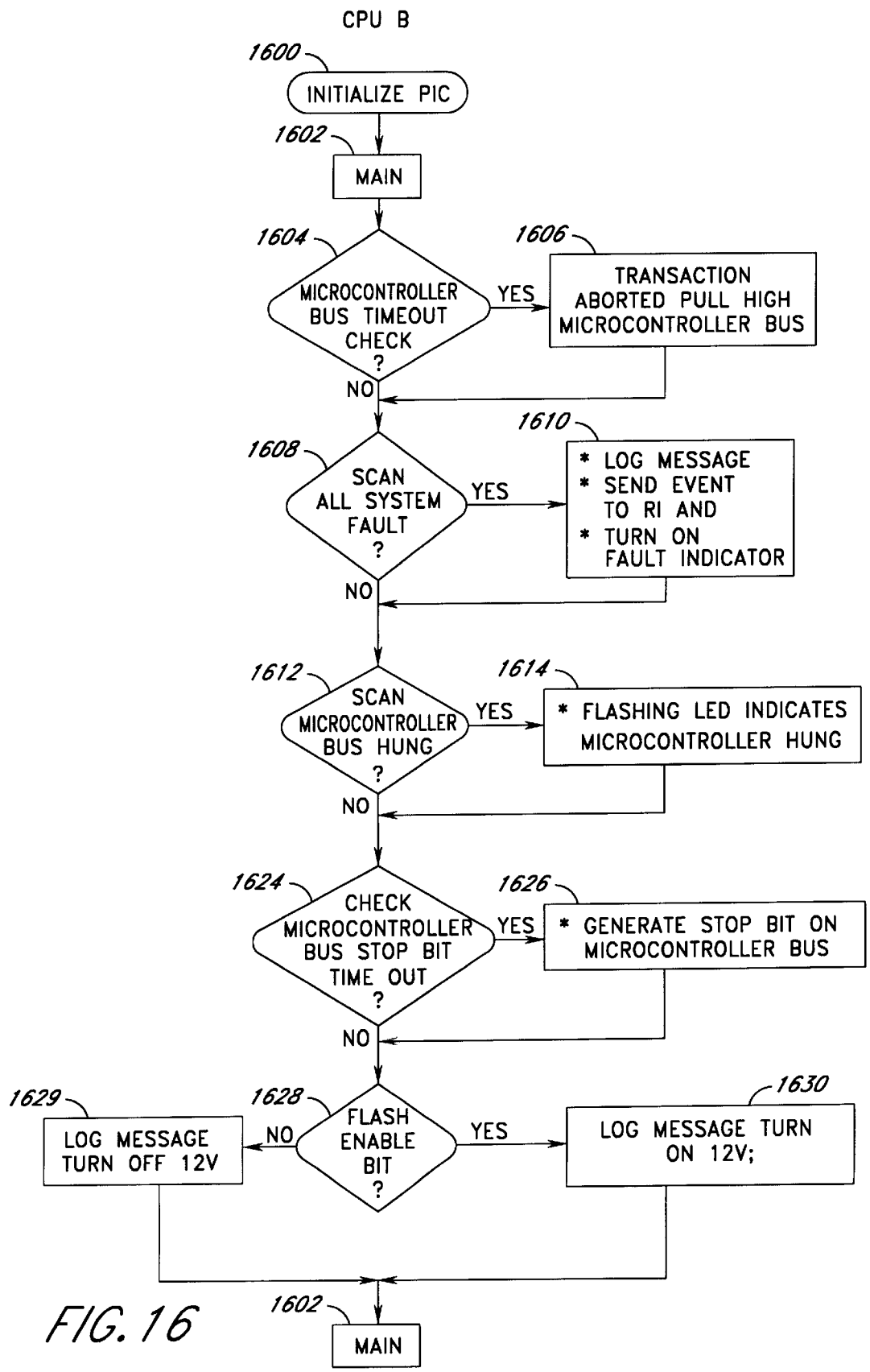
FIG. 16 is a flowchart showing one process by which activities of the CPU B controller, shown in FIGS. 4, 5A and 5B, scans for system faults.

From either state 1420 or 1422 the CPU A controller 314 proceeds to a state 1424 (if flash bit was not enabled) to check the flash enable bit maintained in memory on the CPU B controller 316. If the flash enable bit is set, the CPU A controller 314 displays a code for flash enabled on the LCD display 512. The purpose of the flash enable bit is further described in the description for the CPU B controller 316 (FIG. 16).

From either state 1424 or 1426 (if the flash bit was not enabled), the CPU A controller 314 proceeds to state 1428 and checks for system faults. If the CPU A controller 314 determines that a fault occurred, the CPU A controller 314 displays the fault on the LCD display 512 (state 1430). From state 1428 if no fault occurred, or from state 1430, the CPU A controller 314 proceeds to the checks the system status flag located in the CPU A controller's memory (decision state 1432). If the status flag indicates an error, the CPU A controller 314 proceeds to state 1434 and displays error information on the LCD display 512.

From either state 1432 or 1434, the CPU controller proceeds to state 1402 to repeat the monitoring process.

Figure 15:
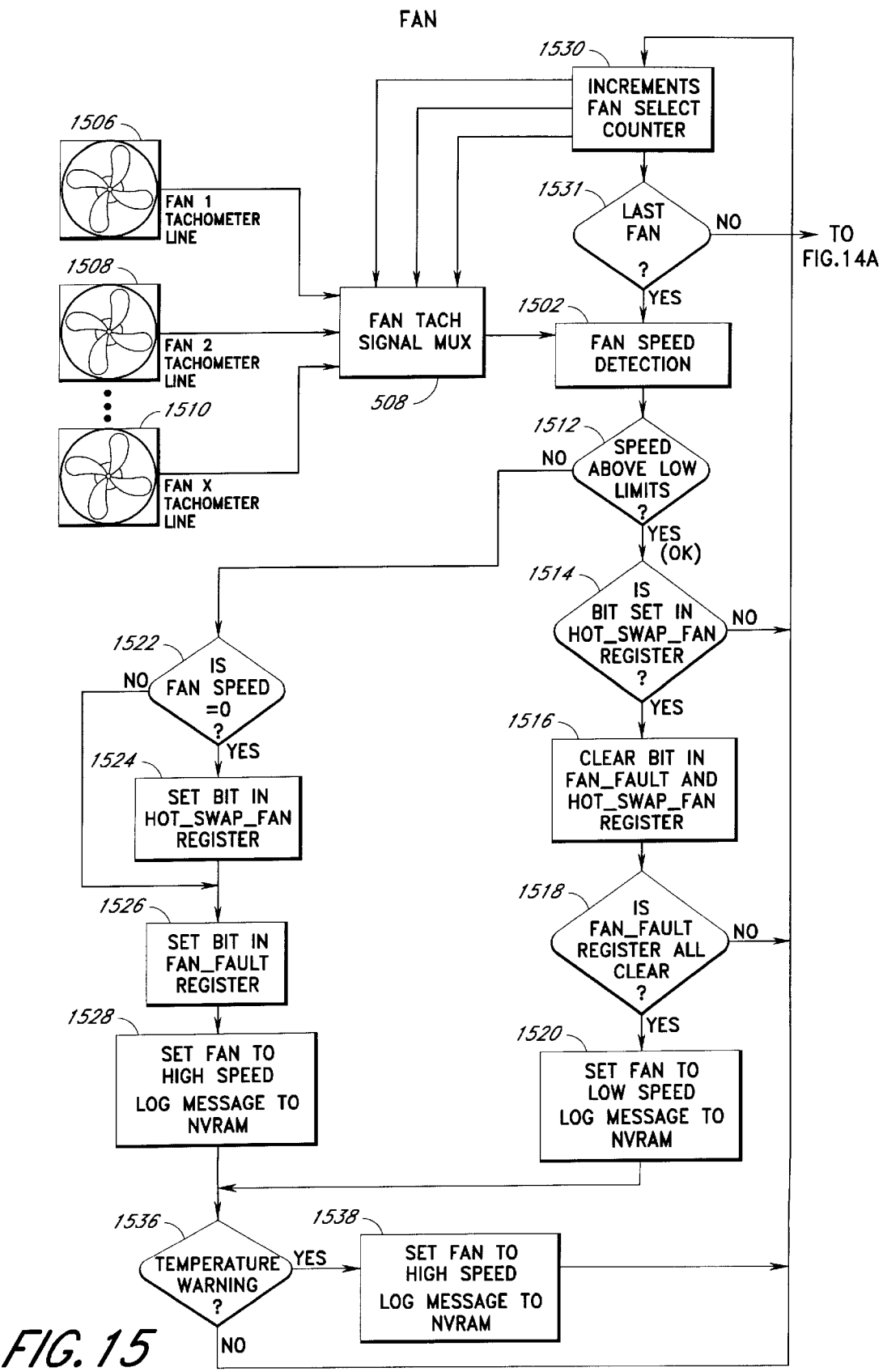
FIG. 15 is a detailed flowchart showing one process by which the CPU A controller, show in FIGS. 4, 5A and 5B, monitors the fan speed for the system board of the computer.

FIG. 15 is a flowchart showing one process by which the CPU A controller 314 monitors the fan speed. FIG. 15 is a more detailed description of the function of state 1412 in FIG. 14A. Starting in state 1502, the CPU A controller 314 reads the speed of each of the fans 1506, 1508, and 1510. The fan speed is processed by a Fan Tachometer Signal Mux 508 (also shown in FIG. 5B) which updates the CPU A controller 314. The CPU A controller 314 then checks to see if a fan speed is above a specified threshold (state 1512). If the fan speed is above the threshold, the CPU A controller 314 proceeds to state 1514. Otherwise, if the fan speed is operating below a specified low speed limit, the CPU A controller 314 proceeds to state 1522.

On the other hand, when the fan is operating above the low speed limit at state 1514, the CPU A controller 314 checks the hot_swap_fan register (not shown) if the -particular fan was hot swapped. If the fan was hot swapped, the CPU A controller 314 proceeds to clear the fan's bit in both the fan_fault register (not shown) and the hot_swap_fan register (state 1516). After clearing these bits, the CPU A controller 314 checks the fan fault register (state 1518). If the fan fault register is all clear, the CPU A controller 314 proceeds to set the fan to low speed (state 1520) and logs a message to the NVRAM 322. The CPU A controller 314 then proceeds to state 1536 to check for a temperature warning.

Now, referring back to state 1522, if a fan speed is below a specified threshold limit, the CPU A controller 314 checks to see if the fan's speed is zero. If the fan's speed is zero, the CPU A controller 314 sets the bit in the hot_swap_fan register in state 1524 to indicate that the fan has a fault and should be replaced. If the fan's speed is not zero, the CPU A controller 314 will proceed to set a bit in the fan_fault register (state 1526). Moving to state 1528, the speed of any fans still operating is increased to high, and a message is written to the NVRAM 322.

In one alternative embodiment, the system self-manages temperature as follows: from either state 1520 or 1528, the CPU A controller 314 moves to state 1536 and checks whether a message was received from the Chassis controller 318 indicating temperature warning. If a temperature warning is indicated, and if there are no fan faults involving fans in the cooling group associated with the warning, the speed of fans in that cooling group is increased to provide more cooling capacity (state 1538).

Proceeding to state 1530 from either state 1536 or 1538, the CPU A controller 314 increments a fan counter stored inside of microcontroller memory. If at state 1531, there are more fans to check, the CPU A controller 314 returns to state 1502 to monitor the speed of the other fans. Otherwise, the CPU controller 314 returns to state 1416 (FIG. 14).

FIG. 16 is one embodiment of a flow diagram showing the functions performed by the CPU B controller 316. The CPU B controller 316 scans for system faults, scans the microcontroller bus 310, and provides flash enable. The CPU B controller 316, starting at state 1600, initializes its variables and stack pointer.

After initializing its internal state, the CPU B controller 316 enters a diagnostic loop at state 1602. The CPU B controller 316 then checks the microcontroller bus 310 for a time out (decision state 1604). If the microcontroller bus 310 has timed out, the CPU B controller 316 resets the microcontroller bus 310 in state 1606. If the microcontroller bus 310 has not timed out (state 1604) or after state 1606, the CPU B controller 316 proceeds to check the system fault register (not shown) (decision state 1608).

If the CPU B controller 316 finds a system fault, the CPU B controller 316 proceeds to log a message into the NVRAM 322 stating that a system fault occurred (state 1610). The CPU B controller 316 then sends an event to the System Interface 312 and the Remote Interface 332. Additionally, the CPU B controller 316 turns on one of a number of LED indicators 518 (FIG. 5B).

If no system fault occurred, or from state 1610, the CPU B controller 316 scans the microcontroller bus 310 (decision state 1612). If the microcontroller bus 310 is hung then the CPU B controller 316 proceeds to flash an LED display 512 that the microcontroller bus 310 is hung (state 1614). Otherwise, if the bus is not hung the CPU B controller 316 then proceeds to state 1624.

The CPU B controller 316 proceeds to check for a bus stop bit time out (decision state 1624). If the stop bit has timed out, the CPU B controller 316 generates a stop bit on the microcontroller bus for error recovery in case the stop bit is inadvertently being held low by another microcontroller (state 1626).

From either state 1624 or 1626, the CPU B controller 316 proceeds to check the flash enable bit to determine if the flash enable bit (not shown) is set (state 1628). If the CPU B controller 316 determines that the flash enable bit is set (by previously having received a message requesting it), the CPU B controller 316 proceeds to log a message to the NVRAM 322 (state 1630). A flash update is performed by the BIOS if the system boot disk includes code to update a flash memory (not shown). The BIOS writes new code into the flash memory only if the flash memory is enabled for writing. A software application running on the CPUs 200 can send messages requesting that BIOS flash be enabled. At state 1630, the 12 Volts needed to write the flash memory is turned on or left turned on. If the flash enable bit is not on, control passes to state 1629, where the 12 Volts is turned off, disabling writing of the flash memory.

From either state 1629 or 1630, the CPU B controller 316 proceeds to repeat the aforementioned process of monitoring for system faults (state 1602).

Figure 17:
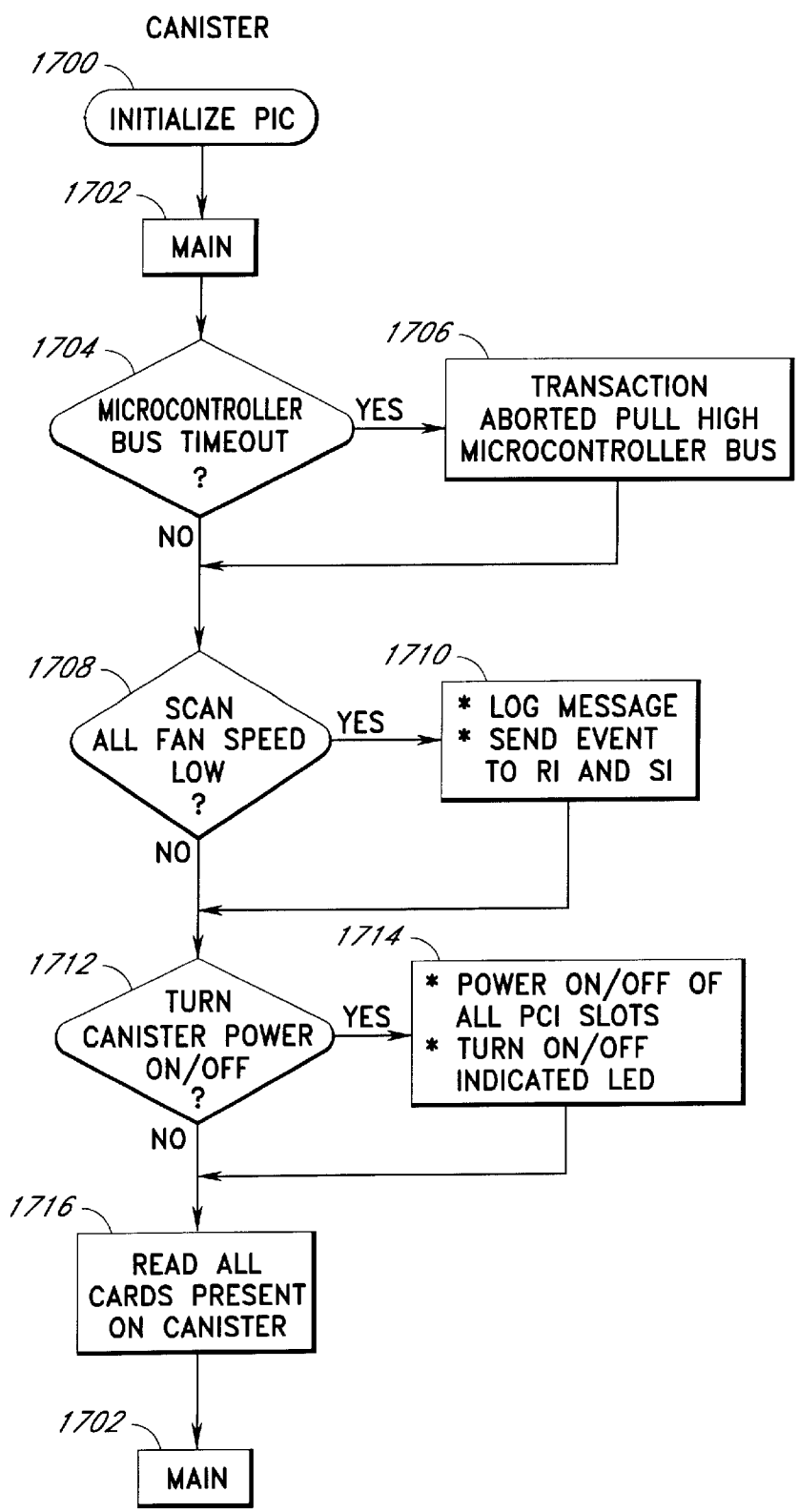
FIG. 17 is a flowchart showing one process by which activities of a Canister controller, shown in FIGS. 4, 5A and 5B, monitors the speed of the canister fan of the fault tolerant computer system.

FIG. 17 is one embodiment of a flowchart showing the functions performed by the Canister controllers 324, 326, 328 and 330 shown in FIGS. 4 and 5. The Canister controllers 324, 326, 328 and 330 examine canister fan speeds, control power to the canister, and determine which canister slots contain cards. The Canister controllers 324–330, starting in state 1700, initialize their variables and stack pointers.

Next, in state 1702 the Canister controllers 324–330 start their main loop in which they performs various diagnostics, which are further described below. The Canister controllers 324–330 check the microcontroller bus 310 for a time out (state 1704). If the microcontroller bus 310 has timed out, the Canister controllers 324–330 reset the microcontroller bus 310 in state 1706. After the Canister controller 324–330 reset the microcontroller bus 310, or if the microcontroller bus 310 has not timed out, the Canister controllers 324–330 proceed to examine the speed of the fans (decision state 1708). As determined by tachometer signal lines connected through a fan multiplexer 508 (FIG. 5), if either of two canister fans is below the lower threshold, the event is logged, an event is sent to the System Interface 312 and, speed, in a self-management embodiment, the fan speed is set to high. The Canister controllers 324–330 check the fan speed again, and if they are still low the canister controlling 324–330 signal a fan fault and register an error message in the NVRAM 322 (state 1710).

If the Canister controller received a request message to turn on or off canister power, a bit would have been previously set. If the Canister controllers 324–330 find this bit set (state 1712), they turn the power to the canister on, and light the canister's LED. If the bit is cleared, power to the canister is turned off, as is the LED (state 1714).

Next, the Canister controllers 324–330 read a signal for each slot which indicates whether the slot contains an adapter (state 1716). The Canister controllers 324–330 then returns to the state 1702, to repeat the aforementioned monitoring process.

Figure 18:
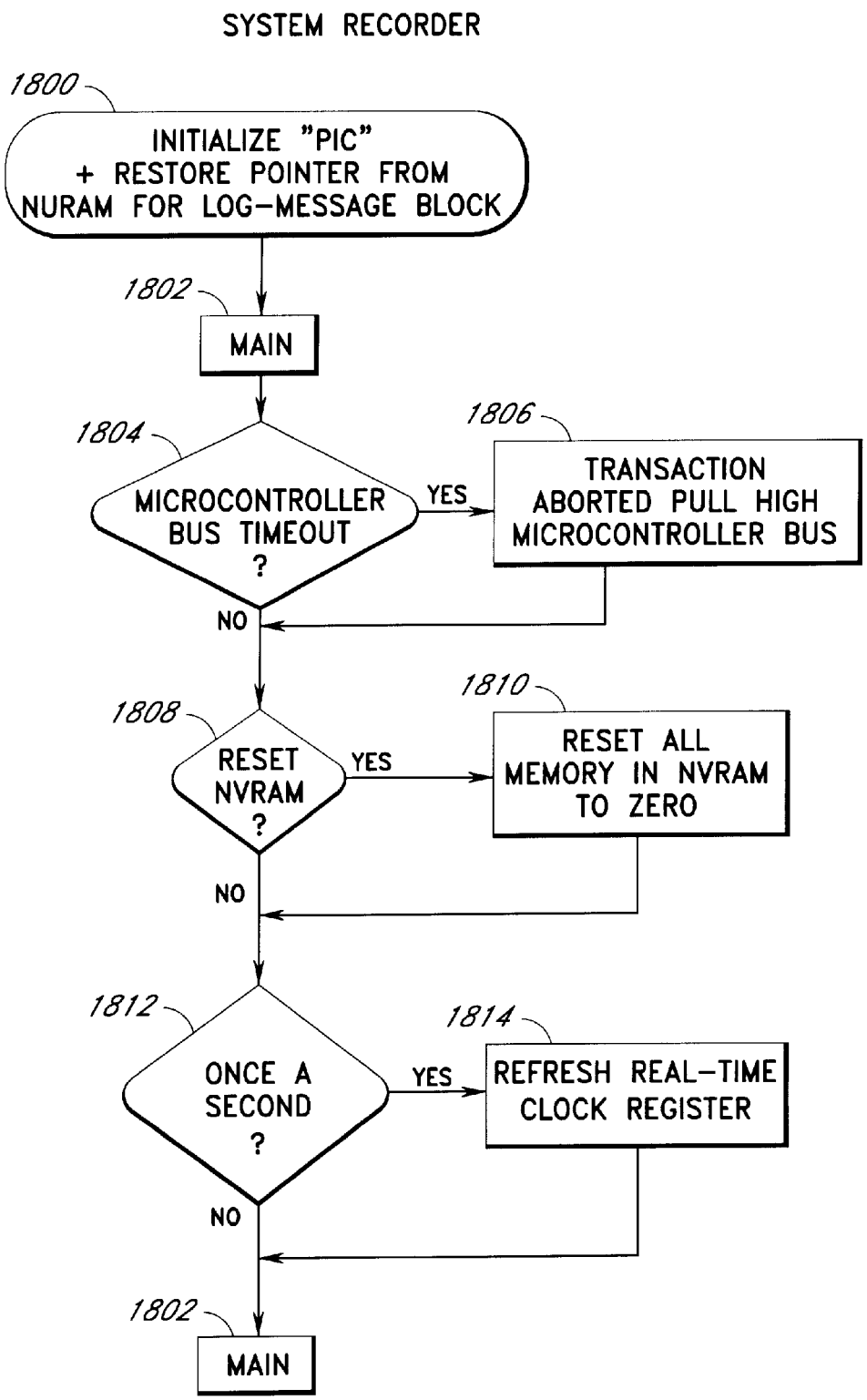
FIG. 18 is a flowchart showing one process by which activities of the System Recorder, shown in FIGS. 4, 5A and 5B, resets the NVRAM located on the backplane of the fault tolerant computer system.

FIG. 18 is one embodiment of a flowchart showing the functions performed by the System Recorder controller 320. The System Recorder controller 320 maintains a system log in the NVRAM 322. The System Recorder 320 starting in state 1800 initializes its variables and stack pointer.

Next, at state 1802 the System Recorder 320 starts its main loop in which the System Recorder 320 performs various functions, which are further described below. First, the System Recorder 320 checks the microcontroller bus 310 for a time out (state 1804). If the microcontroller bus 310 has timed out, the System Recorder 320 resets the microcontroller bus 310 in state 1806. After the System Recorder 320 resets the bus, or if the microcontroller bus 310 has not timed out, the System Recorder 320 checks to see if another microcontroller had requested the System Recorder 320 to reset the NVRAM 322 (state 1808). If requested, the System Recorder 320 proceeds to reset all the memory in the NVRAM 322 to zero (decision state 1810). After resetting the NVRAM 322, or if no microcontroller had requested such a reset, the System Recorder 320 proceeds to a get the real time clock every second from a timer chip 520 (FIG. 5A) (decision state 1812).

From time to time, the System Recorder 320 will be interrupted by the receipt of messages. When these messages are for storing data in the NVRAM 322, they are carried out as they are received and the messages are stored in the NVRAM 322. Thus, there is no state in the flow of FIG. 18 to explicitly store messages. The System Recorder then returns to the state 1802 to repeat the aforementioned monitoring process.

While the above detailed description has shown, described, and pointed out the fundamental novel features of the invention as applied to various embodiments, it will be understood that various omissions and substitutions and changes in the form and details of the system illustrated by be made by those skilled in the art, without departing from the intent of the invention.

| Header File for Global Memory Addresses |
|---|

```
#ifndef SDL_TYPES
#ifndef FAR_POINTERS
typedef unsigned char *BYTEADDRESS;
typedef unsigned short *WORDADDRESS;
typedef unsigned long *LONGADDRESS;
typedef char *SBYTEADDRESS;
typedef short *SWORDADDRESS;
typedef long *SLONGADDRESS;
#else
typedef unsigned Long BYTEADDRESS;
typedef unsigned Long WORDADDRESS;
typedef unsigned long LONGADDRESS;
typedef unsigned long SBYTEADDRESS;
typedef unsigned Long SWORDADDRESS;
typedef unsigned Long SLONGADDRESS;
#endif
#define SDL_TYPES 1
#endif
/* */
/* $Module CS9000WS.SDL$ */
/* */
/* Copyright 1996 */
/* By NetFRAME Systems Inc. */
/* Milpitas, California U.S.A. */
/* */
/* $Author: Ken Nguyen $ */
/* $Date: 31 Mar 1997 15:28:08 $ */
/* $Revision */
/* */
/* $Description$ */
/* This file contains the NetFRAME Wire Service message and interface definition. */
/* for the C59000 */
/* $EndDescription$ */
/* */
/* Revision History */
/* $Log: P:/inc/cs9000ws.sdl $ */
/* */
/* Rev 1.16 31 Mar 1997 15:28:08 Ken Nguyen */
/* Added WSEvent variables, Severity bytes and WS commands. */
/* */
/* Rev 1.15 28 Jan 1997 16:31:32 Ken Nguyen */
/* Cleaned up SDL file */
/* Added Buffer Event Commands and Event ID Number. */
/* */
/* Rev 1.14 27 Nov 1996 14:10:12 Ken Nguyen */
/* Added commands for Raptor 8 */
/* Added WSEVENT_CPU event. */
/* */
/* Rev 1.13 25 Oct 1996 16:48:18 Ken Nguyen */
/* Fixed a Problem of Canister Fan Fault Status. */
/* */
/* Rev 1.10 10 Oct 1996 16:33:04 Ken Nguyen */
/* Added a command to count Log entry. */
/* */
/* Rev 1.9 30 Sep 1996 18:42:50 Ken Nguyen */
```

Header File for Global Memory Addresses

```
/* Added Canister Fault Commands */
/* */
/* Rev 1.8 30 Sep 1996 17:34:16 Karl Johnson */
/* Added definitions for remote interface serial protocol */
/* Added NVRAM error counter */
/* */
/* Rev 1.7 13 Sep 1996 11:22:22 Ken Nguyen */
/* Corrected Temperature data length */
/* */
/* Rev 1.6 09 Sep 1996 17:24:48 Karl Johnson */
/* Added WS_SYSLOG_CLOCK - the clock used by the log recorder to time stamp */
/* */
/* Rev 1.5 20 Aug 1996 01:08:36 Karl Johnson */
/* Added screen event and corrected BOOTDEVS name. */
/* */
/* Rev 1.4 01 Aug 1996 15:32:50 Karl Johnson */
/* Cleanup and added new status values. */
/* */
/* Rev 1.3 26 Jul 1996 17:14:38 Karl Johnson */
/* Reduced maximum number of event types. */
/* Added a Success Status. */
/* */
/* Rev 1.2 08 Jul 1996 15:57:32 Karl Johnson */
/* Changed read write bit in datatype definition. */
/* Added WS_BOOTDEVS missed in translating specification. */
/* */
/* Rev 1.1 19 Jun 1996 14:15:28 Karl Johnson */
/* Added LCD low level access items. */
/* */
/* Rev 1.0 18 Jun 1996 14:06:58 Karl Johnson */
/* Initial revision. */
/* */
/* ************************************************** */
/* This is the Wire Service Message format */
#ifndef PIC_PROCESSOR
struct WSMessage
   {
   unsigned char ToProcesor;
   unsigned char Type_RW;
   unsigned char AddressLow;
   unsigned char AddressHi;
   unsigned char WriteLength;
/* WriteData BLOCK_BYTE 0; Write data stream goes here */
   };
#define WSMessage_S 5
struct WSResponse
   {
   unsigned char FromProcesor;
   unsigned char ReadLength;
/* ReadData BLOCK_BYTE 0; Read data stream goes here */
   unsigned char Status;
   };
#define WSResponse_S 3
#endif
/* */
/* Wire Service Local Interface Definitions */
/* */
/* Command (CSR Write) Register definitions */
#define WSCMD_RequestInt       0 x 80    /* Request interrupt on command complete */
#define WSCMD_Allocate1        0 x 01    /* Allocate interface as ID 1 */
#define WSCMD_Allocate2        0 x 02    /* Allocate interface as ID 2 */
#define WSCMD_Allocate3        0 x 03    /* Allocate interface as ID 3 */
#define WSCMD_Allocate4        0 x 04    /* Allocate interface as ID 4 */
#define WSCMD_Allocate5        0 x 05    /* Allocate interface as ID 5 */
#define WSCMD_Allocate6        0 x 06    /* Allocate interface as ID 6 */
#define WSCMD_Allocate7        0 x 07    /* Allocate interface as ID 7 */
#define WSCMD_Deallocate       0 x 10    /* Deallocate interface */
#define WSCMD_EnableInts       0 x 11    /* Enable interrupts for events */
#define WSCMD_DisableInts      0 x 12    /* Disable interrupts for events */
#define WSCMD_Message          0 x 13    /* Process message in FIFO and set done */
#define WSCMD_ClearDone        0 x 20    /* Clear done bit & error bit and clear FIFOs */
#define WSCMD_ClearIntReq      0 x 21    /* Clear Interrupt Request bit */
/* ( Must poll WSTS_IntReq => 0 for completion) */
#define WSCMD_Reset            0 x 0a5   /* Reset interface */
#define WSCMD_DiagMode         0 x 05a   /* Enter Diagnostic mode */
#define WSCMD_ExitDiagMode     0 x 00    /* Exit Diagnostic mode */
/* Status (CSR Read) Register definitions */
```

-continued

Header File for Global Memory Addresses

```
#define WSSTS_Error              0 x 80        /* Error processing command */
#define WSSTS_IntEna             0 x 40        /* Event Interrupts are enabled */
#define WSSTS_Events             0 x 20        /* One or more events occurred */
#define WSSTS_Done               0 x 10        /* Message command is done */
#define WSSTS_IntReq             0 x 08        /* Interrupt is being requested */
#define WSSTS_AllocMask          0 x 07        /* ID of owner of interface */
/* IO Addresses of Wire Service Local Interface */
#define WSLOC_Data               0 x 0CC0
#define WSLOC_CSR                0 x 0CC1
/* ********************************************************* */
/* These are the data type definitions */
#define WSTYPE_BIT               0 x 01
#define WSTYPE_BYTE              0 x 02
#define WSTYPE_STRING            0 x 03
#define WSTYPE_LOG               0 x 04
#define WSTYPE_EVENT             0 x 05
#define WSTYPE_QUEUE             0 x 06
#define WSTYPE_ARRAY             0 x 07
#define WSTYPE_LOCK              0 x 08
#define WSTYPE_SCREEN            0 x 09
#define WSOP_READ                0 x 80
#define WSOP_WRITE               0 x 00
#define WSEVENT_CAN_CHG          0 x 01
#define WSEVENT_PS_CHG           0 x 02
#define WSEVENT_QUEUE            0 x 03
#define WSEVENT_TEMP             0 x 04
#define WSEVENT_ACOK             0 x 05
#define WSEVENT_DCOK             0 x 06
#define WSEVENT_FAN              0 x 07
#define WSEVENT_SCREEN           0 x 08
#define WSEVENT_CPU              0 x 09
#define WSEVENT_OS_TimeOut       0 x 0A        /* Event of OS's Timer is timed out */
#define WSEVENT_PCI_TimeOut      0 x 0B        /* Event of Power ON/OFF PCI Slot is timed out */
#define WSEVENT_CALLOUT          0 x 0C        /* Call Out Event */
#define WSEVENT_MAXVALUE         0 x 0F        /* Make sure no event values exceed this value */
#define WSERR_NONE               0 x 00        /* No error occurred */
#define WSERR_NONODE             0 x 01        /* Slave addressed did not respond */
#define WSERR_NOADDRESS          0 x 02        /* Slave responded that it had no such type/address */
#define WSERR_CORRUPTED          0 x 03        /* Message or Response is not valid */
#define WSERR_UNDERRUN           0 x 04        /* Message could not be completely transmitted or received */
#define WSERR_DATACHECK          0 x 05        /* Message data checksum received incorrectly (try again if
possible ) */
#define WSERR_OPERATION          0 x 06        /* Slave operation not possible (e.g. Wr to R/O) */
#define WSERR_NODATA             0 x 07        /* Slave responded no data available at address (queue/log) */
#define WSPID_SYSLOG             0 x 01
#define WSPID_BACKPLANE          0 x 02
#define WSPID_SYSTEMA            0 x 03
#define WSPID_SYSTEMB            0 x 04
#define WSPID_LOCAL_IF           0 x 10
#define WSPID_REMOTE_IF          0 x 11
#define WSPID_CANISTER1          0 x 20
#define WSPID_CANISTER2          0 x 21
#define WSPID_CANISTER3          0 x 22
#define WSPID_CANISTER4          0 x 23
/* ********************************************************* */
/* Wire Service Remote Interface Protocol Constants */
#define WSRI_SOM                 0 x 7B        /* Serial Start Of Message */
#define WSRI_EOM                 0 x 7D        /* Serial End Of Message */
#define WSRI_SUB                 0 x 5C        /* Serial Substitute next character */
#define WSRI_EVT                 0 x 5E        /* Serial Event indicator */
#define WSRI_REQ_IDENTIFY        0 x 01        /* Request Identity and reset sequence */
#define WSRI_REQ_SECURE          0 x 02        /* Request to enter Security mode (logon) */
#define WSRI_REQ_UNSECURE        0 x 03        /* Request to leave Security mode */
#define WSRI_REQ_MESSAGE         0 x 04        /* Request contains WS message to process */
#define WSRI_REQ_POLL            0 x 05        /* Request status */
#define WSRI_STAT_OK             0 x 01        /* Request OK return data valid */
#define WSRI_STAT_OK_EVENT       0 x 02        /* Request OK return data valid (Event(s) pending
) */
#define WSRI_STAT_E_SEQUENCE     0 x 03        /* Request not in Sequence */
#define WSRI_STAT_E_DATACHECK    0 x 03        /* Request check byte not correct */
#define WSRI_STAT_E_FORMAT       0 x 04        /* Request format incorrect */
#define WSRI_STAT_E_SECURE       0 x 05        /* Request requires Security mode */
/* ********************************************************* */
/* Wire Service Log Message Constants */
/* */
/* First byte of log message data: Severity Level Byte */
#define WSLOG_LEVEL_UNKNOWN      0 x 00        /* Unknown */
```

-continued

Header File for Global Memory Addresses

```
#define WSLOG_LEVEL_INFO        0 x 10          /* Informational */
#define WSLOG_LEVEL_WARN        0 x 20          /* Warning */
#define WSLOG_LEVEL_ERROR       0 x 30          /* Error */
#define WSLOG_LEVEL_FATAL       0 x 40          /* Severe/Fatal Error */
/* Second byte of log message data: Source/Encoding Byte */
/* - which entity logged the entry in the 4 high bits */
/* - which type of encoding of the message is used in the 4 low bits of the byte. */
#define WSLOG_SRC_INTERNAL      0 x 00          /* Wire Service Internal */
#define WSLOG_SRC_0BDIAG        0 x 10          /* Onboard Diagnostics */
#define WSLOG_SRC_EXDIAG        0 x 20          /* External Diagnostics */
#define WSLOG_SRC_BIOS          0 x 30          /* BIOS */
#define WSLOG_SRC_DOS           0 x 40          /* DOS */
#define WSLOG_SRC_WIN           0 x 50          /* Windows,Win95 */
#define WSLOG_SRC_WINNT         0 x 60          /* Windows/NT */
#define WSLOG_SRC_NETWARE       0 x 70          /* NetWare */
#define WSLOG_TYPE_BINARY       0 x 00          /* Message data is Binary */
#define WSLOG_TYPE_ASCII        0 x 10          /* Message data is ASCII */
#define WSLOG_TYPE_UNICODE      0 x 20          /* Message data is Unicode */
/* ********************************************************** */
/* This is the Wire Service addresses for named items. */
/* */
/* Addresses are composed of three parts: Processor ID, Data Type and Subaddress */
/* In this table the address is encoded as a 4 bytes in hexadecimal notation: */
/* PPTTAAAAh where PP is the processor ID, TT is the data type and AL AH is the */
/* 2 byte subaddress. Processor ID's 00 and 20 are special, 00 applies to all */
/* processors and 20 applies to all canister processors. */
/* */
/*                               PPTTALAH */
#define WS_DESCRIPTION          0 x 00030100    /* (S) Wire Service Processor Type/Description */
#define WS_REVISION             0 x 00030200    /* (S) Wire Service Software Revision/Date Info */
#define WS_WDOG_CALLOUT         0 x 01010200    /* (L) This is a bit controlling callout on a wathcdog
timeout. */
#define WS_WDOG_RESET           0 x 01010300    /* (L) This is a bit controlling system on a wathcdog
timeout. */
#define WS_NVRAM_RESET          0 x 01020100    /* (B) Trigger to reset NVRAM Data */
#define WS_SYS_BOOTFLAG1        0 x 01020200    /* (B) System Boot Flag 1 */
#define WS_SYS_BOOTFLAG2        0 x 01020300    /* (B) System Boot Flag 2 */
#define WS_SYS_BOOTFLAG3        0 x 01020400    /* (B) System Boot Flag 3 */
#define WS_SYS_BOOTFLAG4        0 x 01020500    /* (B) System Boot Flag 4 */
#define WS_SYS_XDATA_KBYTES     0 x 01020600    /* (B) Size of the WS_SYS_XDATA in
kilobytes */
#define WS_NVRAM_FAULTS         0 x 01020700    /* (B) Faults detected in NVRAM Data */
#define WS_SYS_XDATA            0 x 01070000    /* Byte Array for storage of arbitrary external data
in NVRAM */
#define WS_SYS_LOG              0 x 01040000    /* System Log */
#define WS_RI_QUEUE             0 x 01060100    /* (Q) Queue of data going to Remote Interface */
#define WS_SI_QUEUE             0 x 01060200    /* (Q) Queue of data going to System Interface */
#define WS_SYS_SCREEN           0 x 01090000    /* System Screen */
#define WS_CALLOUT_SCRIPT       0 x 01030300    /* (S) The callout script for remote notification */
#define WS_PASSWORD             0 x 01030400    /* (S) The access password for Wire Service */
#define WS_SYS_BP_SERIAL        0 x 01030500    /* (S) Last known Back Plane serial data */
#define WS_SYS_CAN_SERIAL1      0 x 01030600    /* (S) Last known Canister 1 Serial data */
#define WS_SYS_CAN_SERIAL2      0 x 01030700    /* (S) Last known Canister 2 Serial data */
#define WS_SYS_CAN_SERIAL3      0 x 01030800    /* (S) Last known Canister 3 Serial data */
#define WS_SYS_CAN_SERIAL4      0 x 01030900    /* (S) Last known Canister 4 Serial data */
#define WS_SYS_RI_SERIAL        0 x 01031600    /* (S) Last known Remote Interface serial data */
#define WS_SYS_SB_SERIAL        0 x 01031700    /* (S) Last known System Board serial data */
#define WS_SYS_PS_SERIAL1       0 x 01031800    /* (S) Last known Power Supply 1 serial data */
#define WS_SYS_PS_SERIAL2       0 x 01031900    /* (S) Last known Power Supply 2 serial data */
#define WS_SYS_PS_SERIAL3       0 x 01031a00    /* (S) Last known Power Supply 3 serial data */
#define WS_NAME                 0 x 01031b00    /* (S) System Identifying Name */
#define WS_BOOTDEVS             0 x 01031c00    /* (S) BIOS Boot drive information */
#define WS_SYS_LOG_CLOCK        0 x 01031d00    /* (S) Current time from log timestamp clock (seconds) */
#define WS_SYS_LOG_COUNT        0 x 01031e00    /* (S) Number of Log Entry */
#define WS_MODEM_INIT           0 x 01031f00    /* (S) Modem initialization string */
#define WS_EVENT_ID01           0 x 01032000    /* (S) Canister Change Event */
#define WS_EVENT_ID02           0 x 01032100    /* (S) Power Supply Change Event */
#define WS_EVENT_ID03           0 x 01032200    /* (S) Queue Event */
#define WS_EVENT_ID04           0 x 01032300    /* (S) Temp Warn or Shut Event */
#define WS_EVENT_ID05           0 x 01032400    /* (S) ACOK Change Event */
#define WS_EVENT_ID06           0 x 01032500    /* (S) DCOK Change Event */
#define WS_EVENT_ID07           0 x 01032600    /* (S) Fan Fault Event */
#define WS_EVENT_ID08           0 x 01032700    1* (S) Screen Event */
#define WS_EVENT_ID09           0 x 01032800    /* (S) CPU Fault Event */
#define WS_EVENT_ID0A           0 x 01032900    /* (S) OS_TimeOut Event */
#define WS_CALLOUT_MASK         0 x 01034000    /* (S) Call Out Masking string */
#define WS_BIOS_REV             0 x 01034100    /* (S) Storage of current BIOS Revision */
```

-continued

| Header File for Global Memory Addresses | | |
|---|---|---|
| #define WS_SYS_POWER | 0 × 02010100 | /* (L) Controls system master power 54POWER_ON |
| #define WS_SYS_REQ_POWER | 0 × 020 10200 | /* (L) Set to request main power on */ |
| #define WS_BP_P12V | 0 × 02020100 | /* (B) Analog Measure of +12 volt main supply */ |
| #define WS_BP_P3V | 0 × 02020200 | /* (B) Analog Measure of +3.3 volt main supply */ |
| #define WS_BP_N12V | 0 × 02020300 | /* (B) Analog Measure of −12 volt main supply */ |
| #define WS_BP_P5V | 0 × 02020400 | /* (B) Analog Measure of +5 volt main supply */ |
| #define WS_BP_VREF | 0 × 02020500 | /* (B) Analog Measure of VREF */ |
| #define WS_SYS_BP_TYPE | 0 × 02020600 | /* (B) Type of system backplane currently only two types Type 0 = 4 canister (small) and Type 1 = 8 canister (large) */ |
| #define WS_SYS_CAN_PRES | 0 × 02020700 | /* (B) Presence bits for canisters (LSB = 1, MSB = 5) */ |
| #define WS_SYS_PS_ACOK | 0 × 02020800 | /* (B) Power supply ACOK status (LSB = 1, MSB = 3) */ |
| #define WS_SYS_PS_DCOK | 0 × 02020900 | /* (B) Power supply DCOK status (LSB = 1, MSB = 3) */ |
| #define WS_SYS_PS_PRES | 0 × 02020a00 | /* (B) Presence bits for power supplies (LSB = 1, MSB = 3) */ |
| #define WS_SYS_RSTIMER | 0 × 02020b00 | /* (B) Used to delay reset/run until power stabilized */ |
| #define WS_SYS_TEMP_SHUT | 0 × 02020c00 | /* (B) Shutdown temperature. Initialized to ??? */ |
| #define WS_SYS_TEMP_WARN | 0 × 02020d00 | /* (B) Warming temperature. Initialized to ??? */ |
| #define WS_SYS_WDOG | 0 × 02020e00 | /* (B) System watchdog timer */ |
| /* First issues following command in phase 2 */ | | |
| #define WS_OS_RESOLUTION_16 | 0 × 04020600 | /* (B) Set Resolution (0,1,2,3) of Timer1 */ |
| #define WS_OS_COUNTER_16 | 0 × 04020700 | /* (B) Set Counter from (00 FFh) of Timer1 */ |
| /* If either operation's failed that it will response error code "02h" back, then try raptor 8 and future command */ | | |
| #define WS_OS_RESOLUTION_8 | 0 × 02020f00 | /* (B) Set Resolution (0,1,2,3) of Timer1 */ |
| #define WS_OS_COUNTER_8 | 0 × 02021000 | /* (B) Set Counter from (00 - FFh) of Timer1 */ |
| /* If it's failed it is raptor 16 phase 1 that does not support watchdog */ | | |
| #define WS_SYS_TEMP_DATA | 0 × 02030300 | /* (S) Temperatures of all sensors on temperature bus in address order */ |
| #define WS_SB_FAN_HI | 0 × 03010100 | /* (L) System Board Fans HI */ |
| #define WS_SB_FAN_LED | 0 × 030 10200 | /* (L) System Board Fan Fault LED */ |
| #define WS_SYS_RUN | 0 × 03010300 | /* (L) Controls the system halt/run line S1_OK_TO_RUN. */ |
| #define WS_SYS_SB_TYPE | 0 × 03010400 | /* (L) Set System Type (0: Raptor16 or 1:Raptor 8) */ |
| #define WS_SB_BUSCORE | 0 × 03020200 | /* (B) System Board BUS/CORE speed ratio to use on reset */ |
| #define WS_SB_FANFAULT | 0 × 03020300 | /* (B) System Board Fan fault bits */ |
| #define WS_SB_FAN_LOLIM | 0 × 03020400 | /* (B) Fan speed low speed fault limit */ |
| #define WS_SB_LCD_COMMAND | 0 × 03020500 | /* (B) Low level LCD Controller Command */ |
| #define WS_SB_LCD_DATA | 0 × 03020600 | /* (B) Low level LCD Controller Data */ |
| #define WS_LCD_MSG | 0 × 03020700 | /* (B) Send a Byte of Fault Bits from Monitor-B to Monitor-A */ |
| #define WS_SB_DIMM_TYPE | 0 × 03030300 | /* (S) The type of DIMM in each DIMM socket as a 16 byte string */ |
| #define WS_SB_FAN_DATA | 0 × 03030400 | /* (S) System Board Fan speed data in fan number order */ |
| #define WS_SYS_LCDI | 0 × 03030500 | /* (S) Value to display on LCD Top line */ |
| #define WS_SYS_LCD2 | 0 × 03030600 | /* (S) Value to display on LCD Bottom line */ |
| #define WS_SB_LCD_STRING | 0 × 03030700 | /* (S) Low Level LCD Display string at current position */ |
| #define WS_SYS_MESSAGE | 0 × 03030800 | /* (S) Value to stored from LCD Messages */ |
| #define WS_NMI_REG | 0 × 04010100 | /* (L) NMI Request bit */ |
| #define WS_SB_CPU_FAULT | 0 × 04010200 | /* (L) CPU Fault Summary */ |
| #define WS_SB_FLASH_ENA | 0 × 04010300 | /* (L) Indicates FLASH ROW write enabled */ |
| #define WS_SB_FRU_FAULT | 0 × 04010400 | /* (L) Indicates the FRU status */ |
| #define WS_SB_JTAG | 0 × 04010500 | /* (L) Enables JTAG chain on system board */ |
| #define WS_SYSFAULT | 0 × 04010600 | /* (L) System Fault Summary */ |
| #define WS_SYS_OVERTEMP | 0 × 04010700 | /* (L) Indicates Overtemp fault */ |
| #define WS_CAN1_FAN_SYSFLT | 0 × 04010800 | /* (L) Indicates Canister #1 Fan System Fault */ |
| #define WS_CAN2_FAN_SYSFLT | 0 × 04010900 | /* (L) Indicates Canister #2 Fan System Fault */ |
| #define WS_CAN3_FAN_SYSFLT | 0 × 0401A00 | /* (L) Indicates Canister #3 Fan System Fault */ |
| #define WS_CAN4_FAN_SYSFLT | 0 × 04010B00 | /* (L) Indicates Canister #4 Fan System Fault */ |
| #define WS_NMI_MASK | 0 × 04020100 | /* (B) CPU NMI processor mask (LSB = CPU1) */ |
| #define WS_SB_CPU_ERR | 0 × 04020200 | /* (B) CPU Error bits (LSB = CPU1) */ |
| #define WS_SB_CPU_POK | 0 × 04020300 | /* (B) CPU Power OK (LSB = CPU1) */ |
| #define WS_SB_CPU_PRES | 0 × 04020400 | /* (B) CPU Presence bits (LSB = CPU1) */ |
| #define WS_SB_CPU_TEMP | 0 × 04020500 | /* (B) CPU Thermal fault bits (LSB = CPU1) */ |
| #define WS_SI_EVENTS | 0 × 10050100 | /* (E) System Interface Event Queue */ |
| #define WS_RI_CD | 0 × 11010100 | /* (L) Status of Remote Port Modem CD */ |
| #define WS_RI_CTS | 0 × 11010200 | /* (L) Status of Remote Port Modem CTS */ |
| #define WS_RI_DSR | 0 × 11010300 | /* (L) Status of Remote Port Modem DSR */ |
| #define WS_RI_DTR | 0 × 11010400 | /* (L) State of Remote Port Modem DTR */ |
| #define WS_RI_RTS | 0 × 11010500 | /* (L) Status of Remote Port Modem RTS */ |
| #define WS_RI_CALLOUT | 0 × 11020100 | /* (B) Controls Call out Script activation */ |
| #define WS_CALLOUT_STATUS | 0 × 11020200 | /* (B) Read Call Out Status */ |
| #define WS_RI_EVENTS | 0 × 11050100 | /* (E) Remote Interface Event Queue */ |
| #define WS_CAN_FAN_HI | 0 × 20010100 | /* (L) Canister Fans HI */ |
| #define WS_CAN_FAN_LED | 0 × 20010200 | /* (L) Canister Fan Fault LED */ |
| #define WS_CAN_POWER | 0 × 20010500 | /* (L) Controls canister PCI slot power */ |
| #define WS_CAN_55_PRESENT | 0 × 20010600 | /* (L) Indicates the presence of something in slot 5 |

-continued

| Header File for Global Memory Addresses | | |
|---|---|---|
| #define WS_SYS_CAN_TYPE | 0 × 20010700 | /* (L) Set System Type (O: Raptor16 or 1:Raptor 8) |
| #define WS_CAN_FAN_LOLIM | 0 × 20020100 | /* (B) Fan Low speed fault limit */ |
| #define WS_CAN_PCI_PRESENT | 0 × 20020200 | /* (B) Reflects PCI card slot[1 . . . 4] presence indicator pins (MSB to LSB) 4B,4A,3B,3A,2B,2A,1B,1A */ |
| #define WS_CAN_FANFAULT | 0 × 20020300 | /* (B) Canister Fan Fault Bits */ |
| #define WS_PCI_SLOT_PWR | 0 × 20020400 | /* (B) Turn on/off PCI Slot of Raptor 8 */ |
| #define WS_CAN_FAN_DATA | 0 × 20030300 | /* (S) Canister Fan speed data */ |

```
/* ********************************************************* */
/* This is the Wire Service Attributes for named items. */
/* The attribute information is stored in a symbolic constant named the same */
/* as the named item then followed by two underscores */
/* */
/* Attributes consist of: */
/*    RIW access for internal WS (I), BIOS/OS (0), administrator (A), and general (G) */
/*    groups. (0 = NoAccess 1 = Read Only, 2 = Write Only, 3 = Read/Write) */
/* */
/*    maximum possible reques/response length of item in bytes (LL) */
/* */
/*    Group Name ID (ID) */
/* */
/*              IOAGLLID */
```

| #define WS_DESCRIPTION_ | 0 × 11114000 | /* (S) Wire Service Processor Type/Description */ |
|---|---|---|
| #define WS_REVISION_ | 0 × 11112000 | /* (S) Wire Service Software Revision/Date Info */ |
| #define WS_WDOG_CALLOUT_ | 0 × 33310100 | /* (L) This is a bit controlling callout on a wathcdog timeout. */ |
| #define WS_WDOG_RESET_ | 0 × 33310100 | /* (L) This is a bit controlling system on a wathcdog timeout. */ |
| #define WS_NVRAM_RESET_ | 0 × 22200100 | /* (B) Trigger to reset NVRAM Data */ |
| #define WS_SYS_BOOTFLAG1 | 0 × 33310100 | /* (B) System Boot Flag 1 */ |
| #define WS_SYS_BOOTFLAG2 | 0 × 33310100 | /* (B) System Boot Flag 2 */ |
| #define WS_SYS_BOOTFLAG3 | 0 × 33310100 | /* (B) System Boot Flag 3 */ |
| #define WS_SYS_BOOTFLAG4 | 0 × 33310100 | /* (B) System Boot Flag 4 */ |
| #define WS_SYS_XDATK_KBYTES_ | 0 × 11110100 | /* (B) Size of the WS_SYS_XDATA in kilobytes */ |
| #define WS_SYS_XDATA_ | 0 × 3331ff00 | /* Byte Array for storage of arbitrary external data in NVRAM */ |
| #define WS_NVRAM_FAULTS | 0 × 11110100 | /* (B) Faults detected in NVRAM Data */ |
| #define WS_SYS_LOG_ | 0 × 3311ff00 | /* System Log */ |
| #define WS_RI_QUEUE_ | 0 × 3300ff00 | /* (0) Queue of data going to Remote Interface */ |
| #define WS_SI_QUEUE_ | 0 × 3300ff00 | /* (0) Queue of data going to System Interface */ |
| #define WS_SYS_SCREEN_ | 0 × 3311ff00 | /* System Screen */ |
| #define WS_CALLOUT_SCRIPT | 0 × 3330ff00 | /* (S) The callout script for remote notification */ |
| #define WS_PASSWORD_ | 0 × 33301000 | /* (S) The access password for Wire Service */ |
| #define WS_SYS_BP_SERIAL_ | 0 × 31111000 | /* (S) Last known BackPlane serial data */ |
| #define WS_SYS_CAN_SERIAL1_ | 0 × 31111000 | /* (S) Last known Canister 1 Serial data */ |
| #define WS_SYS_CAN_SERIAL2_ | 0 × 31111000 | /* (S) Last known Canister 2 Serial data */ |
| #define WS_SYS_CAN_SERIAL3_ | 0 × 31111000 | /* (S) Last known Canister 3 Serial data */ |
| #define WS_SYS_CAN_SERIAL4_ | 0 × 31111000 | /* (S) Last known Canister 4 Serial data */ |
| #define WS_SYS_RI_SERIAL_ | 0 × 31111000 | /* (S) Last known Remote Interface serial data */ |
| #define WS_SYS_SB_SERIAL_ | 0 × 31111000 | /* (S) Last known System Board serial data */ |
| #define WS_SYS_PS_SERIAL1_ | 0 × 31111000 | /* (S) Last known Power Supply 1 serial data */ |
| #define WS_SYS_PS_SERIAL2_ | 0 × 31111000 | /* (S) Last known Power Supply 2 serial data */ |
| #define WS_SYS_PS_SERIAL3_ | 0 × 31111000 | /* (S) Last known Power Supply 3 serial data */ |
| #define WS_NAME_ | 0 × 33312000 | /* (S) System Identifying Name */ |
| #define WS_BOOTDEVS_ | 0 × 3331ff00 | /* (S) BIOS Boot drive information */ |
| #define WS_SYS_LOG_CLOCK | 0 × 11110400 | /* (S) Current time from log timestamp clock (seconds) *J |
| #define WS_SYS_LOG_COUNT | 0 × 11110200 | /* (S) Number of Log entries */ |
| #define WS_MODEM_INIT_ | 0 × 33315000 | /* (S) Modern initialization string */ |
| #define WS_EVENT_ID01_ | 0 × 31111000 | /* (S) Canister Change Event */ |
| #define WS_EVENT_ID02_ | 0 × 31111000 | /* (S) Power Supply Change Event */ |
| #define WS_EVENT_ID03_ | 0 × 31111000 | /* (S) Queue Event */ |
| #define WS_EVENT_ID04_ | 0 × 31111000 | /* (S) Temp Warn or Shut Event */ |
| #define WS_EVENT_ID05_ | 0 × 31111000 | /* (S) ACOK Change Event */ |
| #define WS_EVENT_ID06_ | 0 × 31111000 | /* (S) DCOK Change Event */ |
| #define WS_EVENT_ID07_ | 0 × 31111000 | /* (S) Fan Fault Event */ |
| #define WS_EVENT_ID05_ | 0 × 31111000 | /* (S) Screen Event */ |
| #define WS_EVENT_ID09_ | 0 × 31111000 | /* (S) CPU Fault Event */ |
| #define WS_EVENT_ID0A_ | 0 × 31111000 | /* (S) OS_TimeOut Event */ |
| #define WS_CALLOUT_MASK_ | 0 × 31110200 | /* (S) Call Out Masking string */ |
| #define WS_BIOS_REV_ | 0 × 31111000 | /* (S) Storage of current BIOS Revision */ |
| #define WS_SYS_POWER_ | 0 × 33310100 | /* (L) Controls system master power S4_POWER_ON |
| #define WS_SYS_REGPOWER_ | 0 × 22200100 | /* (L) Set to request main power on */ |
| #define WS_BP_P2V_ | 0 × 11110100 | /* (B) Analog Measure of +12 volt main supply */ |
| #define WS_BP_P3V_ | 0 × 11110100 | /* (B) Analog Measure of +3.3 volt main supply */ |
| #define WS_BP_NI2V_ | 0 × 11110100 | /* (B) Analog Measure of −12 volt main supply */ |

-continued

| Header File for Global Memory Addresses | | |
|---|---|---|
| #define WS_BP_P5V_ | 0 × 11110100 | /* (B) Analog Measure of +5 volt main supply *1 |
| #define WS_BP_VREF_ | 0 × 11110100 | /* (B) Analog Measure of VREF */ |
| #define WS_SYS_BP_TYPE_ | 0 × 11110100 | /* (B) Type of system backplane currently only two types Type 0 = 4 canister (small) and Type 1 = 8 canister (large) */ |
| #define WS_SYS_CAN_PRES_ | 0 × 11110100 | /* (B) Presence bits for canisters (LSB = 1, MSB = 8) |
| #define WS_SYS_PS_ACOK_ | 0 × 11110100 | /* (B) Power supply ACOK status (LSB = 1, MSB = 3) |
| #define WS_SYS_PS_DCOK_ | 0 × 11110100 | /* (B) Power supply DCOK status (LSB = 1, MSB = 3) |
| #define WS_SYS_PS_PRES_ | 0 × 11110100 | /* (B) Presence bits for power supplies (LSB = 1, MSB = 3) */ |
| #define WS_SYS_RSTIMER_ | 0 × 33310100 | /* (B) Used to delay reset/run until power stabilized |
| #define WS_SYS_TEMP_SHUT_ | 0 × 33310100 | /* (B) Shutdown temperature. Initialized to ??? */ |
| #define WS_SYS_TEMP_WARN_ | 0 × 33310100 | /* (B) Warning temperature. Initialized to ??? |
| #define WS_SYS_WDOG_ | 0 × 33110100 | /* (B) System watchdog timer #1 |
| /* First issues following command in phase 2 */ | | |
| #define WS_05_RESOLUTION_16_ | 0 × 33110100 | /* (B) Set Resolution (0,1,2,3) of Timer1 */ |
| #define WS_05_COUNTER_16 | 0 × 33110100 | /* (B) Set Counter from (00 - FFh) of Timer1 */ |
| /* If either operation's failed that it will response error code "02h" back, then try raptor 8 and future command */ | | |
| #define WS_05_RESOLUTION_8_ | 0 × 33110100 | /* (B) SetResolution (0,1,2,3) of Timer1 */ |
| #define WS_05_COUNTER_8_ | 0 × 33110100 | /* (B) Set Counter from (00 - FFh) of Timer1 */ |
| /* If it's failed it is raptor 16 phase 1 that does not support watchdog */ | | |
| #define WS_SYS_TEMP_DATA_ | 0 × 11110500 | /* (S) Temperatures of all sensors on temperature bus in address order */ |
| #define WS_SB_FAN_HI_ | 0 × 33310100 | /* (L) System Board Fans HI */ |
| #define WS_SB_FAN_LED_ | 0 × 33310100 | /* (L) System Board Fan Fault LED */ |
| #define WS_SYS_RUN_ | 0 × 33310100 | /* (L) Controls the system halt/run line S_OK_TO_RUN. */ |
| #define WS_SYS_SB_TYPE_ | 0 × 33310100 | /* (L) Set System Type (0:Raptor 16 or 1:Raptor 8) */ |
| #define WS_SB_BUSCORE_ | 0 × 33110100 | /* (B) System Board BUS/CORE speed ratio to use on reset */ |
| #define WS_SB_FANFAULT_ | 0 × 33110100 | /* (B) System Board Fan fault bits */ |
| #define WS_SB_FAN_LOLIM_ | 0 × 33310100 | /* (B) Fan speed low speed fault limit */ |
| #define WS_SB_LCD_COMMAND_ | 0 × 22000100 | /* (B) Low Level LCD Controller Command |
| #define WS_SB_LCD_DATA_ | 0 × 22000100 | /* (B) Low level LCD Controller Data */ |
| #define WS_LCD_MSG_ | 0 × 33110100 | /* (B) Send a Byte of Fault Bits from Monitor-B to Monitor-A */ |
| #define WS_SB_DIMM_TYPE_ | 0 × 11111000 | /* (S) The type of DIMM in each DIMM socket as a 16 byte string */ |
| #define WS_SB_FAN_DATA_ | 0 × 11110600 | /* (S) System Board Fan speed data in fan number order */ |
| #define WS_SYS_LCD1_ | 0 × 33311000 | /* (S) Value to display on LCD Top line */ |
| #define WS_SYS_LCD2_ | 0 × 33311000 | /* (S) Value to display on LCD Bottom line */ |
| #define WS_SB_LCD_STRING_ | 0 × 22004000 | /* (S) Low Level LCD Display string at current position */ |
| #define WS_SYS_MESSAGE_ | 0 × 11112000 | /* (S) Value to stored from LCD Messages */ |
| #define WS_NMI_REG | 0 × 22200100 | /* (L) NMI Request bit */ |
| #define WS_SB_CPU_FAULT_ | 0 × 11110100 | /* (L) CPU Fault Summary */ |
| #define WS_SB_FLASH_ENA_ | 0 × 33310100 | /* (L) Indicates FLASH ROW write enabled */ |
| #define WS_SB_FRU_FAULT_ | 0 × 33110100 | /* (L) Indicates the FRU status */ |
| #define WS_SB_JTAG_ | 0 × 33310100 | /* (L) Enables JTAG chain on system board */ |
| #define WS_SYSFAULT_ | 0 × 33110100 | /* (L) System Fault Summary */ |
| #define WS_SYS_OVERTEMP_ | 0 × 11110100 | /* (L) Indicates Overtemp fault */ |
| #define WS_CAN1_FAN_SYSFLT_ | 0 × 33110100 | /* (L) Indicates Canister #1 Fan System Fault |
| #define WS_CAN2_FAN_SYSFLT_ | 0 × 33110100 | /* (L) Indicates Canister #2 Fan System Fault |
| #define WS_CAN3_FAN_SYSFLT_ | 0 × 33110100 | /* (L) Indicates Canister #3 Fan System Fault |
| #define WS_CAN4_FAN_SYSFLT_ | 0 × 33110100 | /* (L) Indicates Canister #4 Fan System Fault |
| #define WS_NMI_MASK_ | 0 × 33310100 | /* (B) CPU NMI processor mask (LSB = CPUI) */ |
| #define WS_SB_CPU_ERR_ | 0 × 11110100 | /* (B) CPU Error bits (LSB = CPUI) */ |
| #define WS_SB_CPU_POK_ | 0 × 11110100 | /* (B) CPU Power OK (LSB = CPUI) */ |
| #define WS_SB_CPU_PRES_ | 0 × 11110100 | /* (B) CPU Presence bits (LSB = CPUI) */ |
| #define WS_SB_CPU_TEMP_ | 0 × 11110100 | /* (B) CPU Thermal fault bits (LSB = CPUI) */ |
| #define WS_SI_EVENTS_ | 0 × 33001000 | /* (E) System Interface Event Queue */ |
| #define WS_RI_CD_ | 0 × 33110100 | /* (L) Status of Remote Port Modern CD */ |
| #define WS_RI_CTS_ | 0 × 33110100 | /* (L) Status of Remote Port Modern CTS */ |
| #define WS_RI_DSR_ | 0 × 33110100 | /* (L) Status of Remote Port Modern DSR */ |
| #define WS_RI_DTR_ | 0 × 33110100 | /* (L) State of Remote Port Modern DTR */ |
| #define WS_RI_RTS_ | 0 × 33110100 | /* (L) Status of Remote Port Modern RTS */ |
| #define WS_RI_CALLOUT_ | 0 × 33310100 | /* (B) Controls Call out Script activation */ |
| #define WS_CALLOUT_STATUS_ | 0 × 33310100 | /* (B) Read Call Out Status */ |
| #define WS_RI_EVENTS_ | 0 × 33002000 | /* (E) Remote Interface Event Queue */ |
| #define WS_CAN_FAN_HI_ | 0 × 33310100 | /* (L) Canister Fans HI */ |
| #define WS_CAN_FAN_LED_ | 0 × 33310100 | /* (L) Canister Fan Fault LED */ |
| #define WS_CAN_POWER_ | 0 × 33310100 | /* (L) Controls canister PCI slot power */ |
| #define WS_CAN_55_PRESENT_ | 0 × 11110100 | /* (L) Indicates the presence of something |

-continued

| Header File for Global Memory Addresses | | |
|---|---|---|
| in slot 5 */ | | |
| #define WS_SYS_CAN_TYPE_ 8) */ | 0 x 33310100 | /* (L) Set System Type (O: Raptor 16 of 1: Raptor |
| #define WS_CAN_FAN_LOLIM | 0 x 33310100 | J* (B) Fan low speed fault limit */ |
| #define WS_CAN_PCI_PRESENT_ | 0 x 11110100 | /* (B) Reflects PCI card slot[1 . . . 4] presence |
| indicator pins (MSB to LSB) 4B,4A,3B,3A,2B,2A,1B,1A */ | | |
| #define WS_CAN_FANFAULT_ | 0 x 11110100 | /* (B) Canister Fan Fault Bits */ |
| #define WS_PCI_SLOT_PWR_ | 0 x 33310100 | /* (B) Turn on/off PCI Slot of Raptor 8 */ |
| #define WS_CAN_FAN_DATA_ | 0 x 11110200 | /* (S) Canister Fan speed data */ |
| #ifndef FAR_POINTERS | | |
| #ifndef NEAR_POINTERS | | |
| #include "***ERROR - Pointer Type not defined" | | |
| #endif | | |
| #endif | | |

APPENDIX A

Incorporation by Reference of Commonly Owned Applications
The following patent applications, commonly owned and filed October 1, 1997, are hereby incorporated herein in their entirety by reference thereto:

| Title | Application No. | Attorney Docket No. |
|---|---|---|
| "System Architecture for Remote Access and Control of Environmental Management" | 08/942,160 | MNFRAME.002A1 |
| "Method of Remote Access and Control of Environmental Management" | 08/942,215 | MNFRAME.002A2 |
| "System for Independent Powering of Diagnostic Processes on a Computer System" | 08/942,410 | MNFRAME.002A3 |
| "Method of Independent Powering of Diagnostic Processes on a Computer System" | 08/942,320 | MNFRAME.002A4 |
| "Diagnostic and Managing Distributed Processor System" | 08/942,402 | MNFRAME.005A1 |
| "Method for Managing a Distributed Processor System" | 08/942,448 | MNFRAME.005A2 |
| "System for Mapping Environmental Resources to Memory for Program Access" | 08/942,222 | MNFRAME.005A3 |
| "Hot Add of Devices Software Architecture" | 08/942,309 | MNFRAME.006A1 |
| "Method for The Hot Add of Devices" | 08/942,306 | MNFRAME.006A2 |
| "Hot Swap of Devices Software Architecture" | 08/942,311 | MNFRAME.006A3 |
| "Method for The Hot Swap of Devices" | 08/942,457 | MNFRAME.006A4 |
| "Method for the Hot Add of a Network Adapter on a System Including a Dynamically Loaded Adapter Driver" | 08/943,072 | MNFRAME.006A5 |
| "Method for the Hot Add of a Mass Storage Adapter on a System Including a Statically Loaded Adapter Driver" | 08/942,069 | MNFRAME.006A6 |
| "Method for the Hot Add of a Network Adapter on a System Including a Statically Loaded Adapter Driver" | 08/942,465 | MNFRAME.006A7 |
| "Method for the Hot Add of a Mass Storage Adapter on a System Including a Dynamically Loaded Adapter Driver" | 08/962,963 | MNFRAME.006A8 |
| "Method for the Hot Swap of a Network Adapter on a System Including a Dynamically Loaded Adapter Driver" | 08/943,078 | MNFRAME.006A9 |
| "Method for the Hot Swap of a Mass Storage Adapter on a System Including a Statically Loaded Adapter Driver" | 08/942,336 | MNFRAME.006A10 |
| "Method for the Hot Swap of a Network Adapter on a System Including a Statically Loaded Adapter Driver" | 08/942,459 | MNFRAME.006A11 |
| "Method for the Hot Swap of a Mass Storage Adapter on a System Including a Dynamically Loaded Adapter Driver" | 08/942,458 | MNFRAME.006A12 |
| "Method of Performing an Extensive Diagnostic Test in Conjunction with a BIOS Test Routine" | 08/942,463 | MNFRAME.008A |

APPENDIX A-continued

Incorporation by Reference of Commonly Owned Applications
The following patent applications, commonly owned and filed October 1, 1997,
are hereby incorporated herein in their entirety by reference thereto:

| Title | Application No. | Attorney Docket No. |
|---|---|---|
| "Apparatus for Performing an Extensive Diagnostic Test in Conjunction with a BIOS Test Routine" | 08/942,163 | MNFRAME.009A |
| "Configuration Management Method for Hot Adding and Hot Replacing Devices" | 08/941,268 | MNFRAME.010A |
| "Configuration Management System for Hot Adding and Hot Replacing Devices" | 08/942,408 | MNFRAME.011A |
| "Apparatus for Interfacing Buses" | 08/942,382 | MNFRAME.012A |
| "Method for Interfacing Buses" | 08/942,413 | MNFRAME.013A |
| "Computer Fan Speed Control Device" | 08/942,447 | MNFRAME.016A |
| "Computer Fan Speed Control Method" | 08/942,216 | MNFRAME.017A |
| "System for Powering Up and Powering Down a Server" | 08/943,076 | MNFRAME.018A |
| "Method of Powering Up and Powering Down a Server" | 08/943,077 | MNFRAME.019A |
| "System for Resetting a Server" | 03/942,333 | MNFRAME.020A |
| "Method of Resetting a Server" | 08/942,405 | MNFRAME.021A |
| "System for Displaying Flight Recorder" | 08/942,070 | MNFRAME.022A |
| "Method of Displaying Flight Recorder" | 03/942,068 | MNFRAME.023A |
| "Synchronous Communication Interface" | 03/943,355 | MNFRAME.024A |
| "Synchronous Communication Emulation" | 08/942,004 | MNFRAME.025A |
| "Software System Facilitating the Replacement or Insertion of Devices in a Computer System" | 08/942,317 | MNFRAME.026A |
| "Method for Facilitating the Replacement or Insertion of Devices in a Computer System" | 08/942,316 | MNFRAME.027A |
| "System Management Oraphical User Interface" | 08/943,357 | MNFRAME.028A |
| "Display of System Information" | 03/942,195 | MNFRAME.029A |
| "Data Management System Supporting Hot Plug Operations on a Computer" | 08/942,129 | MNFRAME.030A |
| "Data Management Method Supporting Hot Plug Operations on a Computer" | 08/942,124 | MNFRAME.031A |
| "Alert Configurator and Manager" | 08/942,005 | MNFRAME.032A |
| "Managing Computer System Alerts" | 08/943,356 | MNFRAME.033A |
| "Computer Fan Speed Control System" | 08/940,301 | MNFRAME.034A |
| "Computer Fan Speed Control System Method" | 03/941,267 | MNFRAME.035A |
| "Black Box Recorder for Information System Events" | 08/942,381 | MNFRAME.036A |
| "Method of Recording Information System Events" | 08/942,164 | MNFRAME.037A |
| "Method for Automatically Reporting a System Failure in a Server" | 03/942,168 | MNFRAME.040A |
| "System for Automatically Reporting a System Failure in a Server" | 08/942,384 | MNFRAME.041A |
| "Expansion of PCI Bus Loading Capacity" | 08/942,404 | MNFRAME.042A |
| "Method for Expanding PCI Bus Loading Capacity" | 08/942,223 | MNFRAME.043A |
| "System for Displaying System Status" | 08/942,347 | MNFRAME.044A |
| "Method of Displaying System Status" | 08/942,071 | MNFRAME.045A |
| "Fault Tolerant Computer System" | 08/942,194 | MNFRAME.046A |
| "Method for Hot Swapping of Network Components" | 08/943,044 | MNFRAME.047A |
| "A Method for Communicating a Software Generated Pulse Waveform Between Two Servers in a Network" | 08/942,221 | MNFRAME.048A |
| "A System for Communicating a Software Generated Pulse Waveform Between Two Servers in a Network" | 08/942,409 | MNFRAME.049A |
| "Method for Clustering Software Applications" | 08/942,318 | MNFRAME.050A |
| "System for Clustering Software Applications" | 08/942,411 | MNFRAME.051A |
| "Method for Automatically Configuring a Server after Hot Add of a Device" | 08/942,319 | MNFRAME.052A |
| "System for Automatically Configuring a Server after Hot Add of a Device" | 08/942,331 | MNFRAME.053A |
| "Method of Automatically Configuring and Formatting a Computer System and Installing Software" | 08/942,412 | MNFRAME.054A |

APPENDIX A-continued

Incorporation by Reference of Commonly Owned Applications
The following patent applications, commonly owned and filed October 1, 1997,
are hereby incorporated herein in their entirety by reference thereto:

| Title | Application No. | Attorney Docket No. |
|---|---|---|
| "System for Automatically Configuring and Formatting a Computer System and Installing Software" | 08/941,955 | MNFRAME.055A |
| "Determining Slot Numbers in a Computer" | 08/942,462 | MNFRAME.056A |
| "System for Detecting Errors in a Network" | 08/942,169 | MNFRAME.058A |
| "Method of Detecting Errors in a Network" | 08/940,302 | MNFRAME.059A |
| "System for Detecting Network Errors" | 08/942,407 | MNFRAME.060A |
| "Method of Detecting Network Errors" | 08/942,573 | MNFRAME.061A |

What is claimed is:

1. A method of mapping environmental resources to memory, comprising:
   providing a computer, the computer comprising a processor and a memory;
   providing a microcontroller network, wherein the microcontrollers provide monitoring and control functions associated with the environmental conditions internal to the computer;
   storing in the memory a unique identifier for each of the functions; and
   executing commands on the microcontroller network by accessing any one of the unique identifies.

2. The method of claim 1, additionally comprising providing a client computer connected to the computer, wherein the execution of commands are initiated by the client computer.

3. The method of claim 1, wherein executing commands includes altering the speed of a system fan.

4. The method of claim 1, wherein executing commands includes reading the temperature of a sensor.

5. The method of claim 1, wherein executing commands includes writing a message to a display.

6. The method of claim 1, wherein executing commands includes checking the state of a microcontroller bus.

7. The method of claim 1, wherein executing commands includes checking for the presence of a canister containing adapter slots.

8. The method of claim 1, wherein executing commands includes checking a system voltage.

9. The method of claim 1, wherein the unique identifier is provided in the executable code associated with executing commands.

10. A method of mapping environmental resources to memory, comprising:
    providing a computer, including a processor and memory, connected to a microcontroller network;
    connecting a plurality of sensors to the microcontroller network, the sensors monitoring one or more environmental conditions internal to the computer;
    assigning a unique identifier to each sensor; and
    providing a model of the microcontroller network in the computer memory, wherein the computer is capable of communicating with a selected one of the sensors by mapping the unique identifier of the selected sensor to the microcontroller in the network connected to the selected sensor.

11. The method of claim 10, additionally comprising increasing the speed of a fan in the computer when the temperature of the computer exceeds a threshold temperature.

12. The method of claim 10, additionally comprising checking for the presence of a power supply.

13. The method of claim 10, additionally comprising enabling the writing of flash memory with a new basic input/out system (BIOS) program.

14. The method of claim 10, additionally comprising sending a message to a system log.

15. The method of claim 10, additionally comprising sending notification of a system fault to the central processing unit.

16. The method of claim 10, additionally comprising disabling power to a canister that is connected to the computer.

17. The method of claim 10, additionally comprising enabling power to a canister that is connected to the computer.

18. The method of claim 10, additionally comprising updating a watchdog timer that is maintained by the microcontroller network.

19. The method of claim 10, additionally comprising interconnecting the microcontroller network with an $I^2C$ bus.

20. The method of claim 10, wherein the unique identifier is part of a management information block.

21. A method of monitoring environmental conditions in a computerized environment, the method comprising:
    creating a request message which identifies one or more environmental conditions internal to the computerized environment;
    sending the request message from a requestor to a microcontroller network which manages the environmental conditions;
    obtaining status of the conditions identified by the request message;
    creating a response message which reports the status; and
    sending the response message from the microcontroller network to the requester.

22. The method of claim 21, wherein the requestor is a central processing unit.

* * * * *

UNITED STATES PATENT AND TRADEMARK OFFICE
CERTIFICATE OF CORRECTION

PATENT NO.    : 6,199,173 B1
DATED         : March 6, 2001
INVENTOR(S)   : Johnson et al.

It is certified that error appears in the above-identified patent and that said Letters Patent is hereby corrected as shown below:

Column 7,
Line 20, please delete the words "muter-receivers" and replace therefor -- master receivers --

Column 15,
Line 15, please delete the words "FIGS 3 and 7" and replace therefor -- FIGS 2 and 7 --

Columns 35 and 36,
Line 52, "Header for Global Memory Addresses" Table, continued, please delete the word " wathcdog" and replace therefor -- watchdog --

Columns 35 and 36,
Line 54, "Header for Golbal Memory Addresses" Table, continued, please delete the word "wathcdog" and replace therefor -- watchdog --.

Column 43,
Line 32, please delete the word "identifies" and replace therefor -- identifiers --

Signed and Sealed this

Seventeenth Day of June, 2003

JAMES E. ROGAN
*Director of the United States Patent and Trademark Office*

US006199173C1

(12) EX PARTE REEXAMINATION CERTIFICATE (9718th)

United States Patent
Johnson et al.

(10) Number: US 6,199,173 C1
(45) Certificate Issued: Jun. 26, 2013

(54) METHOD FOR MAPPING ENVIRONMENTAL RESOURCES TO MEMORY FOR PROGRAM ACCESS

(75) Inventors: Karl S. Johnson, Palo Alto, CA (US);
Walter A. Wallach, Los Altos, CA (US);
Ken Nguyen, San Jose, CA (US);
Carlton G. Amdahl, Fremont, CA (US)

(73) Assignee: Round Rock Research, LLC, Mt. Kisco, NY (US)

Reexamination Request:
No. 90/012,322, May 30, 2012

Reexamination Certificate for:
Patent No.: 6,199,173
Issued: Mar. 6, 2001
Appl. No.: 08/942,214
Filed: Oct. 1, 1997

Certificate of Correction issued Jun. 17, 2003

(51) Int. Cl.
*G06F 11/00* (2006.01)

(52) U.S. Cl.
USPC .................. 714/4.1; 714/3; 714/37; 714/47.1

(58) Field of Classification Search
None
See application file for complete search history.

(56) References Cited

To view the complete listing of prior art documents cited during the proceeding for Reexamination Control Number 90/012,322, please refer to the USPTO's public Patent Application Information Retrieval (PAIR) system under the Display References tab.

*Primary Examiner* — Eron J. Sorrell

(57) ABSTRACT

A network of microcontrollers for monitoring and diagnosing the environmental conditions of a computer is disclosed. The network of microcontrollers provides a management system by which computer users can accurately gauge the health of their computer. The network of microcontrollers provides users the ability to detect system fan speeds, internal temperatures and voltage levels. The invention is designed to not only be resilient to faults, but also allows for the system maintenance, modification, and growth—without downtime. Additionally, the present invention allows users to replace failed components, and add new functionality, such as new network interfaces, disk interface cards and storage, without impacting existing users. One of the primary roles of the present invention is to manage the environment without outside involvement. This self-management allows the system to continue to operate even though components have failed.

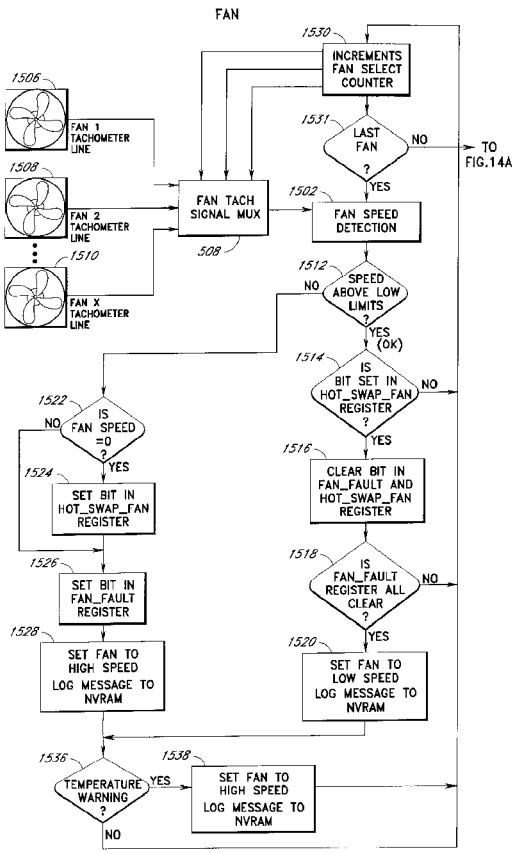

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 10 and 21 are determined to be patentable as amended.

Claims 2-9, 11-20 and 22, dependent on an amended claim, are determined to be patentable.

New claims 23-28 are added and determined to be patentable.

1. A method of mapping environmental resources to memory, comprising:
   providing a computer, the computer comprising a processor and a memory;
   providing a microcontroller network, wherein [the] microcontrollers *of the network* provide monitoring and control functions associated with the environmental conditions internal to the computer;
   storing in the memory a unique identifier for each of the functions; and
   executing commands on the microcontroller network by accessing any one of the unique identifiers*;*
   *wherein each unique identifier comprises a global memory address, the global memory address configured to allow an application to request information from the microcontroller network without knowledge of the structure of the microcontroller network.*

10. A method of mapping environmental resources to memory, comprising:
    providing a computer, including a processor and memory, connected to a microcontroller network;
    connecting a plurality of sensors to the microcontroller network, the sensors monitoring one or more environmental conditions internal to the computer;
    assigning a unique identifier to each sensor; and
    providing a model of the microcontroller network in the computer memory, wherein the computer is capable of communicating with a selected one of the sensors by mapping the unique identifier of the selected sensor to the microcontroller in the network connected to the selected sensor
    *wherein each unique identifier comprises a global memory address, the global memory address configured to allow an application to request information from the microcontroller network without knowledge of the structure of the microcontroller network.*

21. A method of monitoring environmental conditions in a computerized environment, the method comprising:
    creating a request message which identifies one or more environmental conditions internal to the computerized environment;
    sending the request message from a requestor to a microcontroller network which manages the environmental conditions;
    obtaining status of the conditions identified by the request message;
    creating a response message which reports the status; and
    sending the response message from the microcontroller network to the requester*;*
    *wherein the request message comprises a global memory address, the global memory address configured to allow an application to request information from the microcontroller network without knowledge of the structure of the microcontroller network.*

*23. The method of claim 1, wherein each microcontroller on the microcontroller network is software addressable by a unique address.*

*24. The method of claim 23, further comprising a microcontroller bus, the microcontroller bus comprising a multi-master bus.*

*25. The method of claim 24, further comprising:*
*performing collision detection on the multi-master bus.*

*26. The method of claim 25, further comprising:*
*implementing an arbitration mechanism on the multi-master bus.*

*27. The method of claim 1, wherein the microcontrollers comprise a master-slave relationship, and the method further comprises generating a plurality of clock signals to permit a data transfer, the act of generating being performed by a master microcontroller.*

*28. The method of claim 1, wherein a first one of the microcontrollers is resident on a system board of the computer and a second one of the microcontrollers is not resident on the system board, each of the first and second microcontrollers coupled to one or more respective sensors.*

\* \* \* \* \*